US010295710B2

(12) United States Patent
Pham et al.

(10) Patent No.: US 10,295,710 B2
(45) Date of Patent: May 21, 2019

(54) OPTICAL DIFFUSING FILMS AND METHODS OF MAKING SAME

(71) Applicant: 3M INNOVATIVE PROPERTIES COMPANY, St. Paul, MN (US)

(72) Inventors: Tri D. Pham, Woodbury, MN (US); Steven H. Kong, Woodbury, MN (US); Haiyan Zhang, Woodbury, MN (US); Joseph T. Aronson, Menomonie, WI (US); Michael R. Leaf, Eau Claire, WI (US); Gary T. Boyd, Woodbury, MN (US); Nicholas A. Johnson, Burnsville, MN (US); Qingbing Wang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 14/443,407

(22) PCT Filed: Nov. 19, 2013

(86) PCT No.: PCT/US2013/070721
§ 371 (c)(1),
(2) Date: May 18, 2015

(87) PCT Pub. No.: WO2014/081693
PCT Pub. Date: May 30, 2014

(65) Prior Publication Data
US 2015/0293272 A1    Oct. 15, 2015

Related U.S. Application Data

(60) Provisional application No. 61/728,868, filed on Nov. 21, 2012.

(51) Int. Cl.
*G02B 5/02* (2006.01)
*F21V 8/00* (2006.01)
(Continued)

(52) U.S. Cl.
CPC ............ *G02B 5/021* (2013.01); *B29C 59/026* (2013.01); *C25D 3/04* (2013.01); *C25D 3/38* (2013.01);
(Continued)

(58) Field of Classification Search
CPC ...... G02B 5/02; G02B 5/0205; G02B 5/0236; G02B 5/0242; G02B 5/0268
(Continued)

(56) References Cited

U.S. PATENT DOCUMENTS 5,873,992 A * 2/1999 Glezen .................... C25D 5/10
205/159
6,351,062 B1 * 2/2002 Nishizawa ............ H01J 29/868
313/478

(Continued)

FOREIGN PATENT DOCUMENTS

| CN | 102121666 A1 | 7/2011 |
| JP | 2004045471 A | 2/2004 |

(Continued)

OTHER PUBLICATIONS

3M, Display Films, Product Specifications, includes DBEF-D3-340, 2012, 3 pgs.
(Continued)

*Primary Examiner* — Robert E. Tallman
(74) *Attorney, Agent, or Firm* — Michael Stern

(57) ABSTRACT

Optical diffusing films are made by microreplication from a structured surface tool. The tool is made using a 2-part electroplating process, wherein a first electroplating procedure forms a first metal layer with a first major surface, and a second electroplating procedure forms a second metal layer on the first metal layer, the second metal layer having a second major surface with a smaller average roughness than that of the first major surface. The second major surface can function as the structured surface of the tool. A replica of this surface can then be made in a major surface of an optical film to provide light diffusing properties. The structured surface and/or its constituent structures can be characterized in terms of various parameters such as optical haze, optical clarity, Fourier power spectra of the topogra-
(Continued)

phy along orthogonal in-plane directions, ridge length per unit area, equivalent circular diameter (ECD), and/or aspect ratio.

10 Claims, 25 Drawing Sheets

(51) Int. Cl.
    *B29C 59/02* (2006.01)
    *C25D 3/04* (2006.01)
    *C25D 3/38* (2006.01)
    *C25D 5/12* (2006.01)
    *C25D 5/16* (2006.01)
    *G02F 1/1335* (2006.01)
    *B29L 11/00* (2006.01)

(52) U.S. Cl.
    CPC ............ *C25D 5/12* (2013.01); *C25D 5/16* (2013.01); *G02B 5/0221* (2013.01); *G02B 5/0268* (2013.01); *G02B 5/0278* (2013.01); *G02B 6/0051* (2013.01); *B29L 2011/00* (2013.01); *G02F 1/133606* (2013.01)

(58) Field of Classification Search
    USPC ................ 359/487.6, 488.01, 601–614
    See application file for complete search history.

(56) References Cited

U.S. PATENT DOCUMENTS

| | | |
|---|---|---|
| 7,480,097 B2 | 1/2009 | Nagahama |
| 8,003,527 B2 | 8/2011 | Sunayama et al. |
| 8,228,463 B2 | 7/2012 | Biernath |
| 2007/0217015 A1 | 9/2007 | Furuya |
| 2010/0177398 A1 | 7/2010 | Watanabe |
| 2010/0246016 A1 | 9/2010 | Carlson |
| 2010/0302479 A1 | 12/2010 | Aronson |
| 2012/0113622 A1 | 5/2012 | Aronson |
| 2012/0147593 A1 | 6/2012 | Yapel |
| 2012/0175758 A1* | 7/2012 | Paek .............. H01L 23/49582 257/676 |

FOREIGN PATENT DOCUMENTS

| | | |
|---|---|---|
| JP | 2004045472 A | 2/2004 |
| JP | 2007237541 A | 9/2007 |
| JP | 2009204687 A | 9/2009 |
| JP | 2010224427 A | 10/2010 |
| JP | 2011209700 A | 10/2011 |
| KR | 2011-0102838 | 9/2011 |
| TW | M364862 U | 9/2011 |
| WO | WO 2010-115756 A1 | 10/2010 |
| WO | WO 2010-120864 | 10/2010 |
| WO | WO 2010-141261 | 12/2010 |
| WO | WO 2011-056475 | 5/2011 |
| WO | WO 2011-088161 | 7/2011 |
| WO | WO 2011-149715 | 12/2011 |
| WO | WO 2013-142084 | 9/2013 |
| WO | WO 2013-158475 | 10/2013 |

OTHER PUBLICATIONS

3M, Optical Systems Division, Display Solutions for Mobile Devices, includes TBED2-GM, 2012, 3pgs.

Vikuiti, Display Enhancement, Application Guidelines, Jan. 2010, 4 pgs.

International Search Report for PCT International Application No. PCT/US2013/070721, dated Feb. 5, 2014, 3pgs.

* cited by examiner 200 um

OPTICAL DIFFUSING FILMS AND METHODS OF MAKING SAME

CROSS REFERENCE TO RELATED APPLICATIONS

This application is a national stage filing under 35 U.S.C. 371 of PCT/US2013/070721, filed Nov. 19, 2013, which claims priority to U.S. Provisional Application No. 61/728,868, filed Nov. 21, 2012, the disclosure of which is incorporated by reference in its/their entirety herein.

FIELD OF THE INVENTION

This invention relates generally to optical films, with particular application to such films that can be made by microreplication from a tool, and where the tool may be readily tailored to provide the film with a controlled amount of optical diffusion and optical clarity with exceptional spatial uniformity.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Many LCDs include a liquid crystal panel and an extended area light source, often referred to as a backlight, for illuminating the liquid crystal panel. Backlights typically include one or more lamps and a number of light management films such as, for example, light guides, mirror films, light redirecting films (including brightness enhancement films), retarder films, light polarizing films, and diffusing films. Diffusing films are typically included to hide optical defects and improve the brightness uniformity of the light emitted by the backlight. Diffusing films can also be used in applications other than display systems.

DISCUSSION

Some diffusing films use a beaded construction to provide the light diffusion. For example, an optical film may have a layer of microscopic beads adhered to one surface of the film, and the refraction of light at the bead surfaces may operate to provide the light diffusion characteristics of the film. Examples of beaded diffusing films include: a linear prismatic brightness enhancement film with a matte surface of sparsely distributed beads, sold under the product designation TBEF2-GM by 3M Company, referred to herein as a "sparsely distributed beaded diffuser" or "SDB diffuser"; a reflective polarizing film with a beaded diffuser layer, sold under the product designation DBEF-D3-340 by 3M Company, referred to herein as a "densely-packed beaded diffuser" or "DPB diffuser"; and a diffusing cover sheet included in a commercial display device, referred to herein as a "commercial cover sheet diffuser" or "CCS diffuser". FIG. 1 shows a scanning electron microscope (SEM) image of a representative portion of the beaded surface of a CCS diffuser, and FIG. 1A shows an SEM image of such surface in cross-section. FIGS. 2 and 3 show SEM images of representative portions of a DPB diffuser and a SDB diffuser, respectively.

Other diffusing films use a structured surface other than a beaded layer to provide the light diffusion, where the structured surface is made by microreplication from a structured tool. Examples of such diffusing films include: films (referred to herein as "Type I Microreplicated" diffusing films) with rounded or curved structures microreplicated from a tool having corresponding structures made by removing material from the tool with a cutter, as described in US 2012/0113622 (Aronson et al.), US 2012/0147593 (Yapel et al.), WO 2011/056475 (Barbie), and WO 2012/0141261 (Aronson et al.); and films (referred to herein at "Type II Microreplicated" diffusing films) with flat-faceted structures microreplicated from a tool having corresponding structures made by an electroplating process, as described in US 2010/0302479 (Aronson et al.). An SEM image of a representative portion of the structured surface of a Type I Microreplicated diffusing film is shown in FIG. 4, and a similar image of a Type II Microreplicated diffusing film is shown in FIG. 5. Still other microreplicated diffusing films include films in which a tool surface is made to be structured by a sandblasting procedure, and the structured surface is then imparted to the film by microreplication from the tool. See e.g. U.S. Pat. No. 7,480,097 (Nagahama et al.).

BRIEF SUMMARY

In the case of diffusing films having beaded constructions, beads add to the cost of manufacture. Beaded films are also susceptible to downweb, crossweb, and lot-to-lot variability. Furthermore, individual beads can dislodge from the film, e.g. when cutting or converting the film into individual sheets, and the dislodged beads may cause unwanted abrasion in the system of which the diffusing film is a part, e.g. a display or backlight. In the case of Type I Microreplicated diffusing films, the time required to cut a tool of a given size increases rapidly as the feature size of structures on the structured surface is decreased. Feature sizes averaging less than about 15 or 10 microns are desirable in order to avoid an optical artifact known as "sparkle" or granularity when the film is used in modern display systems, and the time required to cut a tool having such small feature sizes for Type I Microreplicated diffusing films can become long or excessive, and can increase manufacturing costs. Furthermore, the cutting approach can tend to introduce a measureable in-plane spatial periodicity to the structured surface (even if the structures on the surface appear to be oriented randomly), which may give rise to moire effects in display applications. In the case of Type II Microreplicated diffusing films, although the manufacturing process can be tailored to provide films with various levels of optical haze, the optical clarity of such films tends to be relatively high (e.g. in comparison to Type I Microreplicated diffusing films), which is sometimes considered disadvantageous because, for a given amount of optical haze, a diffusing film with a higher optical clarity does not hide defects as well as a similar film with a lower optical clarity. This is shown schematically in the optical clarity vs. optical haze graph of FIG. 6, where region 610 represents very roughly an approximate design space of Type I Microreplicated diffusing films, and region 612 represents very roughly an approximate design space of Type II Microreplicated diffusing films. (Optical haze and optical clarity are discussed in more detail below.) In the case of microreplicated diffusing films in which a structured surface is made using a sandblasting procedure, such films tend to have detectable spatial non-uniformities, e.g., patterns or artifacts that are the result of the path taken by the sandblasting jet or nozzle as it scans across the extended surface of the tool.

We have developed a family of optical diffusing films, and methods of making such films, that can overcome one, some, or all of the foregoing difficulties or challenges. The films can be made by fabricating a tool having a structured surface, and microreplicating the structured surface as a major surface of the optical film. Fabrication of the tool can involve electrodepositing a first layer of a metal under conditions that produce a first major surface with a relatively high average roughness, followed by covering up the first layer by electrodepositing a second layer of the same metal on the first layer, under conditions that produce a second major surface with a relatively lower average roughness, i.e., lower than that of the first major surface. The second major surface has a structured topography which, when replicated to form a structured major surface of an optical film, provides the film with a desired combination of optical haze and optical clarity, along with other characteristics related to the topography of the structured surface that can be advantageous when the film is combined with other components in a display, e.g. for avoiding artifacts such as moire, sparkle, graininess, and/or other observable spatial patterns or marks. Before microreplication, the second major surface may be further treated, e.g., coated with a thin layer of a different metal such as for purposes of passivation or protection, but such a coating is preferably thin enough to maintain substantially the same average roughness and topography as the second major surface of the second layer. By forming the structured surface using electrodeposition techniques rather than techniques that require cutting of a substrate with a diamond tool or the like, large area tool surfaces can be prepared in substantially less time and at reduced cost.

As already stated, the structured major surface of the optical film provides the film with a desired amount of optical haze and optical clarity. The structured major surface also preferably has physical properties that avoid or diminish one or more of the artifacts mentioned above. For example, the topography of the structured surface may possess a degree of irregularity or randomness in surface profile characterized by an ultra-low periodicity, i.e., a substantial absence of any significant periodicity peaks in a Fourier spectrum as a function of spatial frequency along each of a first and second orthogonal in-plane direction. Furthermore, the structured surface may comprise discernible structures, e.g. in the form of distinct cavities and/or protrusions, and the structures may be limited in size along two orthogonal in-plane directions. The size of a given structure may be expressed in terms of an equivalent circular diameter (ECD) in plan view, and the structures may have an average ECD of less than 15 microns, or less than 10 microns, or in a range from 4 to 10 microns, for example. In some cases, the structures may have a bimodal distribution of larger structures in combination with smaller structures. The structures may be closely packed and irregularly or non-uniformly dispersed. In some cases, some, most, or substantially all of the structures may be curved or comprise a rounded or otherwise curved base surface. In some cases, some of the structures may be pyramidal in shape or otherwise defined by substantially flat facets. The structures can in at least some cases be characterized by an aspect ratio of the depth or height of the structures divided by a characteristic transverse dimension, e.g. the ECD, of the structures. The structured surface may comprise ridges, which may for example be formed at the junctions of adjacent closely-packed structures. In such cases, a plan view of the structured surface (or of a representative portion thereof) may be characterized in terms of the total ridge length per unit area. The optical haze, optical clarity, and other characteristics of the optical diffusing films can be provided without the use of any beads at or on the structured surface, or elsewhere within the optical film.

The present application therefore discloses methods of making a structured surface. The methods include forming a first layer of a metal by electrodepositing the metal using a first electroplating process resulting in a first major surface of the first layer having a first average roughness. The methods also include forming a second layer of the metal on the first major surface of the first layer by electrodepositing the metal on the first major surface using a second electroplating process resulting in a second major surface of the second layer having a second average roughness smaller than the first average roughness.

The first electroplating process may use a first electroplating solution and the second electroplating process may use a second electroplating solution, and the second electroplating solution may differ from the first electroplating solution at least by the addition of an organic leveler and/or an organic grain refiner. The second electroplating process may include thieving and/or shielding. The method may also include providing a base surface having a base average roughness, and the first layer may be formed on the base surface, and the first average roughness may be greater than the base average roughness. The metal may be copper or other suitable metals. The first electroplating process may use a first electroplating solution that contains at most trace amounts of an organic leveler, for example, the first electroplating solution may have a total concentration of organic carbon less than 100, or 75, or 50 ppm. The first electroplating process may use a first electroplating solution and the second electroplating process may use a second electroplating solution, and a ratio of a concentration of an organic leveler in the second electroplating solution to a concentration of any organic leveler in the first electroplating solution may be at least 50, or 100, or 200, or 500. Forming the first layer may result in the first major surface comprising a plurality of non-uniformly arranged first structures, and the first structures may include flat facets. Forming the second layer may result in the second major surface comprising a plurality of non-uniformly arranged second structures. The method may also include forming a third layer of a second metal on the second major surface by electrodepositing the second metal using an electroplating solution of the second metal. The second metal may comprise chromium.

We also disclose microreplication tools made using such methods, such that the microreplication tool has a tool structured surface corresponding to the second major surface. The tool structured surface may correspond to an inverted form of the second major surface or a non-inverted form of the second major surface. The microreplication tool may include the first layer of the metal, the second layer of the metal, and a third layer of a second metal formed on the second layer.

We also disclose optical films made using such microreplication tools, such that the film has a structured surface corresponding to the second major surface. The structured surface of the film may correspond to an inverted form of the second major surface or a non-inverted form of the second major surface.

We also disclose optical films that include a structured major surface comprising closely-packed structures arranged such that ridges are formed between adjacent structures, the structures being limited in size along two orthogonal in-plane directions. The structured major surface may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The structured major surface may be characterized by a total ridge length per unit area in plan view of less than 200 mm/mm$^2$, or less than 150 mm/mm$^2$, or in a range from 10 to 150 mm/mm$^2$.

The first peak ratio may be less than 0.5 and the second peak ratio may be less than 0.5. The structured major surface may provide an optical haze of at least 5% and less than 95%. The closely-packed structures may be characterized by equivalent circular diameters (ECDs) in plan view, and the structures may have an average ECD of less than 15 microns, or less than 10 microns, or in a range from 4 to 10 microns. The structured major surface may include substantially no beads. At least some, or most, or substantially all of the closely-packed structures may comprise curved base surfaces.

We also disclose optical films that include a structured major surface comprising closely-packed structures, the structured major surface defining a reference plane and a thickness direction perpendicular to the reference plane. The structured major surface may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The closely-packed structures may be characterized by equivalent circular diameters (ECDs) in the reference plane and mean heights along the thickness direction, and an aspect ratio of each structure may equal the mean height of the structure divided by the ECD of the structure; and an average aspect ratio of the structures may be less than 0.15.

The structured major surface may be characterized by a total ridge length per unit area in plan view of less than 200 mm/mm$^2$, or less than 150 mm/mm$^2$, or in a range from 10 to 150 mm/mm$^2$. The first peak ratio may be less than 0.5 and the second peak ratio may be less than 0.5. The structured major surface may provide an optical haze of at least 5% and less than 95%. The closely-packed structures may be characterized by equivalent circular diameters (ECDs) in plan view, and the structures may have an average ECD of less than 15 microns, or less than 10 microns, or in a range from 4 to 10 microns. The structured major surface may include substantially no beads. At least some, or most, or substantially all of the closely-packed structures may comprise curved base surfaces.

We also disclose optical films that include a structured major surface comprising closely-packed structures having curved base surfaces. The structured major surface may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. Furthermore, the structured major surface may provide an optical haze of less than 95%, or less than 90%, or less than 80%, or in a range from 20 to 80%.

The structured major surface may be characterized by a total ridge length per unit area in plan view of less than 200 mm/mm$^2$. The first peak ratio may be less than 0.5 and the second peak ratio may be less than 0.5. The closely-packed structures may be characterized by equivalent circular diameters (ECDs) in plan view, and the structures may have an average ECD of less than 15 microns, or less than 10 microns, or in a range from 4 to 10 microns. The structured major surface may include substantially no beads.

We also disclose optical films that include a structured major surface comprising closely-packed structures. The structured major surface may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The structured major surface may provide an optical haze in a range from 10 to 60% and an optical clarity in a range from 10 to 40%, or an optical haze in a range from 20 to 60% and an optical clarity in a range from 10 to 40%, or an optical haze in a range from 20 to 30% and an optical clarity in a range from 15 to 40%.

The structured major surface may be characterized by a total ridge length per unit area in plan view of less than 200 mm/mm$^2$. The first peak ratio may be less than 0.5 and the second peak ratio may be less than 0.5. The closely-packed structures may be characterized by equivalent circular diameters (ECDs) in plan view, and the structures may have an average ECD of less than 15 microns, or less than 10 microns, or in a range from 4 to 10 microns. The structured major surface may include substantially no beads.

We also disclose optical films that include a structured major surface comprising larger first structures and smaller second structures, the first and second structures both being limited in size along two orthogonal in-plane directions. The first structures may be non-uniformly arranged on the major surface, and the second structures may be closely packed and non-uniformly dispersed between the first structures, and an average size of the first structures may be greater than 15 microns and an average size of the second structures may be less than 15 microns.

The average size of the first structures may be an average equivalent circular diameter (ECD) of the first structures, and the average size of the second structures may be an average equivalent circular diameter (ECD) of the second structures. The average size of the first structures may be in a range from 20 to 30 microns. The average size of the second structures may be in a range from 4 to 10 microns. The structured major surface may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The first ratio may be less than 0.5 and the second ratio may be less than 0.5. The first structures may be flat-faceted structures, and the second structures may be curved structures. The first structures may be first cavities in the major surface, and the second structures may be second cavities in the major surface. The structured major surface may be characterized by a bimodal distribution of equivalent circular diameter (ECD) of structures of the structured surface, the bimodal distribution having a first and second peak, the larger first structures corresponding to the first peak and the smaller second structures corresponding to the second peak. The structured major surface may include substantially no beads.

We also disclose display systems that include a light guide, a display panel configured to be backlit by light from the light guide, one or more prismatic brightness enhancement films disposed between the light guide and the display panel, and a light diffusing film disposed between the light guide and the one or more prismatic brightness enhancement films. The light diffusing film may have a haze of at least 80%, and the light diffusing film may have a first structured major surface made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

The first structured major surface of the light diffusing film may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The first structured major surface of the light diffusing film may comprise closely-packed structures arranged such that ridges are formed between adjacent structures, the structures being limited in size along two orthogonal in-plane directions, and the first structured major surface may be characterized by a total ridge length per unit area in plan view of less than 200 mm/mm$^2$. The first structured major surface of the light diffusing film may comprise closely-packed structures, the structured major surface defining a reference plane and a thickness direction perpendicular to the reference plane, and the closely-packed structures may be characterized by equivalent circular diameters (ECDs) in the reference plane and mean heights along the thickness direction, and an aspect ratio of each structure may equal the mean height of the structure divided by the ECD of the structure; and an average aspect ratio of the structures may be less than 0.15.

The first structured major surface of the light diffusing film may comprise closely-packed structures having curved base surfaces, and the first structured major surface may provide an optical haze of less than 95%. The first structured major surface of the light diffusing film may comprise larger first structures and smaller second structures, the first and second structures both being limited in size along two orthogonal in-plane directions; and the first structures may be non-uniformly arranged on the first structured major surface; the second structures may be closely packed and non-uniformly dispersed between the first structures; and an average size of the first structures may be greater than 15 microns and an average size of the second structures may be less than 15 microns. The light diffusing film may have a second structured major surface opposite the first structured major surface, the second structured major surface made by microreplication from a second tool structured surface, the second tool structured surface being made by forming a third layer of the metal by electrodepositing the metal using a third electroplating process resulting in a major surface of the third layer having a third average roughness, and forming a fourth layer of the metal on the major surface of the third layer by electrodepositing the metal on the third layer using a fourth electroplating process resulting in a major surface of the fourth layer having a fourth average roughness smaller than the third average roughness, the major surface of the fourth layer corresponding to the second tool structured surface. The first structured major surface of the diffusing film may face the display panel and the second structured major surface of the diffusing film may face the light guide, and the first structured major surface may be associated with a first haze and the second structured major surface may be associated with a second haze, and the first haze may be greater than the second haze.

We also disclose optical films that include a first structured major surface opposite a second structured major surface, the first structured major surface being made by microreplication from a first tool structured surface, the first tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

The second structured major surface may be made by microreplication from a second tool structured surface, the second tool structured surface being made by forming a third layer of the metal by electrodepositing the metal using a third electroplating process resulting in a major surface of the third layer having a third average roughness, and forming a fourth layer of the metal on the major surface of the third layer by electrodepositing the metal on the third layer using a fourth electroplating process resulting in a major surface of the fourth layer having a fourth average roughness smaller than the third average roughness, the major surface of the fourth layer corresponding to the second tool structured surface. The first structured major surface may be associated with a first haze and the second structured major surface may be associated with a second haze, and the first haze may be greater than the second haze.

We also disclose display systems that include a light guide, a display panel configured to be backlit by light from the light guide, and a light diffusing film disposed in front of the display system such that the display panel is between the light guide and the light diffusing film. The light diffusing film may have a haze in a range from 10-30%, and the light diffusing film may have a first structured major surface made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

The first structured major surface of the light diffusing film may have a topography characterizable by a first and second Fourier power spectrum associated with respective first and second orthogonal in-plane directions, and (a) to the extent the first Fourier power spectrum includes one or more first frequency peak not corresponding to zero frequency and being bounded by two adjacent valleys that define a first baseline, any such first frequency peak may have a first peak ratio of less than 0.8, the first peak ratio being equal to an area between the first frequency peak and the first baseline divided by an area beneath the first frequency peak, and (b) to the extent the second Fourier power spectrum includes one or more second frequency peak not corresponding to zero frequency and being bounded by two adjacent valleys that define a second baseline, any such second frequency peak may have a second peak ratio of less than 0.8, the second peak ratio being equal to an area between the second frequency peak and the second baseline divided by an area beneath the second frequency peak. The first structured major surface of the light diffusing film may comprise closely-packed structures arranged such that ridges are formed between adjacent structures, the structures being limited in size along two orthogonal in-plane directions, and the first structured major surface may be characterized by a total ridge length per unit area in plan view of less than 200 mm/mm$^2$. The first structured major surface may comprise closely-packed structures, and the structured major surface may provides an optical clarity in a range from 10 to 40%. The first structured major surface may face the front of the display system. The first structured major surface may be a front-most surface of the display system.

Related methods, systems, and articles are also discussed. For example, backlights and displays incorporating the disclosed films are also disclosed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Figure 7:
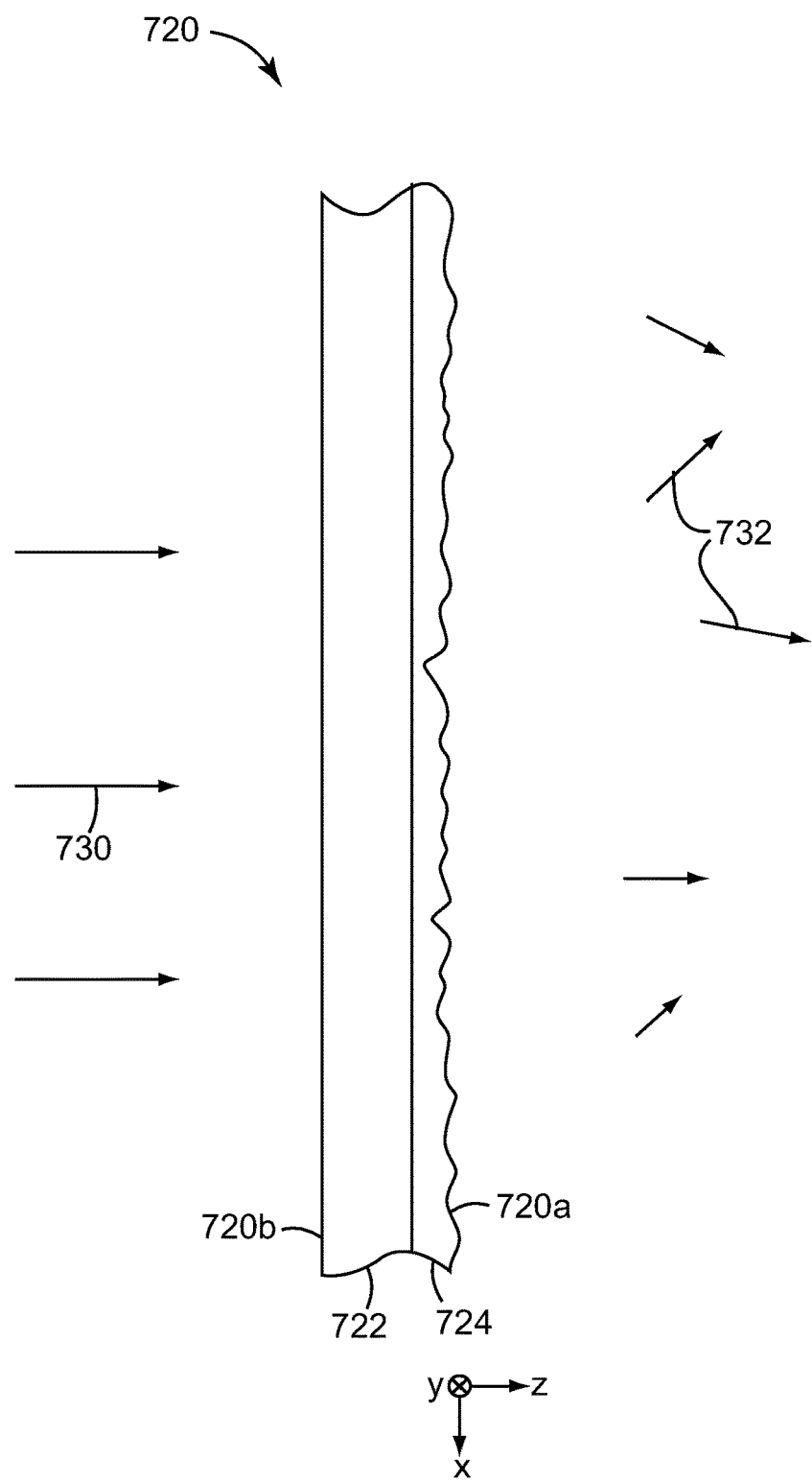
FIG. 7 is a schematic side or sectional view of an optical diffusing film having a structured surface.

FIG. 7 depicts in schematic side or sectional view a portion of a representative diffusing optical film 720 that can be made with the disclosed processes. The film 720 is shown to have a first major surface 720a and a second major surface 720b. Incident light 730 is shown impinging on the film 720 at the second surface 720b. The light 730 passes through the film, and is scattered or diffused as a result of refraction (and to some extent diffraction) at the roughened or structured topography of the major surface 720a, producing scattered or diffuse light 732. We may thus refer to the major surface 720a alternatively as a structured surface 720a. The orientation of the film 720 relative to the incident light 730 may of course be changed such that the light 730 impinges initially on the structured surface 720a, in which case refraction at the structured surface again produces scattered or diffuse light.

The structured surface 720a extends generally along orthogonal in-plane directions, which can be used to define a local Cartesian x-y-z coordinate system. The topography of the structured surface 720a can then be expressed in terms of deviations along a thickness direction (z-axis), relative to a reference plane (the x-y plane) lying parallel to the structured surface 720a. In many cases, the topography of the structured surface 720a is such that distinct individual structures can be identified. Such structures may be in the form of protrusions, which are made from corresponding cavities in the structured surface tool, or cavities, which are made from corresponding protrusions in the structured surface tool. The structures are typically limited in size along two orthogonal in-plane directions, i.e., when the structured surface 720a is seen in plan view, individual structures do not typically extend indefinitely in a linear fashion along any in-plane direction. Whether protrusions or cavities, the structures may also in some cases be closely packed, i.e., arranged such that at least portions of boundaries of many or most adjacent structures substantially meet or coincide. The structures are also typically irregularly or non-uniformly dispersed on the structured surface 720a. In some cases, some, most, or substantially all (e.g., >90%, or >95%, or >99%) of the structures may be curved or comprise a rounded or otherwise curved base surface. In some cases, at least some of the structures may be pyramidal in shape or otherwise defined by substantially flat facets. The size of a given structure may be expressed in terms of an equivalent circular diameter (ECD) in plan view, and the structures of a structured surface may have an average ECD of less than 15 microns, or less than 10 microns, or in a range from 4 to 10 microns, for example. The structured surface and structures can also be characterized with other parameters as discussed elsewhere herein, e.g., by an aspect ratio of the depth or height to a characteristic transverse dimension such as ECD, or the total length of ridges on the surface per unit area in plan view. The optical haze, optical clarity, and other characteristics of the optical diffusing films can be provided without the use of any beads at or on the structured surface, or elsewhere within the optical film.

The film 720 is shown as having a 2-layer construction: a substrate 722 that carries a patterned layer 724. The structured surface 720a is preferably imparted to the patterned layer 724 by microreplication from a structured surface tool, as explained further below. The substrate 722 may for example be a carrier film on which the patterned layer 724 has been cast and cured. Curing of the material used to form the layer 724 can be carried out with ultraviolet (UV) radiation, with heat, or in any other known way. As an alternative to casting-and-curing, the structured surface 720a may be imparted from the tool to the patterned layer 724 by embossing a thermoplastic material with sufficient heat and pressure.

The film 720 need not have the 2-layer construction of FIG. 7, but may instead include more than 2 layers, or it may be unitary in construction, composed of only a single layer. Typically, the layer or layers that make up the optical diffusing film are highly transmissive to light, at least to light over a majority of the visible spectrum. Such layer or layers thus typically have a low absorption for such light. Exemplary materials for use as a carrier film or substrate 722 include light-transmissive polymers such as polyacrylates and polymethacrylates, polycarbonate, polyethylene terephthalate, polyethylene naphthalate, polystyrene, cyclo olefin polymers, and co-polymers or combinations of these polymer classes. Exemplary materials for use as a patterned layer 724 include light transmissive polymers such as acrylate and epoxy resins. However, other polymer materials, as well as non-polymer materials, may also be used. The layer or layers may have any suitable index of refraction, for example in a range from 1.4 to 1.8, or from 1.5 to 1.8, or from 1.5 to 1.7, but values outside this range can also be used. The index of refraction may be specified at 550 nm, or at another suitable design wavelength, or it may be an average over the visible wavelength range. Furthermore, if desired, one or more of the layers may include one or more dye(s), pigment(s), and/or other absorbing agents to provide the film with an overall target transmission, color, or tint. Beads such as glass or ceramic microspheres, or other scattering agents, may also be included if desired, however, the disclosed optical diffusing films may provide the desired amount of haze and clarity without the use of any significant number of beads, e.g., without any beads.

As mentioned, the optical diffusing film 720 may have two or more layers. For example, the substrate 722 may be or comprise a multilayer optical film in which tens, hundreds, or thousands of individual microlayers of different refractive index are arranged in optical repeat units (e.g., an alternating A B A B pattern) to selectively transmit and reflect light as a function of wavelength, incidence angle, and polarization. The multilayer optical film may be a reflective polarizer, for example. The substrate 722 may also be laminated to another optical film or substrate with an optically clear adhesive or other suitable bonding material. The substrate 722 may be or comprise a thin flexible polymer sheet, e.g. with a minimal thickness as desired in low-profile applications, or it may be or comprise a relatively thick layer, including in some cases a rigid plate that can provide mechanical stability or support. The major surface 720b may be substantially flat and smooth as shown, and exposed to air, or it may be non-flat and non-smooth. For example, it may have a prismatic pattern, such as the linear prisms shown in FIG. 12 below.

In other embodiments, the optical diffusing film 720 may be configured such that not only one major surface but both opposed major surfaces are structured surfaces formed by methods disclosed herein (see FIG. 9 below), wherein a given structured major surface of the optical film is made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface. For example, a second patterned layer, the same as or similar to patterned layer 724, may be added on the other side of the optical diffusing film 720 at the surface 720b. The structured surface tools used to make the opposed major surfaces of such an optical diffusing film may be the same or similar, such that the haze provided by each major surface in isolation is about the same. Alternatively, the structured surface tools used to make the opposed major surfaces of the film may be substantially different, such that the haze provided by one major surface (in isolation) is substantially greater than that provided by the other major surface (in isolation). In any case, the overall haze and clarity of the optical film as a whole is a combination of the individual hazes and clarifies (respectively) associated with the opposed major surfaces.

The structured surface 720a of the optical diffusing film is typically exposed to air such that light is refracted in different directions at its surface, but in other embodiments coatings or other layers can be applied to the structured surface 720a. One such coating is a quarter-wave anti-reflective (AR) coating, which may have a refractive index between that of the patterned layer 724 and air. Such an AR coating may be thin enough to substantially maintain the topography of the structured surface, whereby light diffusing characteristics (haze and clarity) for transmitted light are substantially unchanged. Thicker coatings and layers can also be applied such that the structured surface 720a is embedded between the patterned layer 724 and a planarization layer; however, the planarization layer preferably has a substantially different refractive index than that of the patterned layer so that adequate refraction occurs at the surface 720a to provide the desired amount of haze and clarity. Refraction and haze can be maximized or increased by increasing the refractive index difference between the patterned layer 724 and the planarization layer. This may be accomplished by making the planarization layer out of an ultra-low index (ULI) material, which may have a nanovoided morphology to achieve the ultra-low refractive index. Such nanovoided ULI materials may have a refractive index of less than 1.4, or less than 1.3, or less than 1.2, or in a range from 1.15 to 1.35. Many such ULI materials may be described as porous materials or layers. When used in combination with more common optical polymer materials that are not nanovoided, and that have substantially higher refractive indices such as greater than 1.5 or greater than 1.6, a relatively large refractive index difference Δn can be provided across the embedded structured surface. Suitable ULI materials are described e.g. in WO 2010/120864 (Hao et al.) and WO 2011/088161 (Wolk et al.), which are incorporated herein by reference.

Among the various parameters that can be used to characterize the optical behavior of a given optical diffusing film, two key parameters are optical haze and optical clarity. Light diffusion or scattering can be expressed in terms of "optical haze", or simply "haze". For a film, surface, or other object that is illuminated by a normally incident light beam, the optical haze of the object refers essentially to the ratio of transmitted light that deviates from the normal direction by more than 4 degrees to the total transmitted light as measured, for example, using a Haze-Gard Plus haze meter (available from BYK-Gardner, Columbia, Md.) according to the procedure described in ASTM D1003, or with a substantially similar instrument and procedure. Related to optical haze is optical clarity, which is also measured by the Haze-Gard Plus haze meter from BYK-Gardner, but where the instrument is fitted with a dual sensor having a circular middle sensor centered within an annular ring sensor, the optical clarity referring to the ratio $(T_1-T_2)/(T_1+T_2)$, where $T_1$ is the transmitted light sensed by the middle sensor and $T_2$ is the transmitted light sensed by the ring sensor, the middle sensor subtending angles from zero to 0.7 degrees relative to an axis normal to the sample and centered on the tested portion of the sample, and the ring sensor subtending angles from 1.6 to 2 degrees relative to such axis, and where the incident light beam, with no sample present, overfills the middle sensor but does not illuminate the ring sensor (underfills the ring sensor by a half angle of 0.2 degrees).

The optical diffusing films that can be made with the disclosed processes can be used in a wide variety of possible end-use applications. One application of particular interest is electronic display systems. One such display system, a liquid crystal display 802, is shown schematically in FIG. 8. The display 802 is instructive because it shows a number of different components that can incorporate the disclosed optical diffusing films and structured surfaces. The display 802 includes a light guide, a bottom diffuser, prismatic brightness enhancement films (BEF films), a liquid crystal display (LCD) panel, and a front film, arranged as shown in the figure. The display also typically includes one or more visible light sources (e.g. white LED(s), or red/green/blue LED(s), or a white CCFL (cold cathode fluorescent) source) (not shown) disposed proximate the light guide to inject light into the light guide. A user 801 is disposed in front of the display 802 to view the images it generates. The display 802 need not include every component shown in FIG. 8, and it may include additional components. For example, in alternative embodiments, the display 802 may omit the bottom diffuser, or one or both of the BEF films, or the front film. Alternative embodiments may also incorporate additional components, such as multiple different types of front films, or a reflective polarizing film, or a high reflectivity mirror film (for placement behind the light guide), for example.

One or more optical diffusing film as disclosed herein can be included in the display 802 as a stand-alone component, e.g. as a film like that shown in FIG. 7, with one flat major surface and an opposed structured major surface that diffuses light, or with both opposed major surfaces being structured surfaces that diffuse light. Alternatively or in addition, one or more optical diffusing film as disclosed herein can be included in the display 802 as part of another component or film, e.g. when combined with a prismatic BEF film as shown and described in connection with FIG. 12 below.

One use of optical diffusing films disclosed herein is as the bottom diffuser in the display 802. Due to the proximity of the bottom diffuser to the light guide, and because light guides can be highly spatially non-uniform in brightness over their output surface, e.g. as a result of discrete extractor dots provided on the output surface of the light guide, it is often desirable for the bottom diffuser to have a high haze, e.g., greater than 80% or greater than 90% haze. However, the bottom diffuser may alternatively have a haze outside these ranges.

In some cases, e.g. in order to provide high overall haze for a bottom diffuser, it may be desirable to design the optical diffusing film such that both opposed major surfaces of the film are structured surfaces formed by the methods disclosed herein. Both major surfaces may thus be structured as described herein to provide (in isolation) desired amounts of light diffusion, and the overall light diffusion provided by the film (e.g. in terms of haze and clarity) is then a combination of the light diffusion provided by these surfaces. The major surfaces may be structured in similar ways, e.g., they may have similar average roughnesses, and may be individually associated with similar amounts of haze. Alternatively, the major surfaces may be structured in substantially different ways, e.g., they may have substantially different average roughnesses, and may be individually associated with substantially different amounts of haze. In such alternative embodiments, the optical diffusing film, when used as a bottom diffuser between a light guide and a display panel, may be oriented such that a first structured major surface of the diffusing film faces the display panel and the second structured major surface of the diffusing film faces the light guide, and such that the first structured major surface is associated with a first haze and the second structured major surface is associated with a second haze, the first haze being greater than the second haze. That is, the structured major surface facing the display panel may have a greater average roughness than the structured major surface facing the light guide. The roughness provided by the structured surface facing the light guide may help to avoid wet-out artifacts when the optical diffusing film is placed in contact with the light guide. The opposite orientation, in which the structured major surface facing the light guide has a greater average roughness than the structured major surface facing the display panel, is also contemplated.

Another use of an optical diffusing film as disclosed herein is in combination with one or more of the BEF films in the display 802. The optical diffusing film may be used as a backside coating on only one, or on both, of the BEF films. In an exemplary construction, the optical diffusing film may be used as a backside coating on only the BEF film that is nearest the front of the display 802. Use of the optical diffusing film as a backside coating on a BEF film is described in connection with FIG. 12 below. When used in combination with a BEF film, it is often desirable for the diffusing film to have a low haze, e.g., a haze of 10% or less. However, the diffusing film may alternatively have a haze outside this range.

Figure 8:
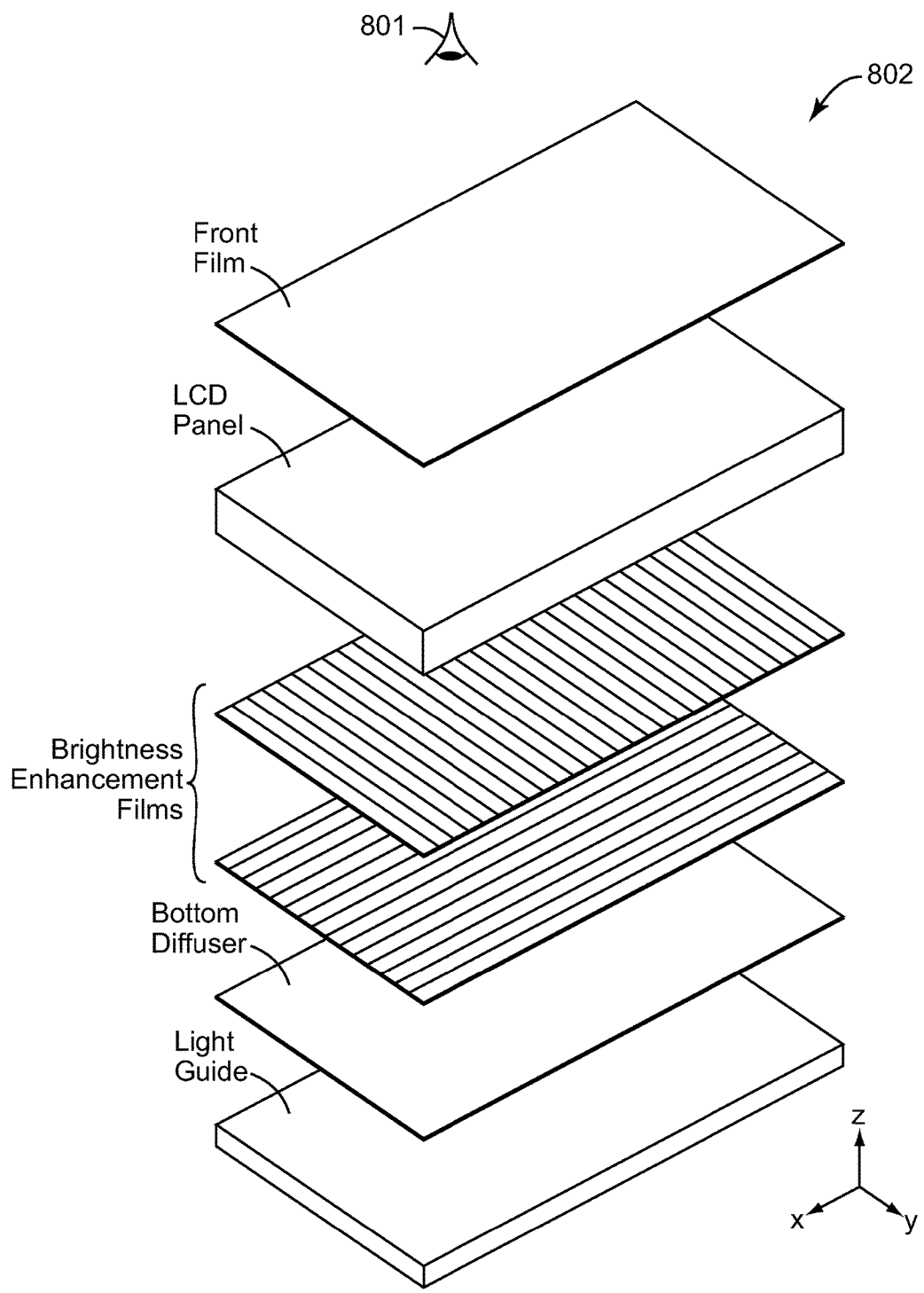
FIG. 8 is a schematic exploded view of a liquid crystal display system, containing various optical films.

Still another use of an optical diffusing film as disclosed herein is in combination with one or more front film in the display 802. Although only one front film is shown in FIG. 8, multiple front films may be used. Front film(s) are disposed between the LCD panel and the user 801. One useful front film is a privacy film, which restricts the cone of viewing angles over which the image formed by the LCD panel can be perceived. Another useful front film is an anti-reflective (AR) film. Anti-reflective films may incorporate a quarter-wave low index coating, or more complex multi-layered interference coatings, to reduce surface reflections by the mechanism of optical interference. Still another useful front film is an anti-glare film. Anti-glare films reduce glare through the mechanism of optical scattering or diffusion. Yet another useful film is a protection film. Protection films may provide scratch-resistance or abrasion-resistance by incorporating a hard coat on the film. Front film functionalities can be combined, e.g. a single front film may provide both anti-glare and privacy functionality. The structured major surface of the disclosed optical diffusing films can be used in any one or more of the front films that may be included in display 802. When used in or as a front film, it is often desirable for the diffusing film to have a medium low haze, e.g. a haze in a range from 10-30%. Haze values outside of this range may however also be used. The disclosed structured major surfaces that provide optical diffusion may be used as the front-most major surface of the front-most front film. That is, the major surface of the display that is immediately accessible to the user 801, which the user 801 may readily touch with a finger or stylus, for example, may incorporate the light-diffusing structured surfaces disclosed herein.

When an optical diffusing film is used in combination with other films and components, e.g. as in the display 802, undesirable optical artifacts may arise. Stated differently, if two different optical diffusing films of different design are both tailored to have the same optical haze and clarity values, those films may nevertheless provide very different visual results when placed in an optical display or other system. The visual results may differ with respect to optical artifacts including those known as "sparkle" and moire. "Sparkle" may arise when an optical film is laid atop or against a second film, layer, or object whose major surface is patterned in some fashion. "Sparkle" refers to an optical artifact that appears as a grainy texture (texture mura) that consists of small regions of bright and dark luminance in what appears to be a random pattern. The position of the bright and dark regions can vary as the viewing angle changes, making the texture especially evident and objectionable to a viewer. Sparkle can appear as a result of an optical interaction between some types of non-smooth surfaces and another structure in proximity to it. To avoid the sparkle artifact, it is desirable to utilize structures on the surface that are <100 microns, or which have very little periodicity, or which do not form micro-images of the proximate structure, or any combination of these attributes.

A moire pattern is a known optical artifact commonly associated overlapping window screens or the like, but moire patterns can also arise when combining an optical film with a second film, layer, or object that is patterned in some fashion. In modern displays, the liquid crystal display panel itself is pixelated, and possesses one periodic pattern. BEF films are also often included in displays, and these also possess periodicity associated with the pitch or spacing of the linear prisms. If an optical film such as an optical diffusing film is inserted into the display, any spatial periodicity possessed by the optical film can interact with the periodicity of the display panel, the periodicity of the BEF films, or the periodicity of any other component in the system to produce moire pattern(s). Such patterns are highly undesirable in display applications. Therefore, in an optical diffusing film made from a structured surface, it is desirable for the structured surface to have little or no spatial periodicity.

Figure 6:
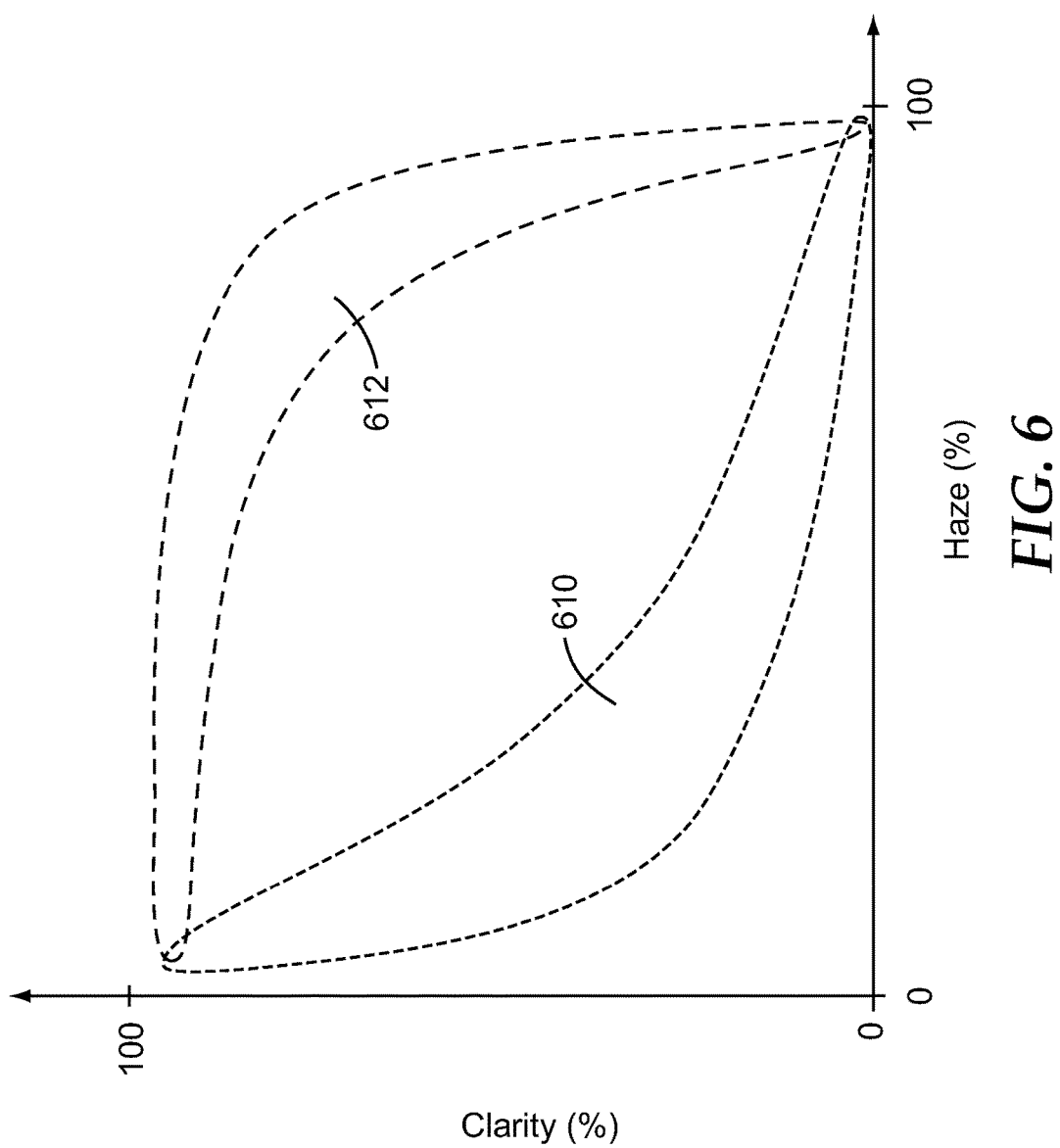
FIG. 6 is a graph of optical clarity vs. optical haze, depicting approximate design spaces for Type I and Type II Microreplicated diffusing films.

We have developed a process that can be used to form structured surfaces that are well suited for making high performance optical diffusing films. The process can produce a structured surface in a microreplication tool of considerable surface area, e.g., a surface area at least as large as that of a typical desktop computer display screen, in a period of time that is short compared to the time it would take to produce a structured surface of equal area and comparable feature size by cutting features in a substrate with a cutting tool. This is because the process can employ electroplating techniques rather than cutting techniques to produce the structured surface. (However, in some cases described further below, electroplating can be used in addition to cutting.) The process can be tailored to produce a wide variety of structured surfaces, including structured surfaces that provide very high haze (and low clarity), structured surfaces that provide very low haze (and high clarity), and structured surfaces in between these extremes. The process can utilize a first electroplating procedure in which a preliminary structured surface is produced, the preliminary structured surface corresponding substantially to that of a Type II Microreplicated diffusing film discussed above. Recall in connection with FIG. 6 that Type II Microreplicated diffusing films cover a general design space that has relatively high optical clarity. We have found that by covering the preliminary structured surface with a second electrodeposited layer using a second electroplating procedure, a second structured surface is obtained, and the second structured surface can produce diffusing films of high, low, or intermediate haze, depending on process conditions; however, diffusing films made from the second structured surface are different from those made from the preliminary structured surface. In particular, interestingly, diffusing films made from the second structured surface fall within a general design space having a substantially lower clarity (for intermediate values of haze) than the design space for Type II Microreplicated diffusing films. This will be shown in connection with optical diffusing films made in accordance with the developed process. At least some of the optical diffusing films are also shown to possess other desirable characteristics, including a topography characterized by little or no spatial periodicity, and average feature sizes less than 15 microns, or less than 10 microns.

Figure 9:
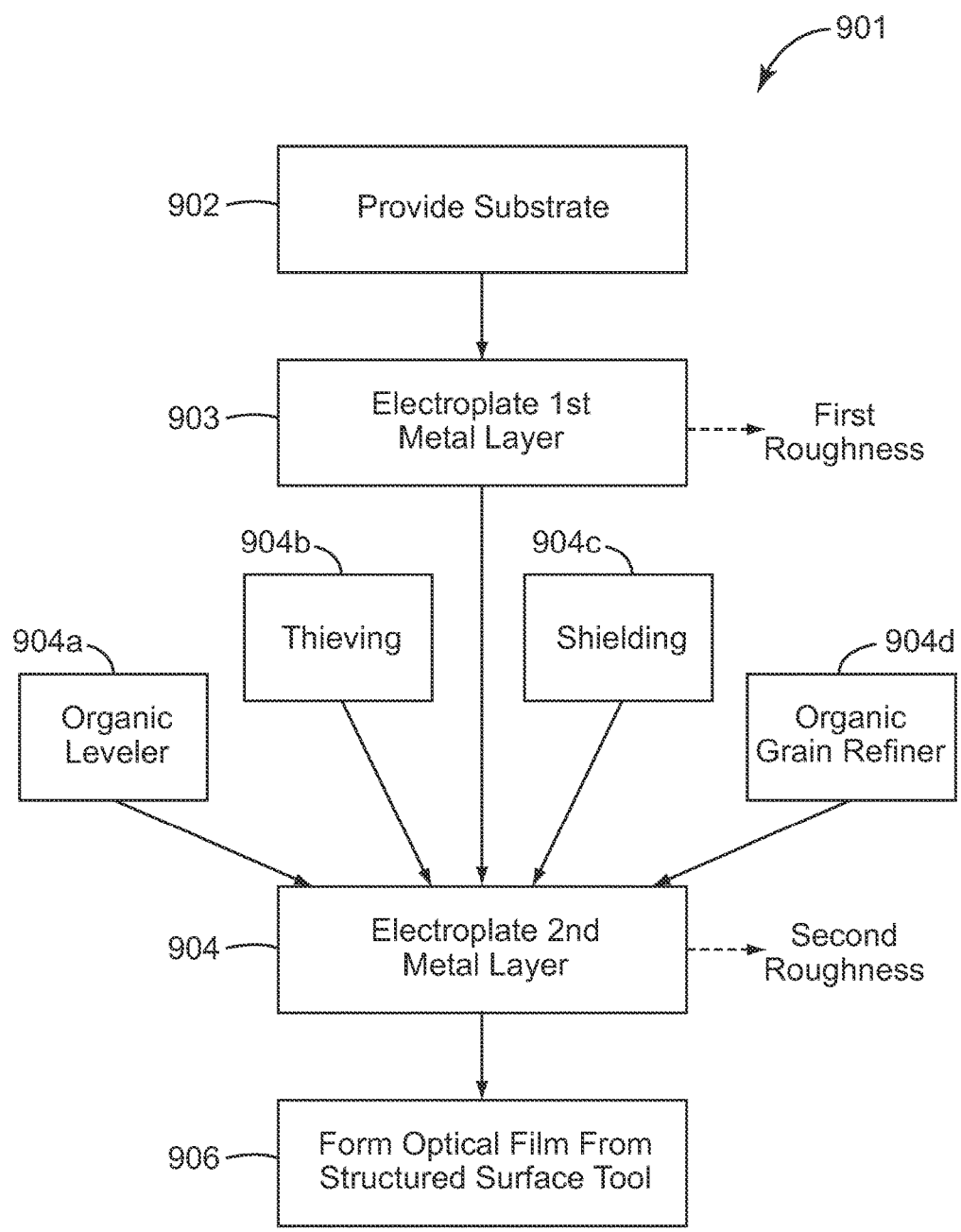
FIG. 9 is a schematic flow diagram depicting steps used to make structured surface articles, including structured surface tools and structured surface optical films.

FIG. 9 shows an exemplary version 901 of the process. In a step 902 of the process, a base or substrate is provided that can serve as a foundation upon which metal layers can be electroplated. The substrate can take one of numerous forms, e.g. a sheet, plate, or cylinder. Circular cylinders are advantageous in that they can be used to produce continuous roll goods. The substrate is typically made of a metal, and exemplary metals include nickel, copper, and brass. Other metals may however also be used. The substrate has an exposed surface ("base surface") on which electrodeposited layers will be formed in subsequent steps. The base surface may be smooth and flat, or substantially flat. The curved outer surface of a smooth polished cylinder may be considered to be substantially flat, particularly when considering a small local region in the vicinity of any given point on the surface of the cylinder. The base surface may be characterized by a base average roughness. In this regard, the surface "roughness" of the base surface, or the "roughness" of other surfaces mentioned herein, may be quantified using any generally accepted roughness measure, such as average roughness $R_a$ or root mean squared roughness $R_{rms}$, and the roughness is assumed to be measured over an area large enough to be fairly representative of the entire relevant area of the surface at issue.

In a step 903 of the process 901, a first layer of a metal is formed on the base surface of the substrate using a first electroplating process. Before this step is initiated, the base surface of the substrate may be primed or otherwise treated to promote adhesion. The metal may be substantially the same as the metal of which the base surface is composed. For example, if the base surface comprises copper, the first electroplated layer formed in step 903 may also be made of copper. To form the first layer of the metal, the first electroplating process uses a first electroplating solution. The composition of the first electroplating solution, e.g., the type of metal salt used in the solution, as well as other process parameters such as current density, plating time, and substrate speed, are selected so that the first electroplated layer is not formed smooth and flat, but instead has a first major surface that is structured, and characterized by irregular flat-faceted features. The size and density of the irregular features are determined by the current density, plating time, and substrate speed, while the type of metal salt used in the first electroplating solution determines the geometry of the features. Further teaching in this regard can be found in patent application publication US 2010/0302479 (Aronson et al.). The first plating process is carried out such that the first major surface of the first electroplated layer has a first average roughness that is greater than the base average roughness of the substrate. The structured character and roughness of a representative first major surface can be seen in the SEM image of FIG. 5, which shows the structured surface of a Type II Microreplicated diffusing film, the film being microreplicated from the first major surface of a first electroplated layer made in accordance with step 903.

After the first electroplated layer of the metal is made in step 903, with its structured major surface of first average roughness, a second electroplated layer of the metal is formed in step 904 using a second electroplating process. The second layer of the metal covers the first electroplated layer, and, since their compositions may be substantially the same, the two electroplated layers may no longer be distinguishable, and the first major surface of the first layer may become substantially obliterated and no longer detectable. Nevertheless, the second electroplating process differs from the first electroplating process in such a way that the exposed second major surface of the second electroplated layer, although structured and non-flat, has a second average roughness that is less than the first average roughness of the first major surface. The second electroplating process may differ from the first electroplating process in a number of respects in order to provide the second major surface with a reduced roughness relative to the first major surface.

In some cases, the second electroplating process of step 904 may use a second electroplating solution that differs from the first electroplating solution in step 903 at least by the addition of an organic leveler, as shown in box 904a. An organic leveler is a material that introduces into a plating bath an ability to produce deposits relatively thicker in small recesses and relatively thinner on small protrusions with an ultimate decrease in the depth or height of the small surface irregularities. With a leveler, a plated part will have greater surface smoothness than the basis metal. Exemplary organic levelers may include, but are not limited to, sulfonated, sulfurized hydrocarbyl compounds; allyl sulfonic acid; polyethylene glycols of various kinds; and thiocarbamates, including bithiocarbamates or thiourea and their derivatives. The first electroplating solution may contain, at most, trace amounts of an organic leveler. The first electroplating solution may have a total concentration of organic carbon less than 100, or 75, or 50 ppm. A ratio of a concentration of an organic leveler in the second electroplating solution to a concentration of any organic leveler in the first electroplating solution may be at least 50, or 100, or 200, or 500, for example. The average roughness of the second major surface can be tailored by adjusting the amount of organic leveler in the second electroplating solution.

The second electroplating process of step 904 may also or alternatively differ from the first electroplating process of step 903 by including in the second step 904 at least one electroplating technique or feature whose effect is to reduce the roughness of the second major surface relative to the first major surface. Thieving (box 904b) and shielding (box 904c) are examples of such electroplating techniques or features. Furthermore, in addition to or instead of an organic leveler, one or more organic grain refiners (box 904d) may be added to the second electroplating solution to reduce the average roughness of the second major surface.

After step 904 is completed, the substrate with the first and second electroplated layers may be used as an original tool with which to form optical diffusing films. In some cases the structured surface of the tool, i.e., the structured second major surface of the second electroplated layer produced in step 904, may be passivated or otherwise protected with a second metal or other suitable material. For example, if the first and second electroplated layers are composed of copper, the structured second major surface can be electroplated with a thin coating of chromium. The thin coating of chromium or other suitable material is preferably thin enough to substantially preserve the topography and the average roughness of the structured second major surface.

Rather than using the original tool itself in the fabrication of optical diffusing films, one or more replica tools may be made by microreplicating the structured second major surface of the original tool, and the replica tool(s) may then be used to fabricate the optical films. A first replica made from the original tool will have a first replica structured surface which corresponds to, but is an inverted form of, the structured second major surface. For example, protrusions in the structured second major surface correspond to cavities in the first replica structured surface. A second replica may be made from the first replica. The second replica will have a second replica structured surface which corresponds to, and is a non-inverted form of, the structured second major surface of the original too.

After step 904, after the structured surface tool is made, optical diffusing films having the same structured surface (whether inverted or non-inverted relative to the original tool) can be made in step 906 by microreplication from the original or replica tool. The optical diffusing film may be formed from the tool using any suitable process, including e.g. embossing a pre-formed film, or cast-and-curing a curable layer on a carrier film.

Figure 10:
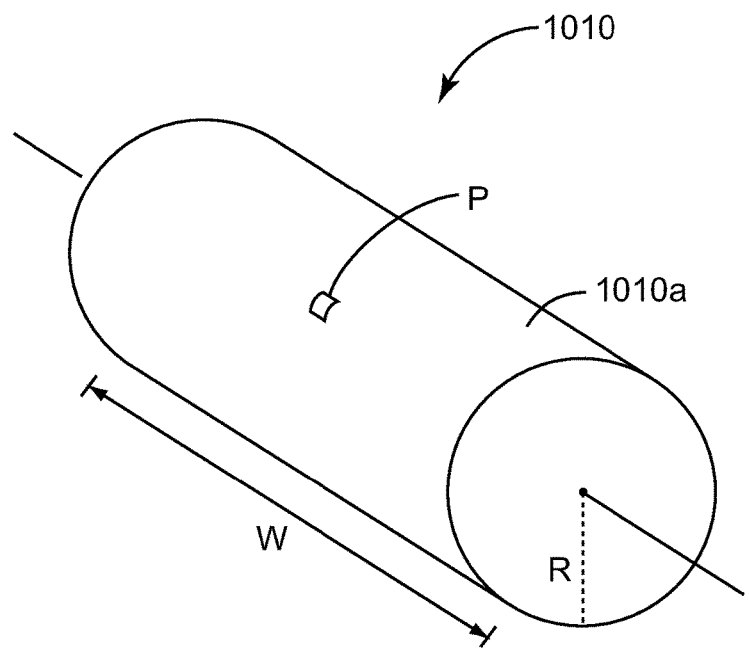
FIG. 10 is a schematic perspective view of a structured surface tool in the form of a cylinder or drum.

Turning now to FIG. 10, pictured there is a schematic view of a structured surface tool 1010 in the form of a cylinder or drum. The tool 1010 has a continuous major surface 1010a that we assume has been processed in accordance with the method of FIG. 9 so that it has an appropriately structured surface. The tool has a width w and a radius R. The tool can be used in a continuous film manufacturing line to make optical diffusing film by microreplication. A small portion P of the tool 1010, or of an identical tool, is shown schematically in FIG. 11A.

Figure 11A:
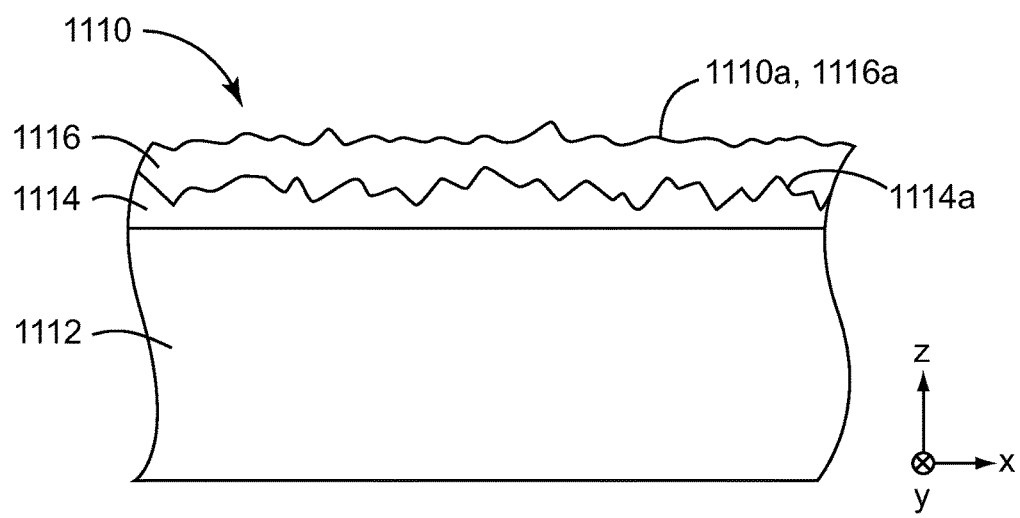
FIG. 11A is a schematic side or sectional view of a portion of the tool of FIG. 10.

In FIG. 11A, a structured surface tool 1110, assumed to be identical to tool 1010, is shown in schematic cross-section. Having been made by the process of FIG. 9, the tool 1110 is shown in the figure as including a substrate 1112, a first electroplated layer 1114 of a metal having a structured first major surface 1114a, and a second electroplated layer 1116 of the metal, the second layer 1116 having a structured second major surface 1116a which coincides with the structured major surface 1110a of the tool 1110. In accordance with the teachings of FIG. 9, the second major surface 1116a is structured or non-smooth, and it has an average roughness less than that of the first major surface 1114a. The first major surface 1114a, and the distinct layers 1114, 1116, are shown for reference purposes in FIG. 11a, however, as noted above, the formation of the second electroplated layer 1116 atop the first electroplated layer 1114 may render the first major surface 1114a, and the distinction between layers 1114 and 1116, undetectable.

Figure 11B:
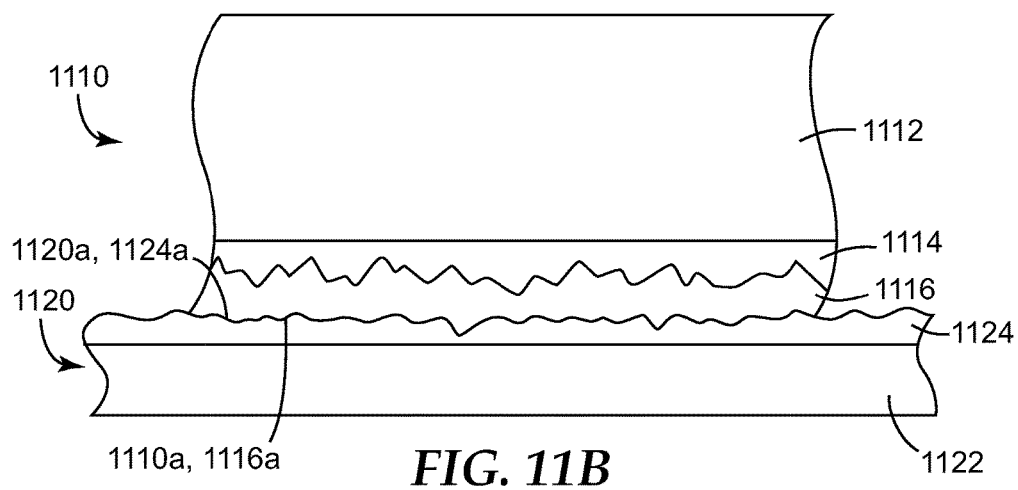
FIG. 11B is a schematic side or sectional view of the tool portion of FIG. 11A during a microreplication procedure in which it is used to make the structured surface of an optical diffusing film.

In FIG. 11B, we show a schematic view of the tool 1110 of FIG. 11A during a microreplication procedure in which it is used to make the structured surface of an optical diffusing film 1120. Like reference numerals from FIG. 11A designate like elements, and need not be discussed further. During microreplication, the film 1120 is pressed against the tool 1110 so that the structured surface of the tool is transferred (in inverted form) with high fidelity to the film. In this case, the film is shown to have a base film or carrier film 1122 and a patterned layer 1124, but other film constructions can also be used. The patterned layer may be for example a curable material, or a thermoplastic material suitable for embossing. The microreplication process causes the major surface 1120a of the optical film 1120, which coincides with the major surface 1124a of the patterned layer 1124, to be structured or roughened in corresponding fashion to the structured major surface 1110a of the tool.

Figure 11C:
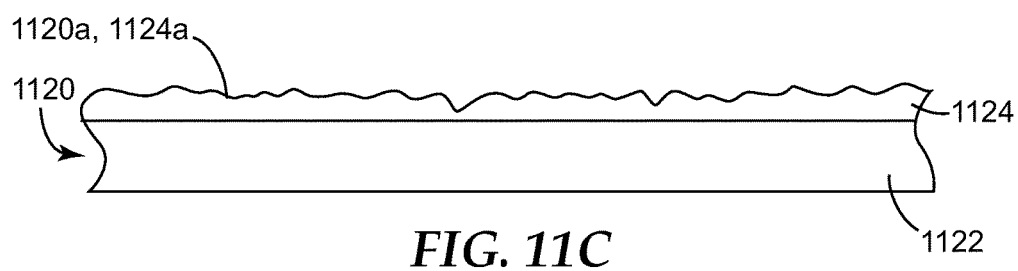
FIG. 11C is a schematic side or sectional view of a portion of the optical diffusing film made which results from the microreplication procedure depicted in FIG. 11B.

In FIG. 11C, the optical film 1120 made in the microreplication procedure of FIG. 11B is shown separated from the tool 1110. The film 1120, which may be the same as or similar to optical diffusing film 720 of FIG. 7, may now be used as an optical diffusing film.

Figure 12:
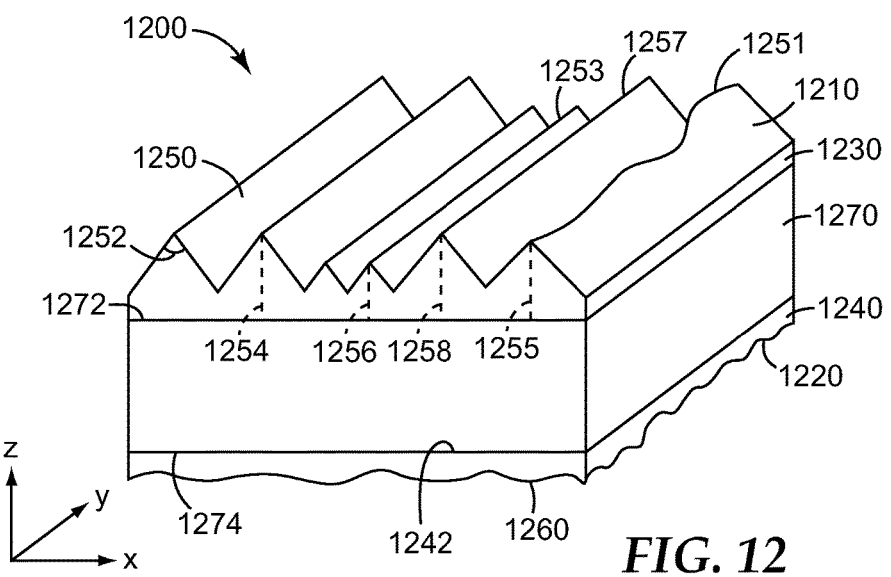
FIG. 12 is a schematic perspective view of an optical diffusing film that also includes on an opposed major surface of linear prisms for brightness enhancement.

The disclosed optical diffusing films may be stand-along diffusing films, as suggested by the views of FIGS. 7 and 11C, or they may be combined with other optical films or components to provide additional functionality. In FIG. 12, an optical diffusing film, in the form of a backside coating having a structured surface as disclosed herein, is combined with a linear prismatic BEF film, to provide a dual function light redirecting optical film 1200. The optical diffusing film or backside coating in such an embodiment typically provides a relatively low amount of haze, e.g., a haze of 10% or less.

The optical film 1200 includes a first major surface 1210 that includes a plurality of prisms or other microstructures 1250 that extend along the y-direction. The optical film 1200 also includes a second major surface 1220 that is opposite the first major surface 1210, and that is structured in accordance with the method of FIG. 9. The second major surface 1220 may include individual microstructures 1260.

The optical film 1200 also includes a substrate layer 1270 that is disposed between the major surfaces 1210, 1220, and that includes a first major surface 1272 and an opposing second major surface 1274. The optical film 1200 also includes a prism layer 1230 disposed on the first major surface 1272 of the substrate layer and includes the first major surface 1210 of the optical film, and a patterned layer 1240 disposed on the second major surface 1274 of the substrate layer and includes the second major surface 1220 of the optical film. The patterned layer 1240 has a major surface 1242 opposite the major surface 1220.

The optical film 1200 includes three layers 1230, 1270, and 1240. In general, however, the optical film 1200 can have one or more layers. For example, in some cases, the optical film can have a single layer that includes respective first and second major surfaces 1210 and 1220. As another example, in some cases, the optical film 1200 can have many layers. For example, in such cases, the substrate 1270 can have multiple layers.

Microstructures 1250 are primarily designed to redirect light that is incident on major surface 1220 of the optical film, along a desired direction, such as along the positive z-direction. In the exemplary optical film 1200, microstructures 1250 are prismatic linear structures. In general, microstructures 1250 can be any type of microstructures that are capable of redirecting light by, for example, refracting a portion of an incident light and recycling a different portion of the incident light. For example, the cross-sectional profiles of microstructures 1250 can be or include curved and/or piece-wise linear portions. For example, in some cases, microstructures 1250 can be linear cylindrical lenses extending along the y-direction.

Each linear prismatic microstructure 1250 includes an apex angle 1252 and a height 1254 measured from a common reference plane such as, for example, major plane surface 1272. In some cases, such as when it is desirable to reduce optical coupling or wet-out and/or improve durability of the optical film, the height of a prismatic microstructure 1250 can change along the y-direction. For example, the prism height of prismatic linear microstructure 1251 varies along the y-direction. In such cases, prismatic microstructure 1251 has a local height that varies along the y-direction, a maximum height 1255, and an average height. In some cases, a prismatic linear microstructure, such as linear microstructure 1253, has a constant height along the y-direction. In such cases, the microstructure has a constant local height that is equal to the maximum height and the average height.

In some cases, such as when it is desirable to reduce optical coupling or wet-out, some of the linear microstructures are shorter and some of the linear microstructures are taller. For example, height 1256 of linear microstructure 1253 is smaller than height 1258 of linear microstructure 1257.

Apex or dihedral angle 1252 can have any value that may be desirable in an application. For example, in some cases, apex angle 1252 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degree to about 92 or 91 degrees, such as 90 degrees.

Prism layer 1230 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when the optical film 1200 is used in a liquid crystal display system, the optical film 1200 can increase or improve the brightness of the display. In such cases, the optical film has an effective transmission or relative gain that is greater than 1. Effective transmission, in this regard, refers to the ratio of the luminance of the display system with the film in place in the display system to the luminance of the display without the film in place.

In an alternative embodiment to that of FIG. 12, the prism layer 1230 can be replaced with a second patterned layer which may be the same as or similar to patterned layer 1240. Then, both the patterned layer 1240 and the second patterned layer may have structured surfaces that are fabricated according to the method of FIG. 9. The structured surfaces may be configured to provide (in isolation) respective haze values that are the same or substantially the same, or that are substantially different.

EXAMPLES

A number of optical diffusing film samples were made according to methods as shown in FIG. 9. Thus, in each case, a structured surface tool was made under a set of process conditions, and then the structured surface of the tool was microreplicated to form a corresponding structured surface (in inverted form) as a major surface of the optical film. (The opposed major surface of each optical film was flat and smooth.) The structured surface provided each optical film with a given amount of optical haze and optical clarity. The haze and clarity of each optical diffusing film sample was measured with the Haze-Gard Plus haze meter from BYK-Gardiner. The following table sets forth some of the chemical solutions that were used during the fabrication of various samples, as explained further below:

Preliminary Tool

A copper-coated cylinder, having a diameter of 16 inches and a length of 40 inches, was used as a base for the construction of a tool. The tool, which is referred to here as a preliminary tool because it was made using only one of the electroplating steps shown in FIG. 9, was first degreased with a mild alkaline cleaning solution, deoxidized with a sulfuric acid solution, and then rinsed with deionized water. The composition of the alkaline cleaner, as well as the compositions of other relevant solutions, are shown in Table 1. The preliminary tool was then transferred while wet to a copper plating tank (Daetwyler Cu Master Junior 18). It was rinsed with approximately 1 liter of the sulfuric acid solution at the start of the plating cycle to remove surface oxide. The preliminary tool was then immersed at a 50% level in the first copper bath. The bath temperature was 25° C. The copper bath was treated with carbon-filled canisters to remove organic contamination. Effectiveness of the treatment was verified both by using a 1000 mL brass Hull Cell panel that is plated at 5 amps for 5 minutes and evaluated for lack of brightness, and by TOC (total organic carbon) analysis using a persulfate TOC analyzer. TOC levels were determined to be below 45 parts per million (ppm). The preliminary tool was DC-plated at a current density of 60 amps per square foot (with a ramp up time at the start of 5 seconds) for 45 minutes while being rotated at 20 rpm. The

TABLE 1

Some Solutions Used

| Element | Component | Supplier | Quantity |
| --- | --- | --- | --- |
| Alkaline cleaner | 25% Sodium hydroxide (NaOH) | Hawkins Chemical (Minneapolis, MN) | 30% v/v |
| | 16% Sodium carbonate | Hawkins Chemical | 3.5% v/v |
| | Triton X-114 | Dow Chemical Company (Midland, MI) | 0.9% v/v |
| | Mayoquest L-50 | Vulcan Performance Chemicals (Birmingham, AL) | 0.9% v/v |
| | Dowfax C6L | Dow Chemical Company | 1.4% v/v |
| | Deionized (DI) water (15-18 megaohm) | | Balance |
| Citric acid solution | Citric acid 15% solution | Hawkins Chemical | 33% v/v |
| | DI water | | Balance |
| Sulfuric acid solution | Sulfuric acid 96% reagent grade | Mallinckrodt Baker (Phillipsburg, NJ) | 1% v/v |
| | DI water | | Balance |
| First copper bath | Liquid copper sulfate (68.7 g/L copper) | Univertical (Angola, IN) | 53.5 g/L as copper |
| | Sulfuric acid 96% reagent grade | Mallinckrodt Baker | 60 g/L as $H_2SO_4$ |
| | Hydrochloric acid 37% reagent | Mallinckrodt Baker | 60 mg/L as $Cl^-$ |
| | DI water | | Balance |
| Second copper bath | Liquid copper sulfate (68.7 g/L copper) | Univertical | 53.5 g/L as copper |
| | Sulfuric acid 96% reagent grade | Mallinckrodt Baker | 60 g/L as $H_2SO_4$ |
| | Hydrochloric acid 37% reagent | Mallinckrodt Baker | 60 mg/L as $Cl^-$ |
| | Grain refiner Cuflex 321 | Atotech USA (Rock Hill, SC) | 1.4% v/v |
| | DI water | | Balance |
| Chrome bath | Liquid chromic acid (440 g/L $CrO_3$) | Atotech USA | 250 g/L as $CrO_3$ |
| | Sulfuric acid 96% reagent grade | Mallinckrodt Baker | 2.5 g/L |
| | Trivalent chromium | | 0-20 g/L byproduct |
| | DI water | | Balance | distance from the anode to the nearest point on the tool during plating was approximately 45 mm. When plating was completed, the thickness of the plated copper, which we refer to as a first copper layer, was approximately 30 microns. The first copper layer had an exposed structured surface that was roughened with a multitude of flat facets.

Rather than covering the first copper layer with an electroplated second copper layer of lesser average roughness (in accordance with FIG. 9), for reference purposes, this preliminary tool, and in particular the structured surface of the first copper layer, was used to make a Type II Microreplicated diffusing film. This involved cleaning the preliminary tool and electroplating a chromium coating on the structured surface of the first copper layer. The chromium coating was thin enough to substantially preserve the topography of the first copper layer structured surface.

Accordingly, the preliminary tool, with the structured surface of the first copper layer still exposed, was washed with deionized water and a weak acid solution to prevent oxidation of the copper surface. Next, the preliminary tool was moved to a Class 100 clean room, placed in a cleaning tank, and rotated at 20 rpm. The preliminary tool was deoxidized using a citric acid solution, and then washed with an alkaline cleaner. After that it was rinsed with deionized water, deoxidized again with the citric acid solution, and rinsed with deionized water.

The preliminary tool was transferred to a chrome plating tank while wet and 50% immersed in the tank. The bath temperature was 124° F. The tool was DC-plated with chromium using a current density of 25 amps per square decimeter while the preliminary tool moved at a surface speed of 90 meters/minute. The plating continued for 400 seconds. Upon completion of plating, the preliminary tool was rinsed with deionized water to remove any remaining chrome bath solution. The chromium coating serves to protect the copper to prevent oxidation, and, as mentioned, it was thin enough to substantially preserve the topography of the first copper layer structured surface.

The preliminary tool was transferred to a cleaning tank where it was rotated at 10 rpm, washed with 1 liter of deionized water at ambient temperature, then washed with 1.5 liters of denatured alcohol (SDA-3A, reagent grade at ambient temperature) applied slowly to cover the entire tool surface. The tool rotation speed was then increased to 20 rpm. It was then air dried.

Type II Microreplicated Optical Diffusing Film

Figure 5:
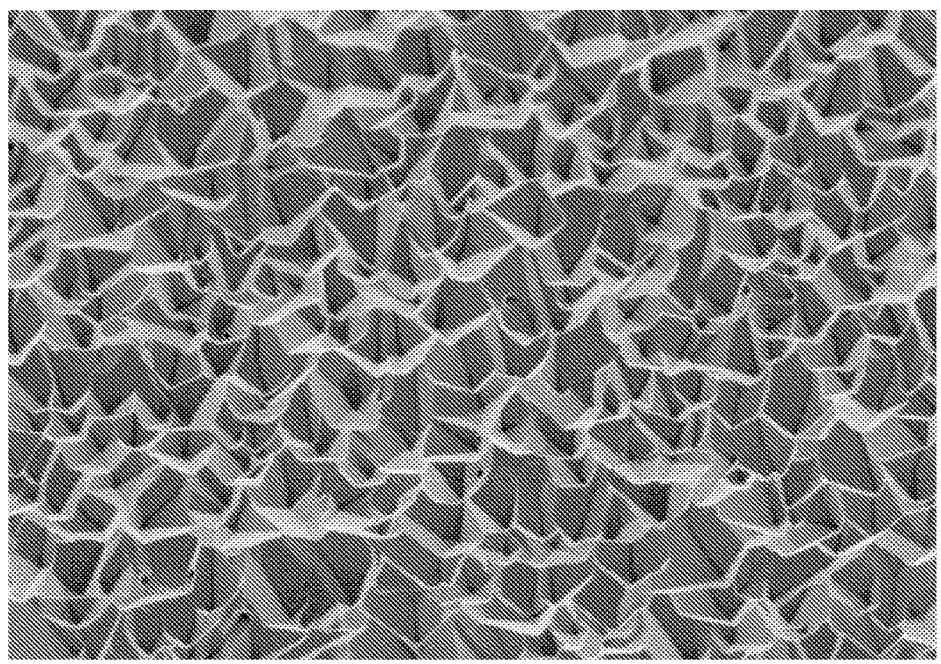
FIG. 5 is an SEM image of a portion of the structured surface of a Type II Microreplicated diffusing film (optical haze=100%, optical clarity=1.3%)

Once the preliminary tool was dried, a hand-spread film was made from the tool using a UV-curable acrylate resin coated on a primed PET film. This procedure microreplicated the structured surface of the first copper layer to produce a corresponding structured surface (but inverted relative to that of the preliminary tool) on the cured resin layer of the film. Due to its method of construction, the film was a Type II Microreplicated optical diffusing film. A scanning electron microscope (SEM) image of the film's structured surface is shown in FIG. 5. The optical haze and clarity of the film were measured with a Haze-Gard Plus system from BYK Gardner (Columbia Md.), and found to be 100%, and 1.3%, respectively.

First Tool

Another structured surface tool, referred to here as the first tool, was then made. Unlike the preliminary tool, the first tool was made using both electroplating steps shown in FIG. 9, so that the first copper layer was covered with an electroplated second copper layer of lesser average roughness.

The first tool was prepared in the same way as the preliminary tool, up to the chromium plating step. Then this first tool, with its first copper layer whose structured surface was of relatively high average roughness (substantially an inverted version of FIG. 5), was transferred before drying to a copper plating tank set up for additional plating. The first tool was rinsed with approximately one liter of the sulfuric acid solution, before the start of a second plating cycle, to remove surface oxide generated during the loading of the tool into the tank. The first tool was then 50% immersed in the second copper bath in a Daetwyler Cu Master Junior 18 tank. The bath temperature was 25° C. The second copper bath was carbon treated to remove organic contamination, as described above for the preliminary tool. After the carbon treatment, the second copper bath was recharged with an organic grain refiner (Cutfiex 321 at a concentration of 14 milliliters/liter), such that the second copper bath had the composition shown above in Table 1. The composition of the second copper bath differed from that of the first copper bath by the addition of the organic grain refiner. The anode was positioned at a distance of approximately 45 mm from the first tool. The first tool was then DC plated for 12 minutes in the second copper bath using a current density of 60 amps per square foot while being rotated at 20 rpm. The current ramp time was about 5 seconds. This produced a second electroplated copper layer which covered the first copper layer, the second copper layer having a structured surface of lesser average roughness than that of the first copper layer. The thickness of the second copper layer was 8 microns.

The first tool was then transferred to a cleaning tank. It was rotated at 10-12 revolutions per minute while being washed with approximately 1 liter of deionized water at ambient temperature using a hose with a spray nozzle. A second wash was done using 1 to 2 liters of the citric acid solution at ambient temperature. Then the first tool was washed with approximately 3 liters of deionized water to remove excess citric acid using a hose with a spray nozzle. Next the first tool was rinsed with approximately 2 liters of denatured ethanol (SDA 3A of reagent grade) applied slowly at ambient temperature to cover the entire tool surface in order to aid in drying. The first tool was then air dried. Next, the first tool was moved to a Class 100 clean room, cleaned, and chrome plated, in the same way as was done with the preliminary tool. The chromium plating substantially retained the topography of the structured surface of the second copper layer.

Sample 502-1

Figure 14:
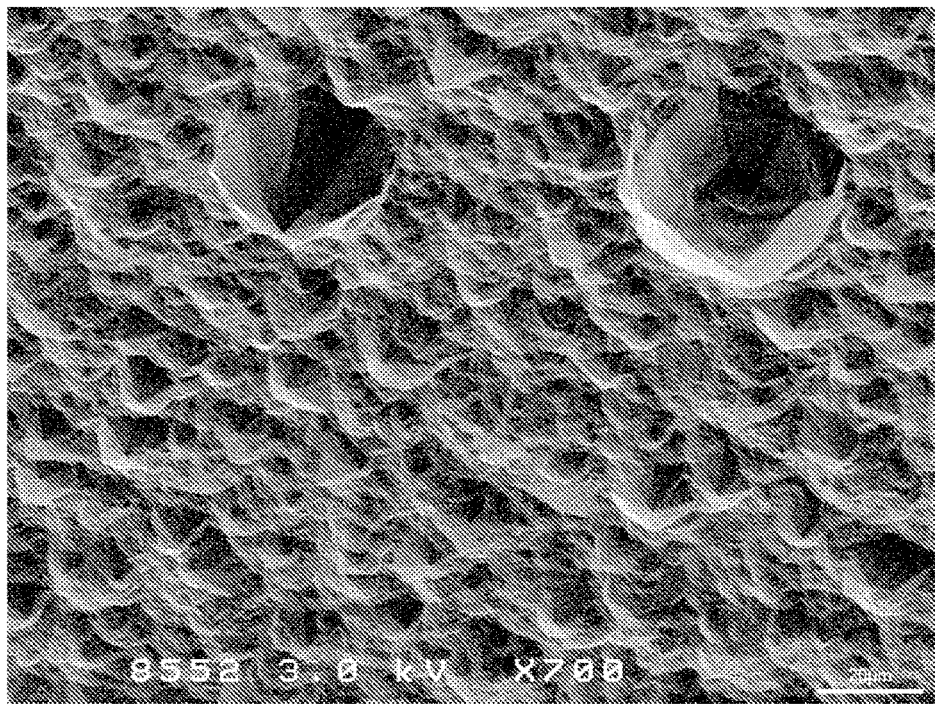
FIG. 14 is an SEM image of a representative portion of the structured surface of an optical diffusing film sample referred to as "502-1"
Figure 14A:
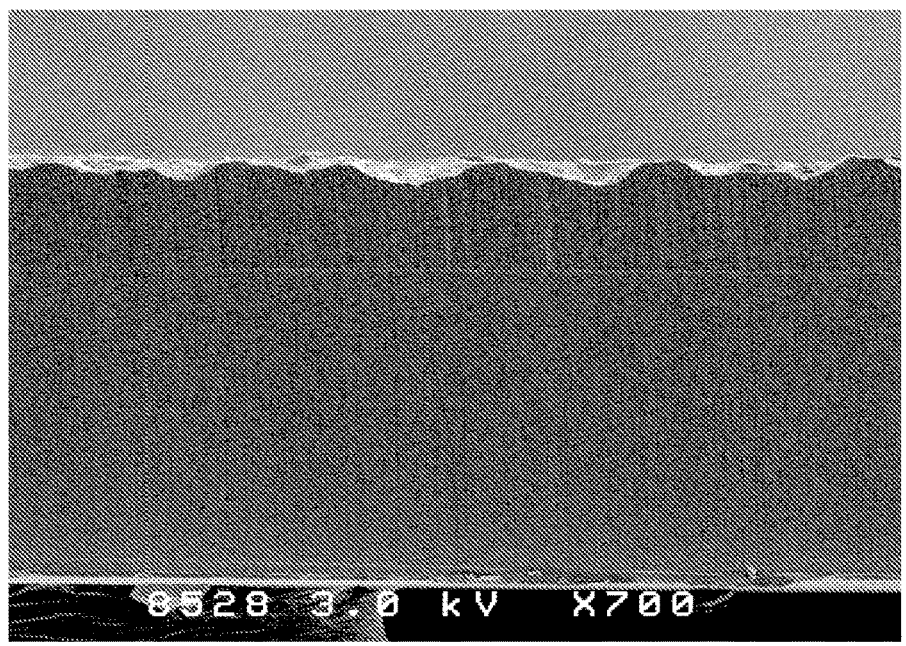
FIG. 14A is an SEM image of the 502-1 sample in cross-section.

After air drying, the first tool was used to make a film via a hand spread. This too was done in the same way as was done with the preliminary tool, and it produced an optical diffusing film (referred to herein with the sample designation number 502-1) having a microreplicated structured surface on the cured resin layer of the film corresponding to (but inverted relative to) the structured surface of the second copper layer. An SEM image of the film's structured surface is shown in FIG. 14. Although the surface is structured, one can see that the average roughness of the surface is less than that of the structured surface of FIG. 5. An SEM image of a cross-section of the 502-1 sample is shown in FIG. 14a. The optical haze and clarity of this optical diffusing film sample 502-1 were measured with the Haze-Gard Plus system from BYK Gardner (Columbia Md.), and found to be 92.8%, and 6.9%, respectively. These values are listed in Table 2 below.

Second Tool

Another structured surface tool, referred to here as the second tool, was made. The second tool was made in substantially the same way as the first tool, except that the composition of the second copper bath was different: two organic grain refiners were used (Cutflex 321 at a concentration of 14 milliliters/liter, and Cutfiex 320H at a concentration of 70 millilters/liter), rather than just one. The second copper plating step was, however, again completed in 12 minutes, which produced a second electroplated copper layer whose thickness was 8 microns. After chrome plating the structured surface of the second copper layer, the second tool was ready to be used for microreplication to an optical film.

Sample 594-1

Figure 15:
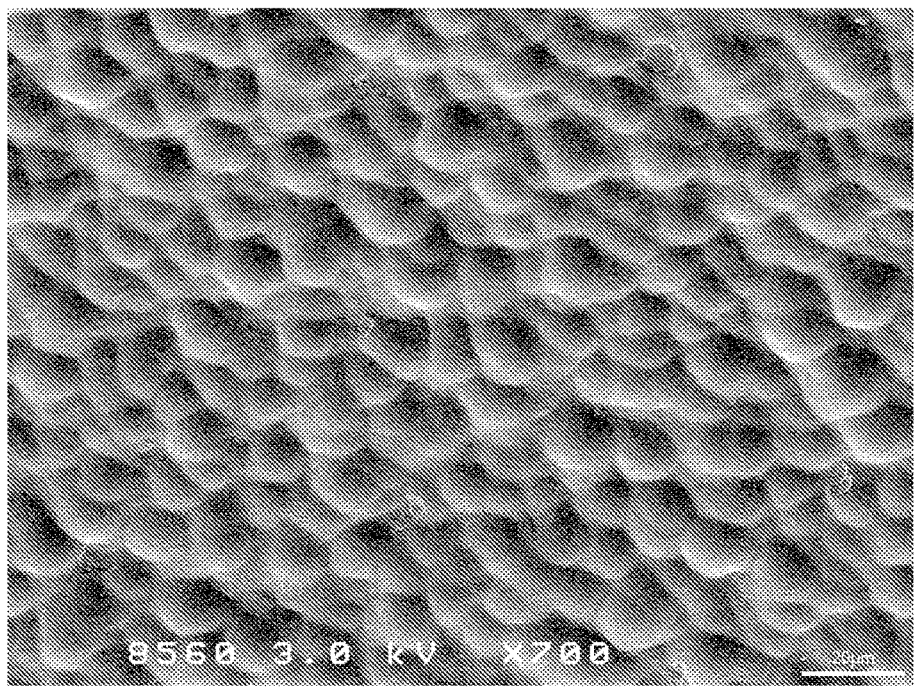
FIG. 15 is an SEM image of a representative portion of the structured surface of an optical diffusing film sample referred to as "594-1"

The second tool was then used to make a film via a hand spread. This was done in the same way as was done with the first tool, and it produced an optical diffusing film (referred to herein with the sample designation number 594-1) having a microreplicated structured surface on the cured resin layer of the film corresponding to (but inverted relative to) the structured surface of the second copper layer. An SEM image of the film's structured surface is shown in FIG. 15. Although the surface is structured, one can see that the average roughness of the surface is less than that of the structured surface of FIG. 5. The optical haze and clarity of this optical diffusing film sample 594-1 were measured with the Haze-Gard Plus system from BYK Gardner (Columbia Md.), and found to be 87.9%, and 6.9%, respectively. These values are listed in Table 2 below.

Third Tool

Another structured surface tool, referred to here as the third tool, was made. The third tool was made in substantially the same way as the second tool, except that the second copper plating was completed in 18 minutes rather than 12 minutes, which produced a second electroplated copper layer whose thickness was about 12 microns. After chrome plating the structured surface of the second copper layer, the third tool was ready to be used for microreplication to an optical film.

Sample 593-2

Figure 21:
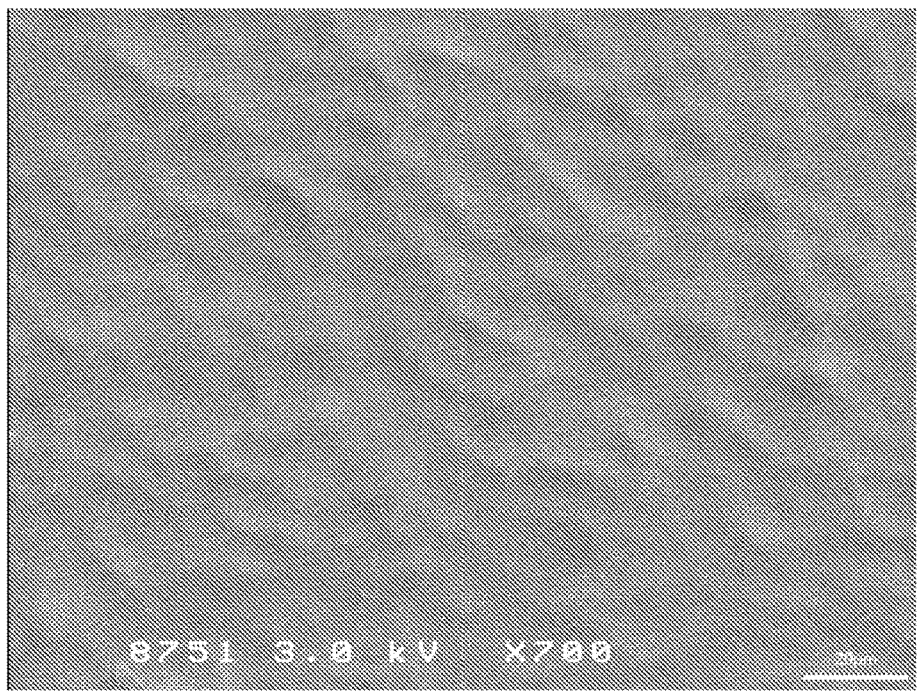
FIG. 21 is an SEM image of a representative portion of the structured surface of an optical diffusing film sample referred to as "593-2"

The third tool was then used to make a film via a hand spread. This was done in the same way as was done with the first and second tools, and it produced an optical diffusing film (referred to herein with the sample designation number 593-2) having a microreplicated structured surface on the cured resin layer of the film corresponding to (but inverted relative to) the structured surface of the second copper layer. An SEM image of the film's structured surface is shown in FIG. 21. Although the surface is structured, one can see that the average roughness of the surface is less than that of the structured surface of FIG. 5. The optical haze and clarity of this optical diffusing film sample 593-2 were measured with the Haze-Gard Plus system from BYK Gardner (Columbia MD), and found to be 17.1%, and 54.4%, respectively. These values are listed in Table 2 below.

Fourth Tool

Another structured surface tool, referred to here as the fourth tool, was made. In order to make this fourth tool, two plating solutions were prepared. A first plating solution consisted of 60 g/L of sulfuric acid (J.T.Baker Chemical Company, Philipsburg, N.J.) and 217.5 g/L of copper sulfate (Univertical Chemical Company, Angola, Ind.). A second plating solution consisted of the contents of the first plating solution plus additives CUPRACID HT leveler (0.05% by volume), CUPRACID HT fine grainer (0.1% by volume), and CUPRACID HT wetting agent (0.3% by volume), all available from Atotech USA. Both solutions were made with deionized water. An 8 inch by 8 inch copper sheet was placed in a tank holding the first plating solution. The tank size was 36 inches (length)×24 inches (width)×36 inches (depth). The sheet was plated at 21° C. for 24 hours using a current density of 10 amps per square foot with a flow rate of 8 gallons per minute created using a circulation pump. This first plating step produced a first electrodeposited copper layer having a relatively rough structured surface, the thickness of the electrodeposited layer being about 330 microns. The plate was removed from the first plating solution, rinsed, and dried. The copper sheet with the first electroplated layer was then cut into a 1.5 inch×8 inch section. The backside of the section was shielded with adhesive tape and placed in a four-liter beaker containing the second plating solution, and plated at 25° C. for 35 minutes at a current density of 35 amps per square foot. This second plating step produced a second electrodeposited copper layer which covered the first copper layer, and the second copper layer had a structured surface whose average roughness was less than that of the first copper layer. The thickness of the second copper layer was about 28 microns. After the second plating step, the section, which is referred to as the fourth tool, was rinsed and dried. Unlike the first, second, and third tools, the second copper layer of the fourth tool was not plated with chromium. Instead, the exposed structured surface of the second copper layer was used directly for microreplication of an optical film.

It was discovered that, in contrast to the tools used to make the other optical diffusing film samples disclosed herein, the copper sheet used as a starting material to make the fourth tool deviated significantly from flatness, in particular, it contained substantially linear periodic undulations. These undulations were carried over into the structured surfaces of the first and second copper layers, such that the structured surface of the second copper layer contained not only roughness attributable to the electroplating steps, but also an undulation originating from the base copper sheet upon which the electrodeposited copper layers were formed.

Sample RA13*a*

Figure 19:
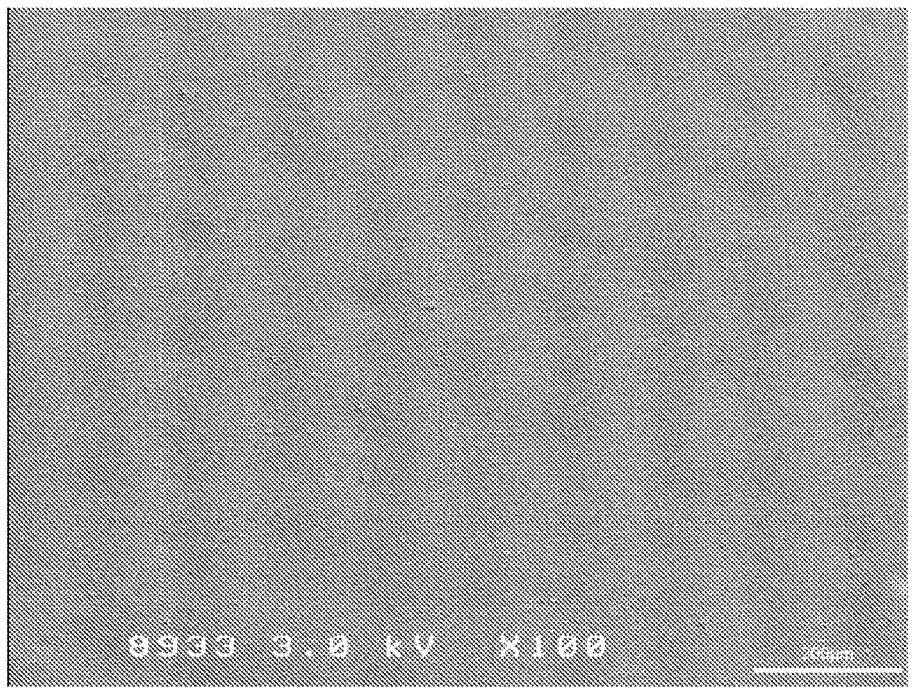
FIG. 19 is an SEM image of a representative portion of the structured surface of an optical diffusing film sample referred to as "RA13a"

The fourth tool was then used to make a film via a hand spread. This was done by applying a polyester film substrate with a uv-curable acrylate resin to the fourth tool. The resin was cured using a uv-processor from RPC Industries (Plainfield, Ill.) with a line speed of 50 feet per minute. The film was then removed from the structured surface of the fourth tool. The film was an optical diffusing film (referred to herein with the sample designation number RA13*a*) having a microreplicated structured surface on the cured resin layer of the film corresponding to (but inverted relative to) the structured surface of the second copper layer. An SEM image of the film's structured surface is shown in FIG. 19. The faint periodic vertical lines seen in the figure are a result of the periodic undulations in the copper sheet starting material, and were not introduced by the two copper electroplating steps. The optical haze and clarity of this optical diffusing film sample RA13*a* were measured as with the other samples, and found to be 25.9%, and 19.4%, respectively. These values are listed in Table 2 below.

Samples 507-1, 600-1, 554-1, 597-1, 551-1, and 599-1

Figure 16:
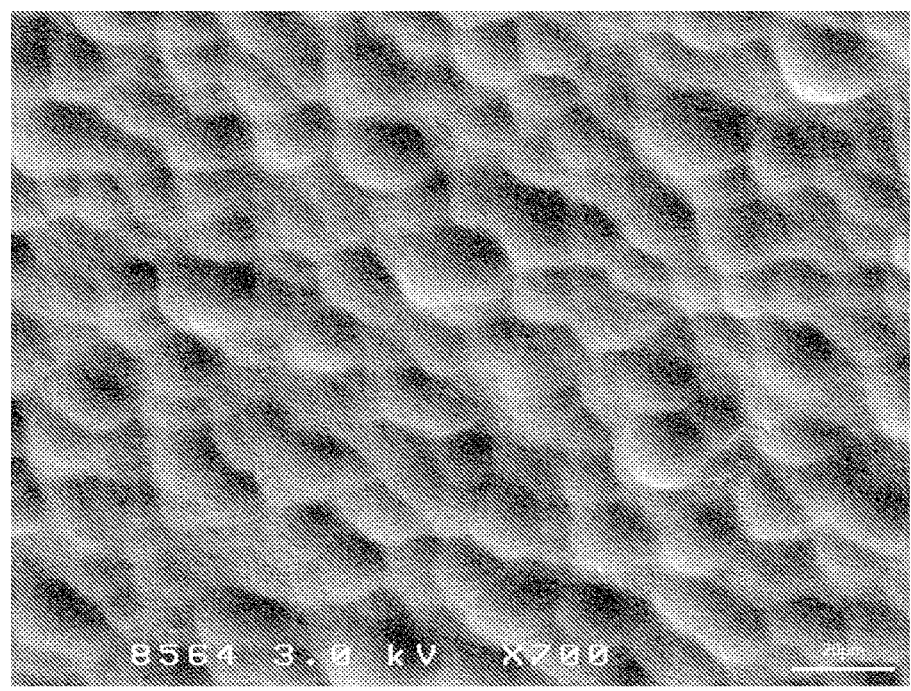
FIG. 16 is an SEM image of a representative portion of the structured surface of an optical diffusing film sample referred to as "599-1"

The tools used to make these optical diffusing film samples were made in the same manner as the tools for samples 502-1 and 594-1 above, except that one or more of the following were varied for the second electroplating step: the amount of organic leveler used, the current density, and the plating time. The samples themselves were then made from their respective tools via a hand spread in the same manner as samples 502-1 and 594-1, and the haze and clarity were measured as with the other samples. The measured values are listed in Table 2 below. An SEM image of the structured surface of film sample 599-1 is shown in FIG. 16.

Samples 502-2, 554-2, 551-2, 597-2, and 600-2

Figure 17:
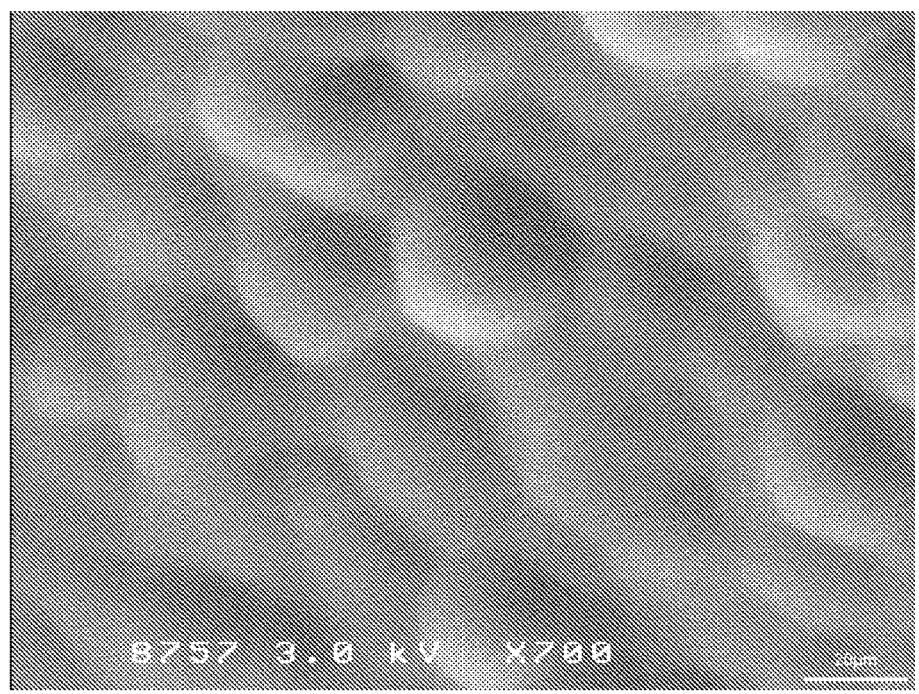
FIG. 17 is an SEM image of a representative portion of the structured surface of an optical diffusing film sample referred to as "502-2"
Figure 22:
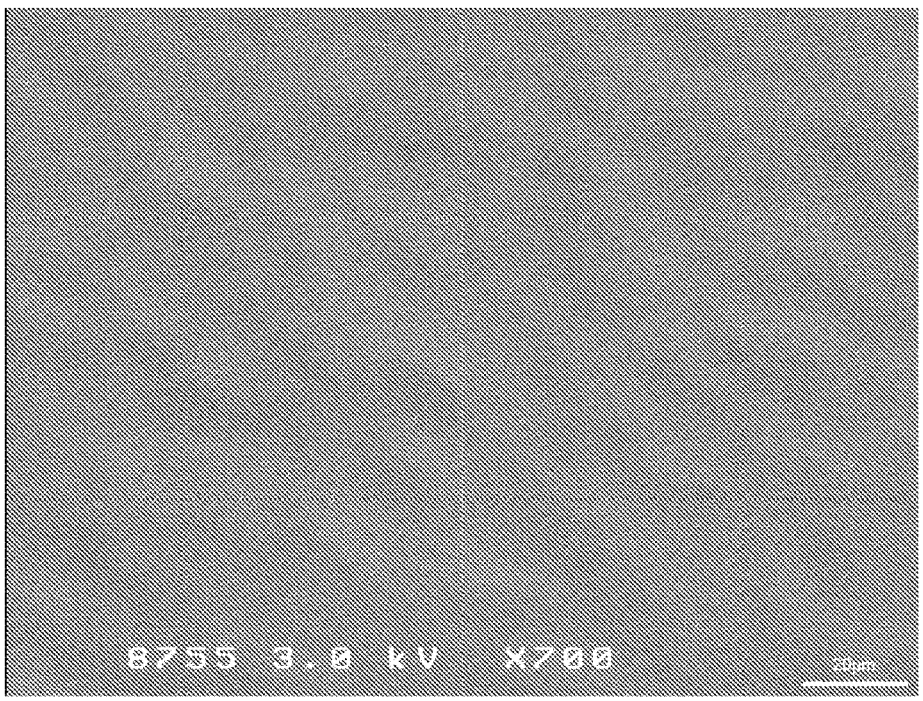
FIG. 22 is an SEM image of a representative portion of the structured surface of an optical diffusing film sample referred to as "597-2"

The tools used to make these optical diffusing film samples were made in the same manner as the tool for sample 593-2 above, except that one or more of the following were varied for the second electroplating step: the amount of organic leveler used, the current density, and the plating time. The samples themselves were then made from their respective tools via a hand spread in the same manner as sample 593-2, and the haze and clarity were measured as with the other samples. The measured values are listed in Table 2 below. An SEM image of the structured surface of film sample 502-2 is shown in FIG. 17. An SEM image of the structured surface of film sample 597-2 is shown in FIG. 22.

Samples RA13c, RA13b, RA22a, L27B, RA14b, RA24a, RA24b, N3, and N2

Figure 18:
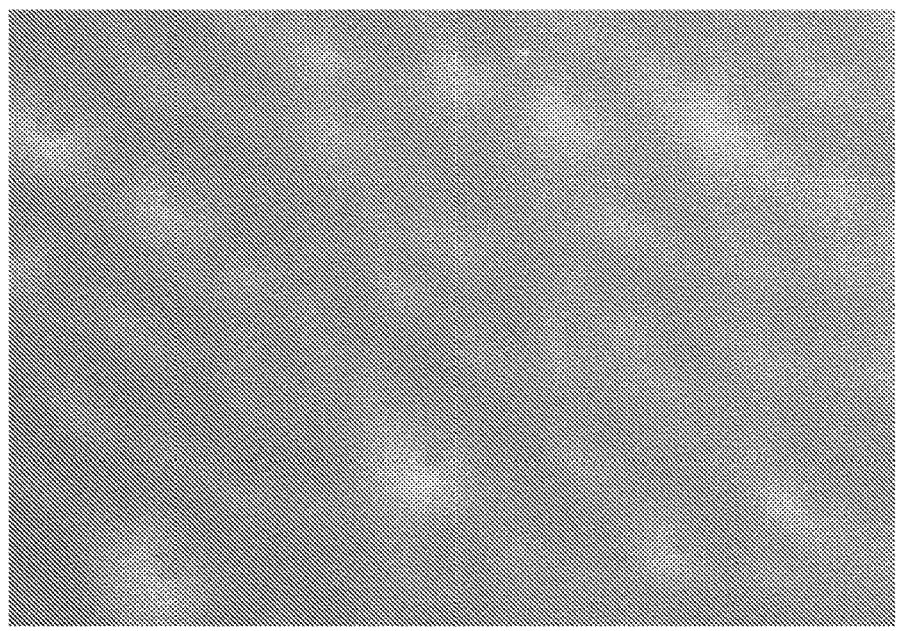
FIG. 18 is an SEM image of a representative portion of the structured surface of an optical diffusing film sample referred to as "RA22a"
Figure 20:
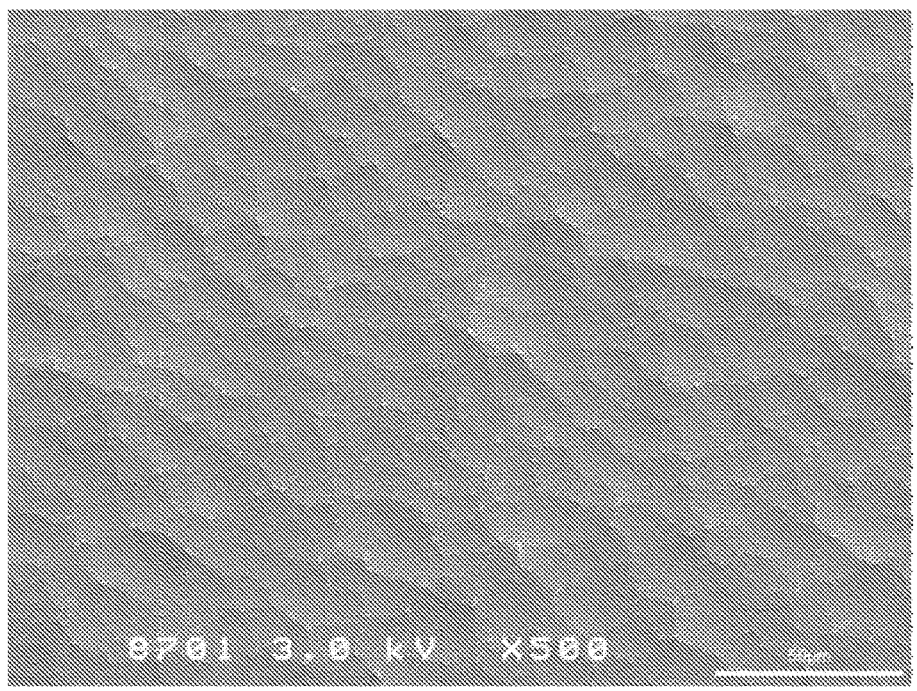
FIG. 20 is an SEM image of a representative portion of the structured surface of an optical diffusing film sample referred to as "N3"

The tools used to make these optical diffusing film samples were made in the same manner as the tool for sample RA13a above (i.e., the fourth tool), except that (i) the copper sheet used as a starting material was flat and smooth and did not contain the periodic undulations, and (ii) one or more of the following were varied for the first or second electroplating step: the current density, and the plating time. The samples themselves were then made from their respective tools via a hand spread in the same manner as sample RA13a, and the haze and clarity were measured as with the other samples. The measured values are listed in Table 2 below. An SEM image of the structured surface of film sample RA22a is shown in FIG. 18. An SEM image of the structured surface of film sample N3 is shown in FIG. 20.

TABLE 2

Measured Optical Haze and Clarity

| Sample | Haze (%) | Clarity (%) |
|---|---|---|
| 600-2 | 1.57 | 88.3 |
| 597-2 | 2.5 | 83.1 |
| 551-2 | 5.3 | 72.5 |
| RA24b | 7.41 | 56.8 |
| N2 | 8.2 | 76.6 |
| 554-2 | 11.7 | 41.1 |
| RA24a | 12.1 | 40.4 |
| RA14b | 13.9 | 57.8 |
| L27B | 14 | 51.1 |
| 593-2 | 17.1 | 54.4 |
| N3 | 24.9 | 32.1 |
| RA13a | 25.9 | 19.4 |
| RA22a | 54.6 | 15.5 |
| 502-2 | 67.3 | 9 |
| 599-1 | 72.4 | 8.4 |
| RA13b | 72.5 | 9.1 |
| 551-1 | 79.4 | 10 |
| RA13c | 80 | 9.5 |
| 597-1 | 85.6 | 8.6 |
| 554-1 | 87.4 | 7.3 |
| 594-1 | 87.9 | 6.9 |
| 502-1 | 92.8 | 6.9 |
| 600-1 | 95 | 6.8 |
| 507-1 | 96.4 | 6.1 |

Figure 13:
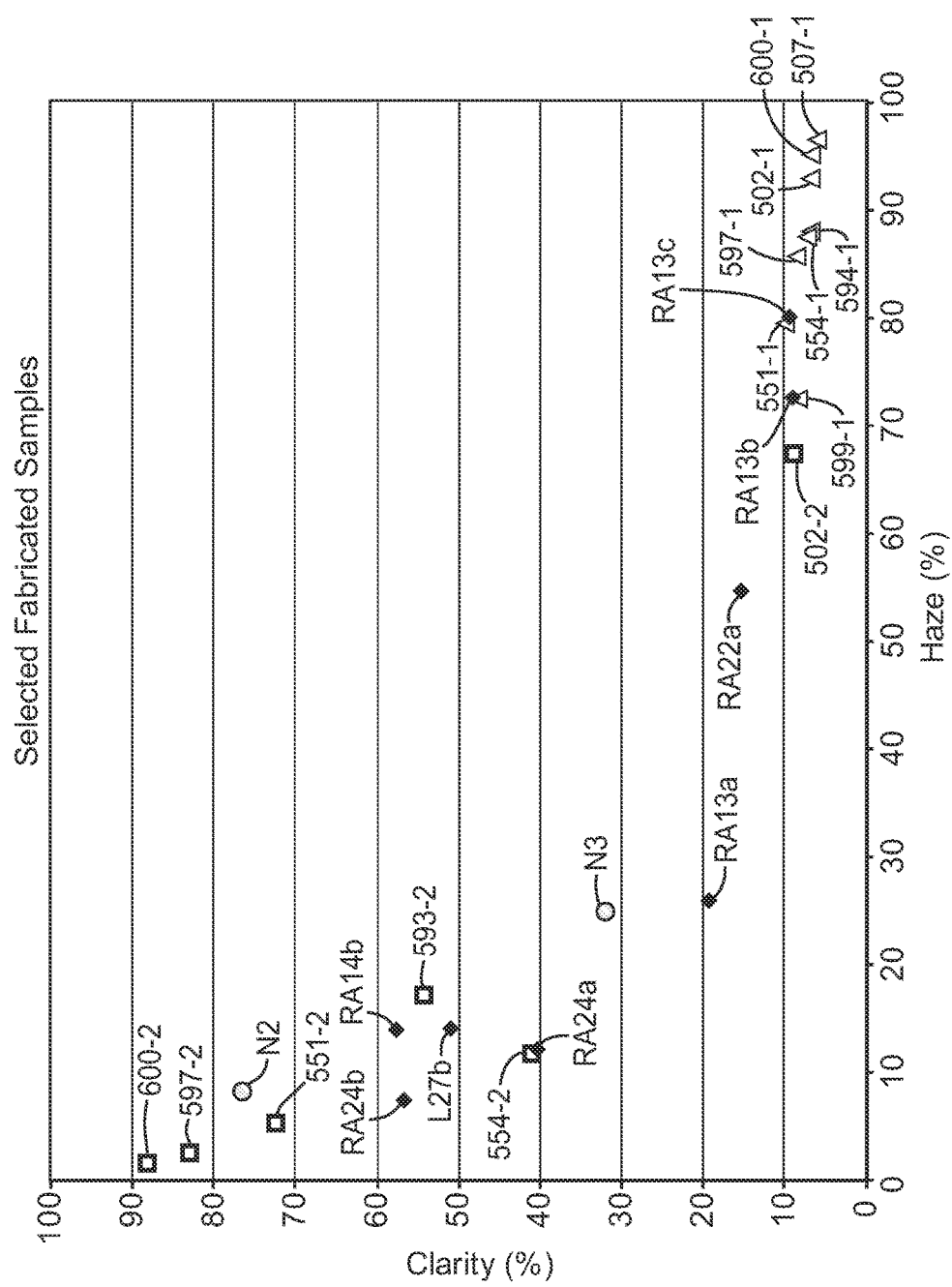
FIG. 13 is a graph of optical clarity vs. optical haze, each point on the graph depicting a different optical diffusing film sample made using a process in accordance with FIG. 9.

Each optical diffusing film sample listed in Table 2 was made using a process in accordance with FIG. 9. The measured haze and measured clarity values in this table are plotted in the optical clarity vs. optical haze graph of FIG. 13. The points on the graph are labeled according to the sample designation numbers in Table 2. Of the samples listed in Table 2, SEM images of the structured surfaces are provided for: sample 502-1 (FIGS. 14, 14A); sample 594-1 (FIG. 15); sample 599-1 (FIG. 16); sample 502-2 (FIG. 17); sample RA22a (FIG. 18); sample RA13a (FIG. 19); sample N3 (FIG. 20); sample 593-2 (FIG. 21); and sample 597-2 (FIG. 22). Inspection of these images reveals one or more of:
- discernible individual structures (e.g. in the form of distinct cavities and/or protrusions) that can be seen in the structured surface;
- individual structures that are limited in size along two orthogonal in-plane directions;
- individual structures that are closely packed;
- individual structures that are rounded or curved (crater-like or dome-like, with curved base surfaces);
- individual structures that are pyramidal or flat-faceted; and
- combinations of non-uniformly arranged larger structures, and closely packed smaller structures non-uniformly dispersed between the larger structures.

Some of these samples were evaluated in a display. For example, the samples 551-2 and 593-2 were used as back-side diffusers (see e.g. FIGS. 8 and 12) in the display, and the samples 599-1, 551-1, 597-1, 554-1, 594-1, 502-1, 600-1, and 507-1 were used as bottom diffusers (see e.g. FIGS. 8 and 7) in the display. Moire artifacts were not observed, and sparkle and graininess were very weak. (Graininess and sparkle, as discussed above, can cause unwanted spatial variation in illumination of a liquid crystal panel. Graininess can produce undesired noise on an image, while sparkle has the additional artifact of such noise varying with viewing angle.)

Further Discussion—Structured Surface Characterization

Further analysis work was performed to identify characteristics of structured surfaces which, whether alone or in combination with other characteristics, may be used to characterize at least some of the structured surfaces made by the method of FIG. 9, and/or to distinguish at least some such structured surfaces from those of other optical diffusing films, such as SDB diffusers, DPB diffusers, CCS diffusers, Type I Microreplicated diffusing films, and Type II Microreplicated diffusing films. Several characterization parameters were studied in this regard, including:
- power spectral density (PSD) of the topography along orthogonal in-plane directions, as a measure of spatial irregularity or randomness;
- identification of individual structures (in plan view) that make up the structured surface, and measurement of the in-plane size or transverse dimension (such as ECD) of such structures;
- ratio of depth or height to in-plane size of the structures; and
- identification of ridges on the structured surface, and measurement of ridge length (in plan view) per unit area.

This further analysis work will now be discussed.

Power Spectral Density (PSD) analysis

Part of the analysis work focused on the topography of the structured surface, and sought to determine the degree of spatial irregularity or randomness of the surface. The topography can be defined relative to a reference plane along which the structured surface extends. For example, the structured surface 720a of film 720 (see FIG. 7) lies generally in, or extends generally along, an x-y plane. Using the x-y plane as a reference plane, the topography of the structured surface 720a can then be described as the height of the surface 720a relative to the reference plane as a function of position in the reference plane, i.e., the z-coordinate of the surface as a function of (x,y) position. If we measure the topography of a structured surface in this manner, we can then analyze the spatial frequency content of the topographical function to determine the degree of spatial irregularity or randomness of the surface (or to identify spatial periodicities present in the structured surface).

Our general approach was to analyze the spatial frequency content using Fast Fourier Transform (FFT) functions. Because the topography provides height information along two orthogonal in-plane directions (x and y), the spatial frequency content of the surface is fully characterized by analyzing the spatial frequency content along each of the in-plane directions. We determined the spatial frequency content by measuring the topography over a sufficiently large, and representative, portion of the structured surface, and calculating a Fourier power spectrum for each in-plane direction. The two resulting power spectra could then be plotted on graphs of power spectral density (PSD) versus spatial frequency. To the extent the resulting curves contain any local frequency peaks (not corresponding to zero frequency), the magnitude of such a peak can be expressed in terms of a "peak ratio" described further below in connection with FIG. 23.

Having described our general approach, we now describe our approach to the PSD analysis in more detail. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography and any periodicity that was present. The 2-dimensional (2D) power spectral density (PSD) was calculated for each 2D height profile. The 2D PSD is the square of the magnitude of the 2D spatial Fourier transform of the 2D height profile. MATLAB was used to calculate the PSD using MATLAB's Fast Fourier Transform (FFT) function. Before using the FFT, a 2D Hamming window was applied to the 2D height profile to help reduce ringing in the FFT caused by the finite spatial dimensions of the 2D height profile. The 2D PSD was summed in the x-direction to give the 1-dimensional (1D) PSD in the y-direction (downweb direction). Likewise, the 2D PSD was summed in the y-direction to give the 1D PSD in the x-direction (crossweb direction).

Figure 23:
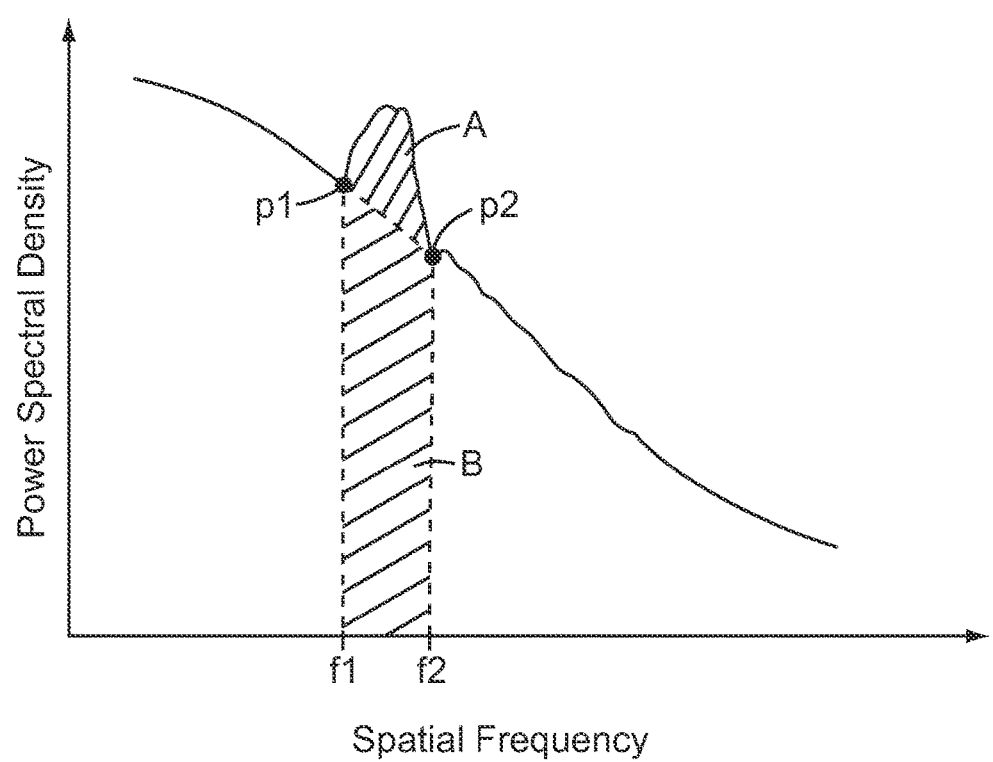
FIG. 23 is a graph of power spectral density vs. spatial frequency, the graph including a hypothetical curve used to demonstrate how the degree of irregularity or randomness of a structured surface along a given in-plane direction can be characterized by a Fourier power spectrum associated with such in-plane direction.

Analysis of the 1D PSDs with regard to spatial frequency peaks will now be described in connection with FIG. 23. In that figure, a hypothetical Fourier power spectrum curve is shown for illustrative purposes. The curve, which may represent either of the 1D PSD functions (x or y) discussed above, appears on a graph of power spectral density (PSD) versus spatial frequency. The vertical axis (PSD) is assumed to be plotted on a linear scale starting at zero. The curve is shown as having a frequency peak which (a) does not correspond to zero frequency, and (b) is bounded by two adjacent valleys that define a baseline. The two adjacent valleys are identified by points p1, at spatial frequency f1, and p2, at spatial frequency f2. The frequency f1 may be considered the frequency at which the peak starts, and f2 may be considered the frequency at which the peak ends. The baseline is the straight line segment (dashed line) that connects p1 and p2. Keeping in mind that the vertical axis (PSD) is on a linear scale starting at zero, the magnitude of the peak can be expressed in terms of the areas A and B on the graph. The area A is the area between the frequency peak and the baseline. The area B is the area under or beneath the baseline. That is, $B=(PSD(f1)+PSD(f2))*(f2-f1)/2$. The sum A+B is the area under or beneath the frequency peak. Given these definitions, the magnitude of the peak can now be defined in terms of a relative peak amplitude or "peak ratio" as follows:

peak ratio=$A/(A+B)$.

In practice, we evaluated two 1D PSDs (two Fourier power spectra—one for the x-direction, one for the y-direction) for each sample that was evaluated, and we identified, to the extent the Fourier power spectrum included any frequency peaks, the most prominent peak for each curve. The above-described peak ratio was then calculated for the most prominent peak for each curve. Since the most prominent peak was measured, the calculated peak ratio is an upper limit for all peaks that may be present in the given Fourier power spectrum.

Figure 1:
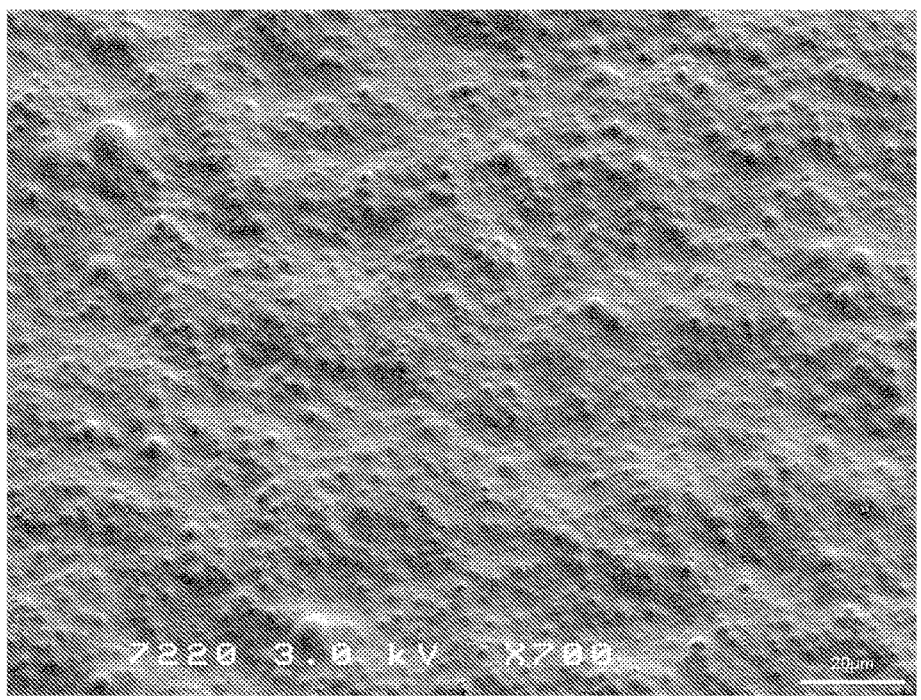
FIG. 1 is an SEM image of a portion of the beaded surface of a CCS diffuser (optical haze=72%, optical clarity=9.9%)
Figure 1A:
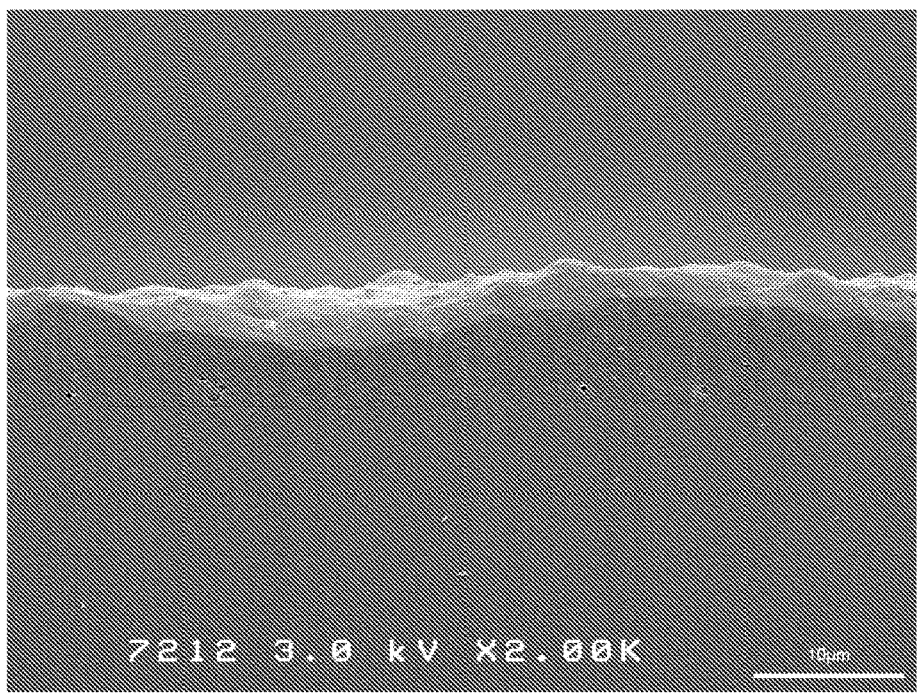
FIG. 1A is an SEM image of such surface in cross-section.
Figure 2:
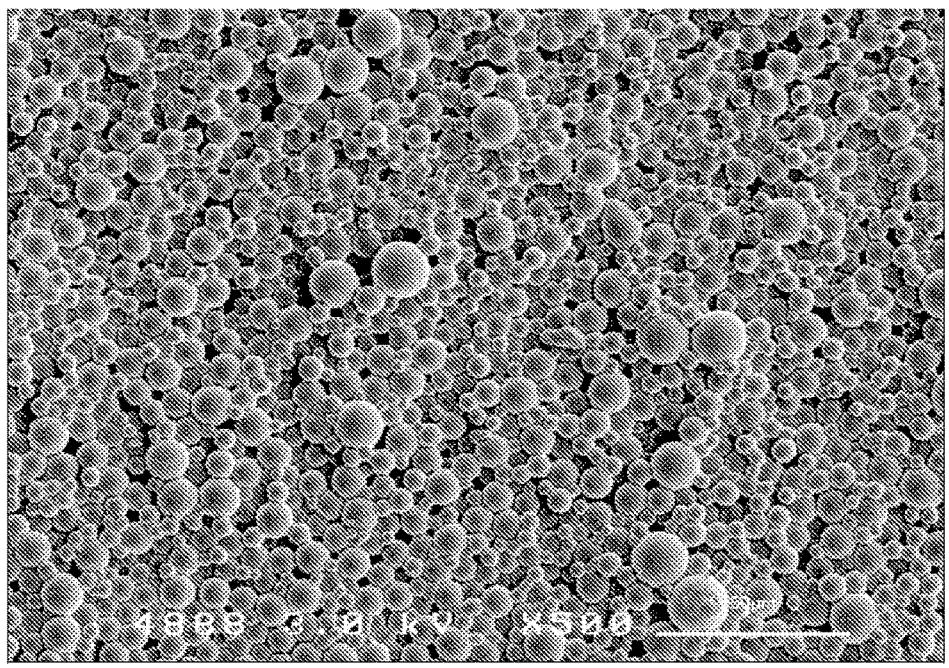
FIG. 2 is an SEM image of a portion of the beaded surface of a DPB diffuser (optical haze=97.5%, optical clarity=5%)
Figure 3:
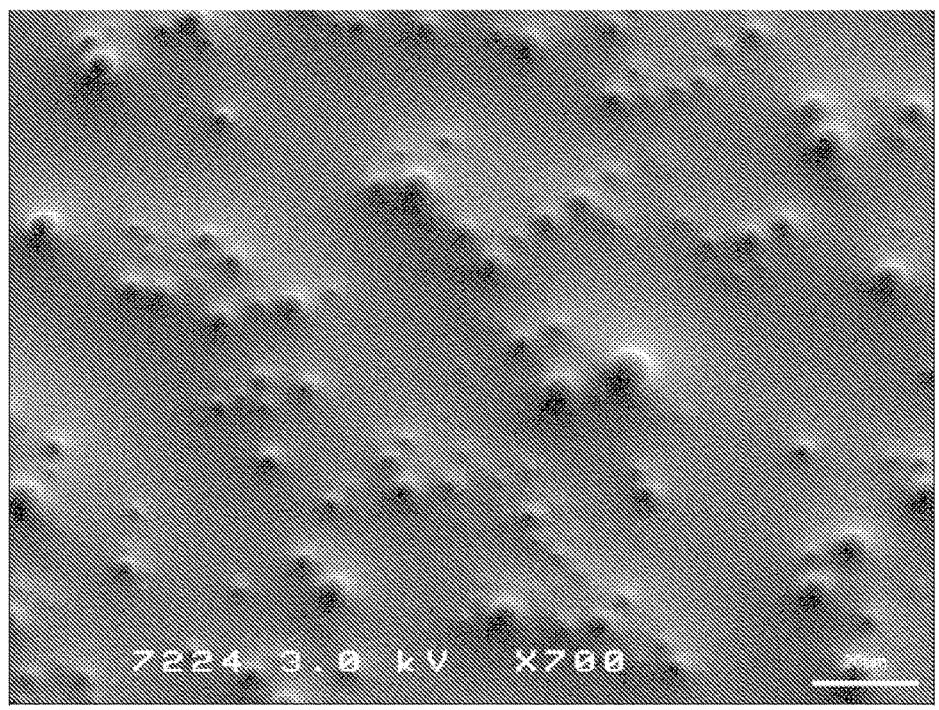
FIG. 3 is an SEM image of a portion of the beaded surface of an SDB diffuser (optical haze=67%, optical clarity=30%)
Figure 4:
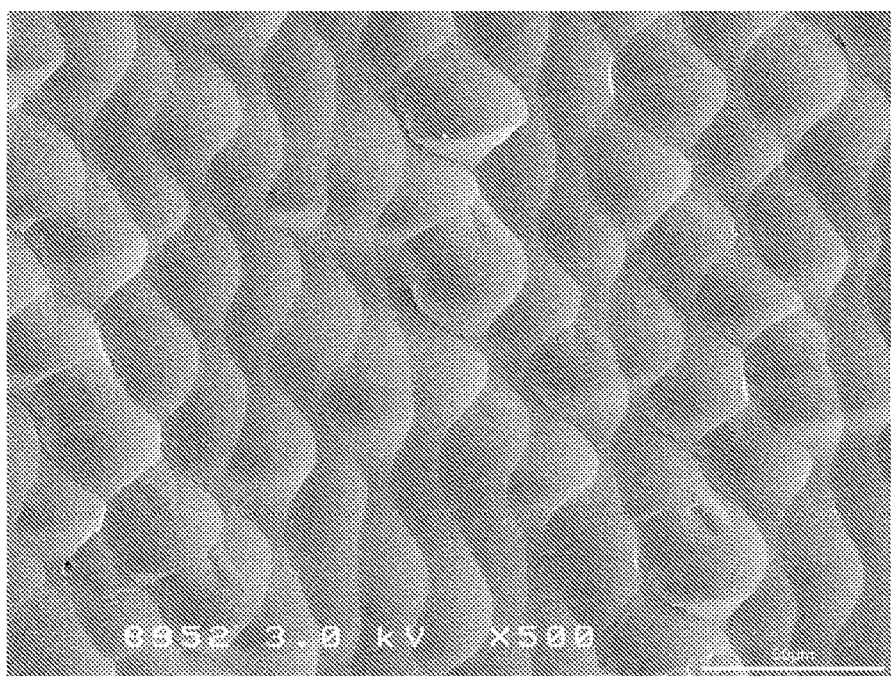
FIG. 4 is an SEM image of a portion of the structured surface of a Type I Microreplicated diffusing film (optical haze=91.3%, optical clarity=1.9%)

These PSD measurements were performed not only on optical diffusing films made according to the method of FIG. 9, but also on two Type I Microreplicated diffusing film samples. The two Type I Microreplicated diffusing film samples were made in general accordance with the teachings of the '622 Aronson et al., '593 Yapel et al., '475 Barbie, and '261 Aronson et al. references cited above, these two samples referred to herein as "Type I Micro-1" and "Type I Micro-4". These samples were made under differing conditions, and had different haze values. In particular, the Type I Micro-1 sample had a haze of 91.3% and clarity of 1.9%, and the Type I Micro-4 sample had a haze of 79.1% and a clarity of 4.5%. The SEM image in FIG. 4 is a picture of the Type I Micro-1 sample.

Figure 24A:
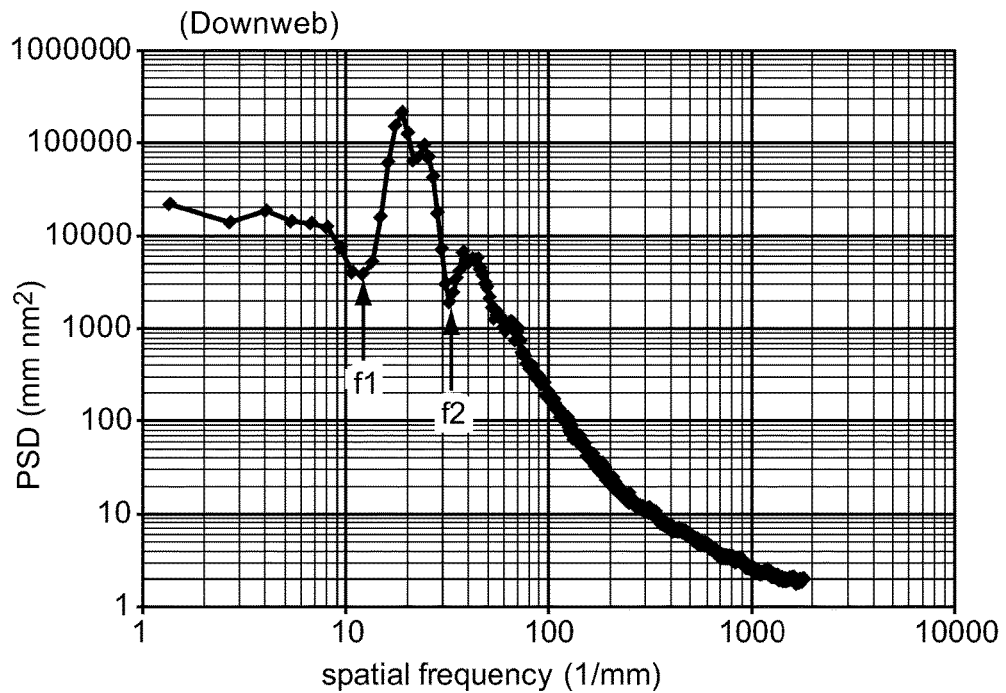
FIG. 24A is a graph of power spectral density vs. spatial frequency in a downweb direction for a sample of the Type I Microreplicated diffusing film (optical haze=91.3%, optical clarity=1.9%)
Figure 24B:
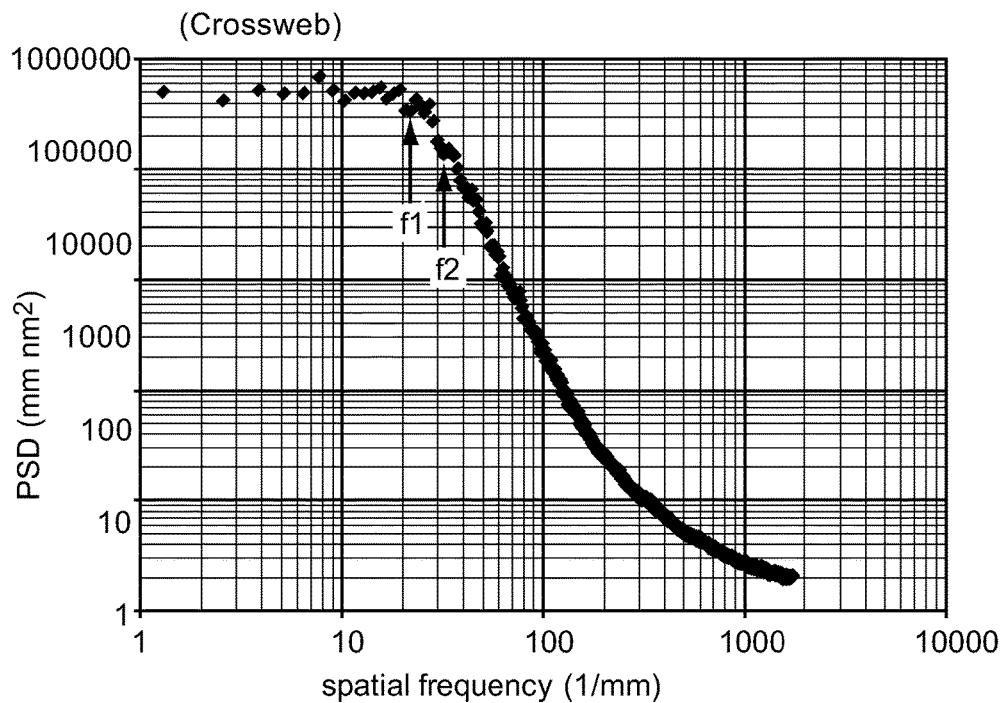
FIG. 24B is a similar graph for the same sample but in a perpendicular (crossweb) in-plane direction.

FIGS. 24A and 24B are graphs, for the downweb and crossweb in-plane directions respectively, of power spectral density vs. spatial frequency for the Type I Micro-1 sample. In each graph, "f1" and "f2" are the frequencies at which the most prominent peak was determined to start and end, respectively. Although these graphs use a logarithmic scale for the power spectral density (PSD), the A and B values used for the calculation of peak ratio were calculated based on a linear PSD scale, consistent with the description above.

Figure 25A:
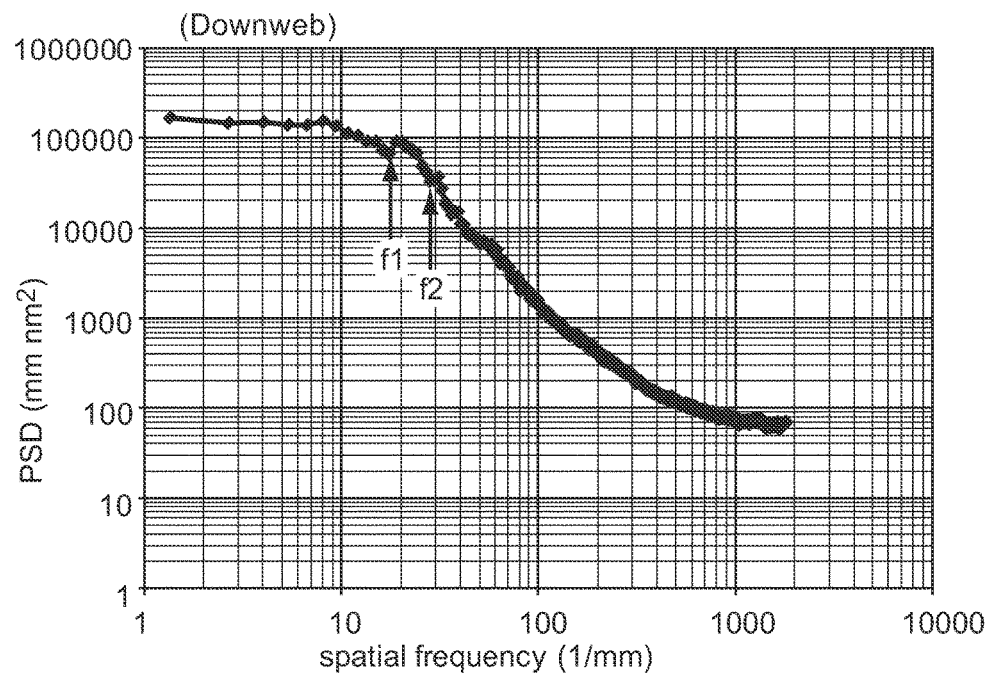
FIG. 25A is a graph of power spectral density vs. spatial frequency in a downweb direction for the optical diffusing film sample 502-1.
Figure 25B:
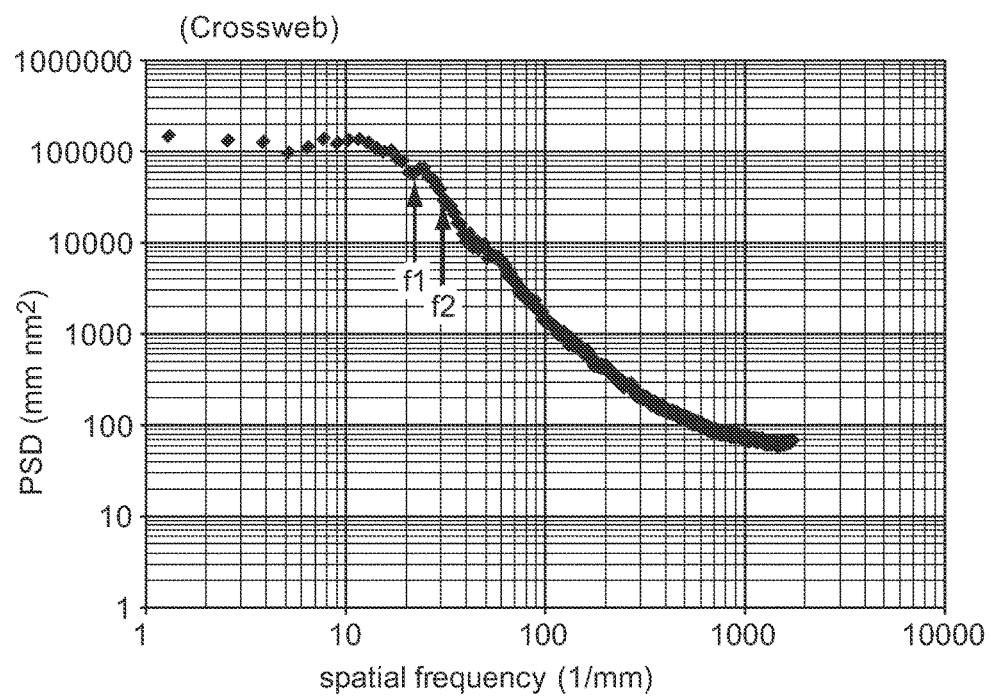
FIG. 25B is a similar graph for the same sample but in the crossweb direction.

FIGS. 25A and 25B are graphs for the downweb and crossweb directions respectively of power spectral density vs. spatial frequency for the optical diffusing film sample 502-1. The labels "f1" and "f2" have the same meanings in these figures as in FIGS. 23, 24A, and 24B. The A and B values used to calculate peak ratio were based on a linear PSD scale, even though a log scale is used in FIGS. 25A, 25B.

The calculated PSD peak ratios for seven of the optical diffusing films made in accordance with the method of FIG. 9, and for the two Type I Microreplicated diffusing film samples, are listed in Table 3.

TABLE 3

Measured PSD Peak Ratios

| Sample | Measured peak ratio (downweb) | Measured peak ratio (crossweb) |
|---|---|---|
| 502-1 | 0.24 | 0.15 |
| 594-1 | 0.12 | 0.23 |
| 502-2 | 0.10 | 0.17 |
| 593-2 | 0.19 | 0.12 |
| RA22a | 0.21 | 0.11 |
| RA13a | 0.14 | 0.76 |
| N3 | 0.08 | 0.21 |
| Type I Micro-1 | 0.94 | 0.19 |
| Type I Micro-4 | 0.99 | 0.84 |

In reviewing the results of Table 3, we see that for each of the optical diffusing films made in accordance with FIG.

9, the peak ratio for both in-plane directions (downweb and crossweb) is less than 0.8, and, in most cases, much less than 0.8. In comparison, although the Type I Micro-1 sample had a peak ratio of 0.19 in the crossweb direction, in all other cases the tested Type I Microreplicated diffusing films had peak ratios greater than 0.8. Thus, neither of the tested Type I Microreplicated diffusing films satisfies the condition that the peak ratio for both in-plane directions is less than 0.8.

In reviewing the results of Table 3, we also see that all except one of the tested film samples made in accordance with FIG. 9 also satisfy a more stringent condition that the peak ratio for both in-plane directions is less than 0.5, or 0.4, or 0.3. The relatively small values for peak ratio in both in-plane directions are suggestive of ultra-low spatial periodicity in the structured surfaces. The sample RA13a, however, does not meet the more stringent conditions. Out of all the tested film samples made in accordance with FIG. 9, the RA13a sample has by far the highest measured peak ratio, a ratio of 0.76 in the crossweb direction. In the orthogonal in-plane direction, the RA13a sample has a much smaller 0.14 peak ratio. Recall from the description above that the RA13a sample was made with a copper sheet starting material that contained periodic undulations, and these periodic undulations were transferred to the structured major surface of the RA13a sample during microreplication. In view of this, it is reasonable to conclude that if the substrate for RA13a had been substantially flat with no undulations, the peak ratio in the crossweb direction would be much closer to the downweb peak ratio of 0.14. Stated differently, to the extent a tool made in accordance with FIG. 9 is made using a flat substrate that has no underlying structure, such a tool (and any optical film made from the tool) is likely to have PSD peak ratios in both in-plane directions of less than 0.8, or 0.5, or 0.4, or 0.3.

Similarly, to the extent a tool made in accordance with FIG. 9 is made using a substrate that has significant underlying structure (whether periodic undulations, or more defined structure such as a prismatic BEF structured surface), such a tool (and any optical film made from the tool) is likely to exhibit a significant or large peak in the power spectral density curve for at least one in-plane direction, and is likely to have a significant or large PSD peak ratio in such in-plane direction. In such cases, by engaging in a more in-depth analysis of the PSD measurements, particularly if information is available about the underlying structure in the original substrate, one may distinguish between peaks in the power spectral density curve that are due to the underlying structure of the substrate used to form the tool, and peaks that are due to the structures that were formed as a result of the electroplating steps (see steps 903 and 904 in FIG. 9). Making such a distinction may be complex, because the spatial periodicit(ies) of the underlying structure need not be significantly different than any spatial periodicit(ies) of the electroplated structure, in fact, the spatial periodicities of these different structures types may in at least some cases substantially overlap. Nevertheless, if one succeeds in making such a distinction, then the condition for a structured surface that the PSD peak ratios in both in-plane directions be less than 0.8 (or 0.5, or 0.4, or 0.3) may still be satisfied by a structured surface that was made in accordance with FIG. 9 using a substrate with significant underlying structure, provided that any peaks in the power spectral density curves that are due to the underlying structure are disregarded.

The results given in Table 3 were obtained by identifying a most prominent peak, if present, in the power spectral density curve. And data for the power spectral density curves, as can be seen in FIGS. 24A through 25B, extended over a spatial frequency range from roughly 1 mm$^{-1}$ to almost 2000 mm$^{-1}$, hence, any peaks that may be present throughout that range are candidates in the determination of which peak is the most prominent, and they are also candidates with respect to the criterion that the PSD peak ratios in both in-plane directions are less than 0.8 (or 0.5, or 0.4, or 0.3). In practice, it may be advantageous to limit the spatial frequency range over which peaks in the power spectral density curves are considered for these analyses. For example, it may be advantageous to limit the spatial frequency range over which the PSD peak ratios in both in-plane directions are specified to be less than 0.8 (or 0.5, or 0.4, or 0.3), to a frequency range whose upper limit is 1000, or 500, or 100 mm$^{-1}$, and whose lower limit is 1, or 2, or 5 mm$^{-1}$.

Transverse Dimension or Size (ECD) Analysis

Figure 26:
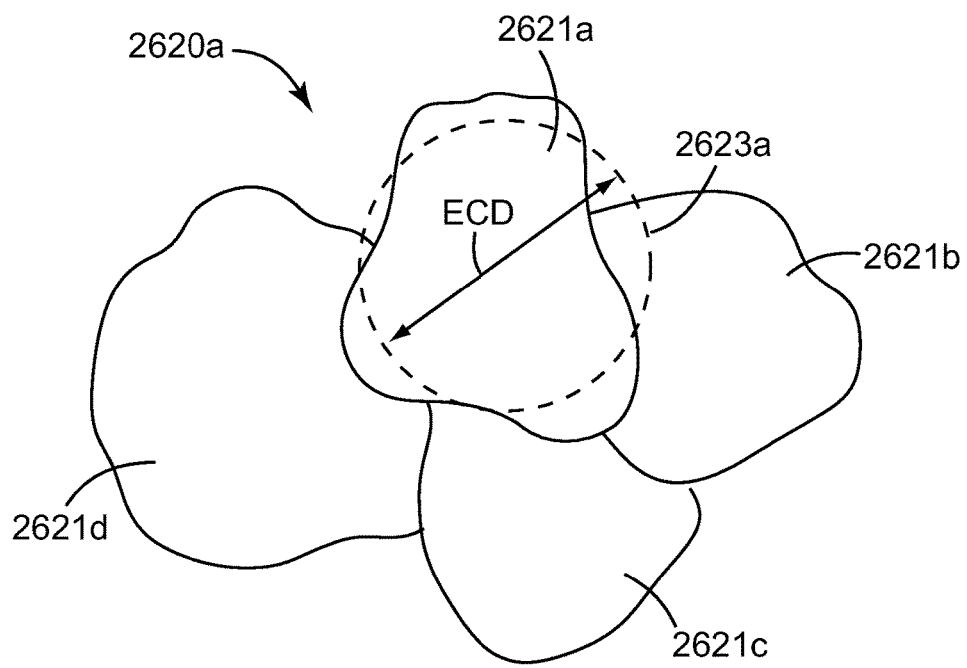
FIG. 26 is a schematic plan view of a portion of a hypothetical structured surface with distinguishable structures, demonstrating the concept of equivalent circular diameter (ECD)

For a structured surface in which distinct individual structures can be identified, the structured surface can be described in terms of a characteristic size, such as a transverse or in-plane dimension, of the structures. Each structure may for example be characterized as having a largest transverse dimension, a smallest transverse dimension, and an average transverse dimension. If the individual structures are limited in size along two orthogonal in-plane directions, e.g., not extending indefinitely in a linear fashion along any in-plane direction, each structure may be characterized as having an equivalent circular diameter "ECD". The ECD of a given structure may be defined as the diameter of a circle whose area in plan view is the same as the area in plan view of the structure. For example, with reference to FIG. 26, a plan view of a hypothetical structured surface 2620a is shown. The structured surface comprises distinguishable structures 2621a, 2621b, 2621c, 2621d, which may be protrusions or cavities. A circle 2623a is superimposed on the structure 2621a, the circle allegedly having in this plan view an area equal to that of the structure 2621a. The diameter (ECD) of the circle 2623a is the equivalent circular diameter (ECD) of the structure 2621a. By averaging the ECD values for all of the structures in a representative portion of the structured surface, the structured surface or structures thereof may then be said to have an average equivalent circular diameter $ECD_{avg}$.

Figure 27:
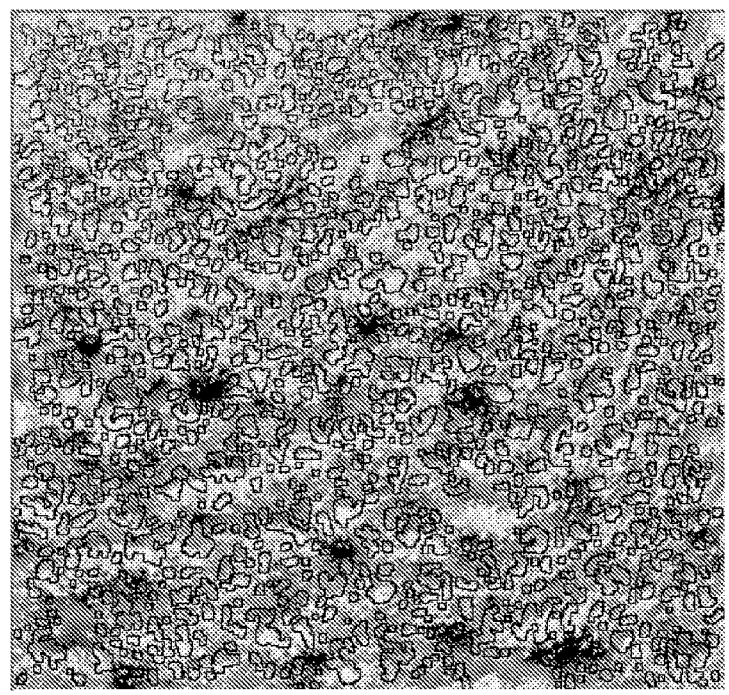
FIG. 27 is a composite image of a picture of the CCS diffuser through a confocal microscope, on which dark shapes representing the outer boundaries or edges of individual structures of the structured surface are superimposed.
Figure 28:
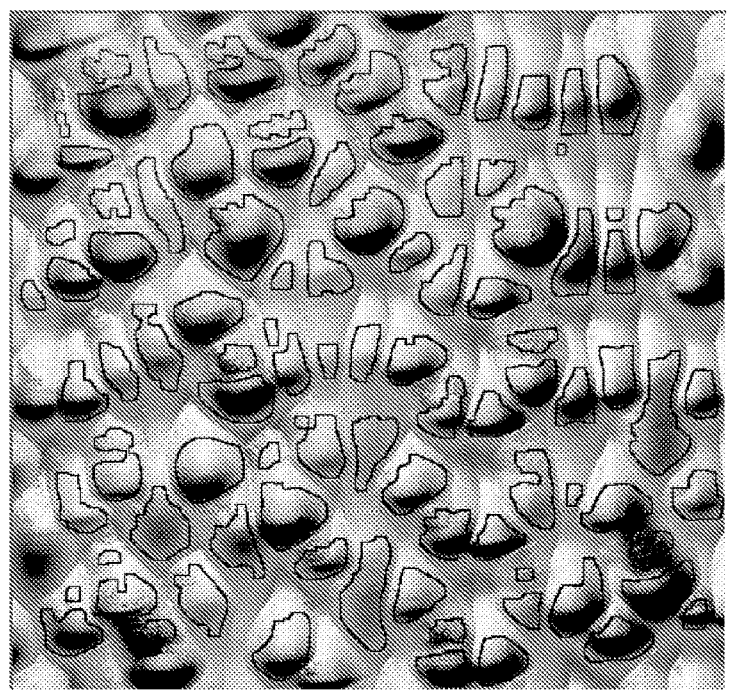
FIG. 28 is a composite image of a picture of a Type I Microreplicated diffusing film sample (optical haze=91.3%, optical clarity=1.9%) through a confocal microscope, on which dark shapes representing the outer boundaries or edges of individual structures of the structured surface are superimposed.
Figure 29:
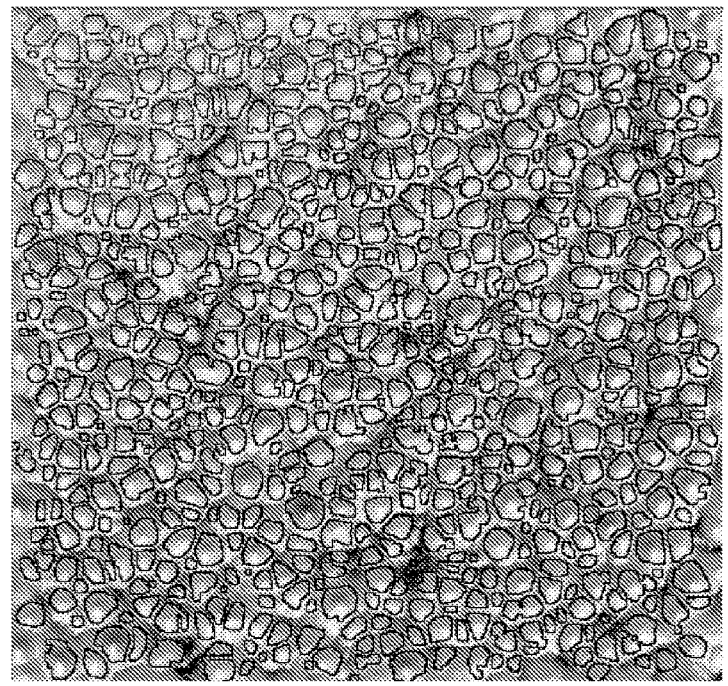
FIG. 29 is a composite image similar to FIGS. 27 and 28, but for the optical diffusing film sample 594-1.
Figure 30:
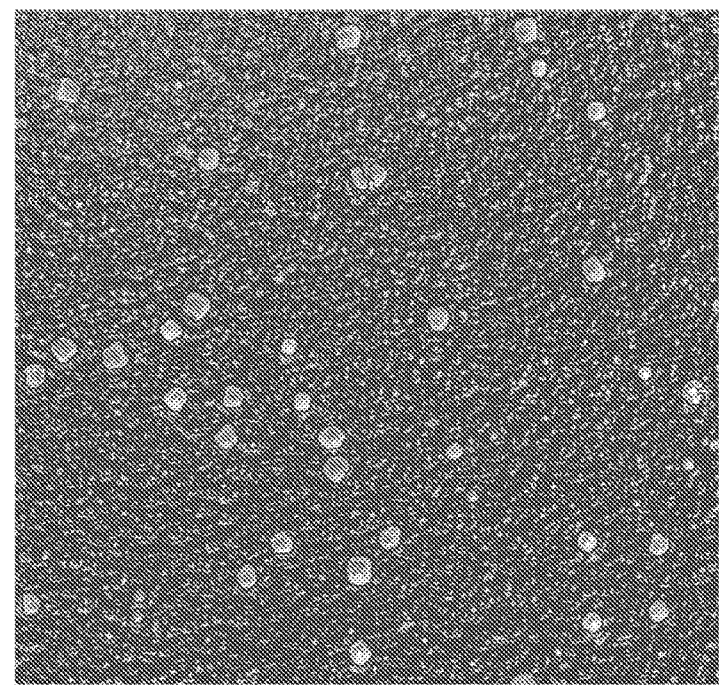
FIG. 30 is a composite image similar to FIGS. 27 through 29, but for the optical diffusing film sample 502-1.

We undertook a systematic analysis of structure size for a number of optical diffusing films. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Depending on what type of structure was predominant in the sample, either peaks or valleys were sized. A consistent and repeatable methodology was established for sizing the individual structures that were identified on the structured surface. The composite images of FIGS. 27-30 provide an indication of how this was done. In these composite images, dark outline shapes are superimposed on a picture of the structured surface through a confocal microscope. The dark outline shapes are the computed outer boundaries or edges of individual structures of the structured surface. FIG. 27 is such a composite image for the CCS diffuser. FIG. 28 is for the Type I Micro-1 sample discussed above. FIG. 29 is for the optical diffusing film sample 594-1. FIG. 30 is for the optical diffusing film sample 502-1. Using such images and techniques, the ECD of typically hundreds and in some cases thousands of structures was calculated for a given structured surface. The ECD measurements and measurement statistics are summarized as follows:

TABLE 4

Measured ECD Statistics

| Sample | ECD mean (um) | ECD median (um) | ECD sigma (um) |
| --- | --- | --- | --- |
| 502-1 | 10.3 | 9.7 | 3.6 |
| 594-1 | 6.1 | 6.1 | 2.6 |
| 593-2 | 5.8 | 5.5 | 2.5 |
| RA13a | 58.3 | 58.5 | 17.5 |
| N3 | 6.3 | 6.0 | 3.3 |
| Type I Micro-1 | 15.0 | 15.8 | 4.7 |
| Type I Micro-2 | 15.3 | 17.3 | 5.6 |
| Type I Micro-3 | 16.5 | 17.8 | 4.6 |
| Type I Micro-4 | 16.8 | 17.5 | 3.5 |
| Type I Micro-5 | 17.6 | 18.1 | 3.5 |
| Type I Micro-6 | 17.5 | 18.3 | 4.2 |
| Type II Micro | 9.2 | 8.8 | 2.8 |
| CCS Diffuser | 3.6 | 3.0 | 2.0 |

The samples Type I Micro-2, Type I Micro-3, Type I Micro-5, and Type I Micro-6 are additional Type I Microreplicated diffusing film samples that were made in general accordance with the teachings of the '622 Aronson et al., '593 Yapel et al., '475 Barbie, and '261 Aronson et al. references cited above. The Type I Micro-2 sample had a haze of 90.7% and clarity of 2.9%, the Type I Micro-3 sample had a haze of 84.8% and a clarity of 4.7%, the Type I Micro-5 sample had a haze of 73.9% and a clarity of 5.5%, and the Type I Micro-6 sample had a haze of 68.2% and a clarity of 4.9%. The Type II Micro sample in Table 4 was an optical diffusing film similar to the Type II Microreplicated diffusing film shown in FIG. 5, but the Type II Micro sample of Table 4 had a haze of 91.1% and a clarity of 9.8%.

In reviewing the results of Table 4, we see that, except for the RA13a sample, each of the optical diffusing films made in accordance with FIG. 9 had an average (mean) ECD of less than 15 microns, and most had an average ECD of less than 10 microns, or in a range from 4 to 10 microns. This was in contrast to the average ECD of the Type II Microreplicated diffusing film samples, which was generally at least 15 microns or more. The RA13a sample had a substantially higher average ECD than any of the other films made in accordance with FIG. 9. The periodic undulations of the RA13a sample discussed above are believed to be the reason for this large difference. That is, it is reasonable to conclude that if the substrate for RA13a had been substantially flat with no undulations, the average ECD would have been much closer to that of the other similarly fabricated films, e.g., less than 15 and less than 10 microns.

Figure 31:
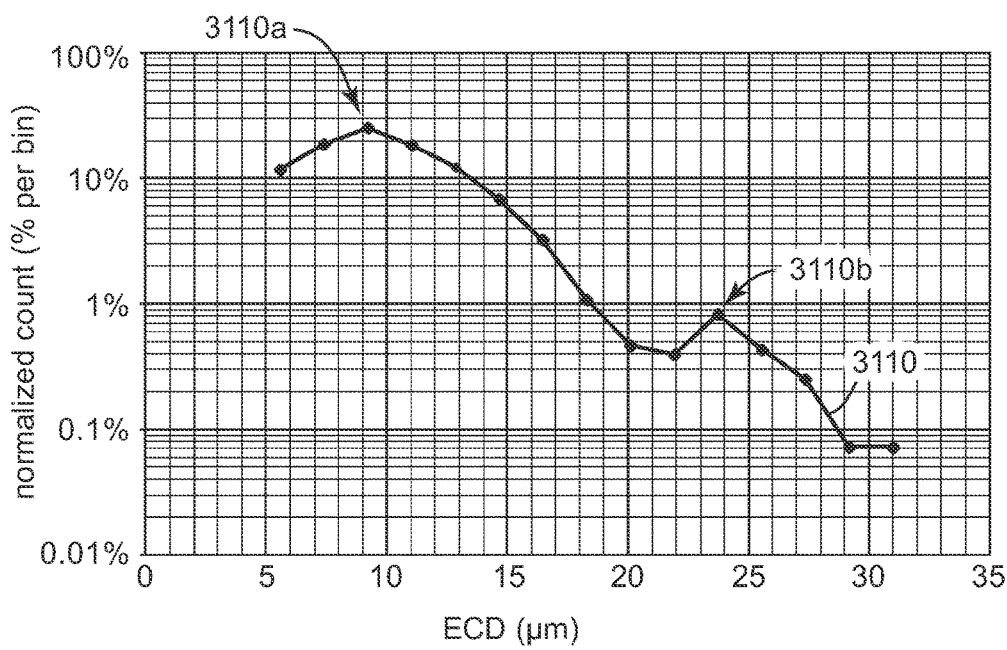
FIG. 31 is a graph of normalized count versus ECD for a representative sampled area of the optical diffusing film sample 502-1.

The structured surfaces of some of the samples made by the method of FIG. 9 were observed to contain a combination of irregularly arranged larger pyramidal structures, between which closely-packed smaller structures were irregularly dispersed. One such sample was 502-1. An analysis of the structured surface was done, and the results, shown as curve 3110 in the graph of FIG. 31, demonstrate that the surface has a bimodal distribution of structure sizes. The graph of FIG. 31 plots the normalized count (in percent per bin) as a function of ECD in microns. Curve 3110 is seen to have a larger peak 3110a and a smaller peak 3110b. The larger peak 3110a is located at about ECD=8 microns, and corresponds to the smaller structures on the structured surface. The smaller peak 3110b is located at about ECD=24 microns, and corresponds to the larger pyramidal structures.

Thus, the average size of the smaller structures is less than 15 microns, and less than 10 microns, and the average size of the larger structures is greater than 15 microns, and greater than 20 microns. Due to the smaller population of the larger structures, the average ECD for all structures (large and small) on the structured surface is 10.3 microns, as reported in Table 4.

Aspect Ratio of Height to Transverse Dimension (ECD) Analysis

Some of the films made by the method of FIG. 9 had structured surfaces in which individual structures were closely packed and, in some cases, the structures were also curved or had curved base surfaces. We decided to investigate the relationship between the in-plane or transverse dimension (e.g. ECD) of the structures and the mean height of the structures. In general, the term "height" is broad enough to refer to the height of a protrusion as well as to the depth of a cavity. For comparison purposes we included in our investigation the DPB diffuser, which has a densely-packed beaded surface.

Figure 32:
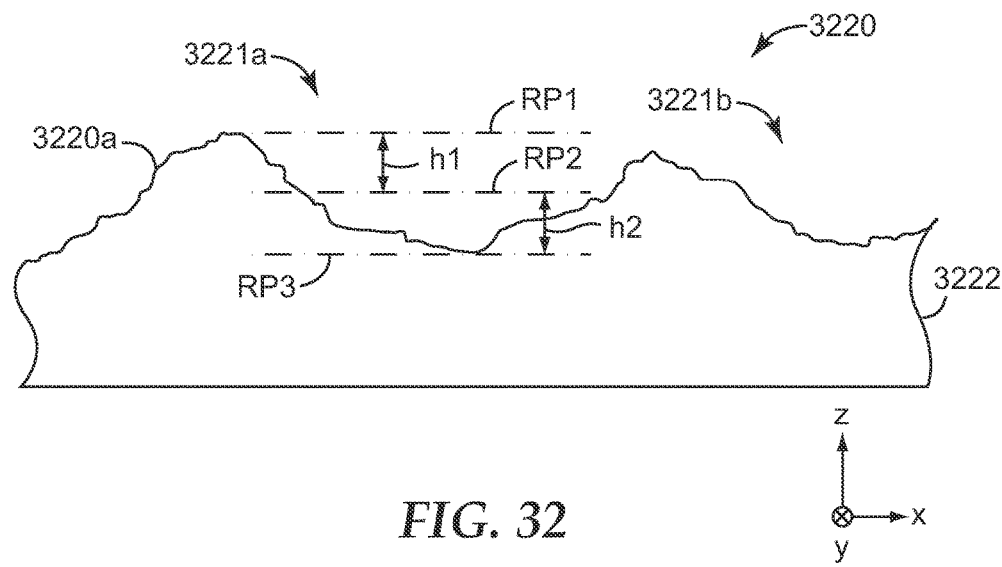
FIG. 32 is a schematic side or sectional view of a portion of a hypothetical structured surface with distinguishable structures, demonstrating the concept of maximum height or depth.

The height of an exemplary structure is illustrated in the drawing of a hypothetical structured surface in FIG. 32. In the figure, an optical diffusing film 3220 includes a patterned layer 3222 with a structured major surface 3220a. The structured surface 3220a includes discernible individual structures 3221a, 3221b. The structured surface extends along or defines an x-y plane. Three reference planes parallel to the x-y plane are shown: RP1, RP2, and RP3. The reference planes RP1, RP3 may be defined in terms of the highest and lowest portions (respectively) of the structure 3221a. The reference plane RP2 may be located at a position corresponding to zero or near-zero curvature, i.e., the surface at that position is neither curved inwardly, as at the top of a peak, nor curved outwardly, as at the bottom of a cavity. Given these reference planes, one can define a height h1 between RP1 and RP2, and a height h2 between RP2 and RP3.

We undertook a systematic analysis of determining an aspect ratio of structures on a given structured surface, the aspect ratio being the height divided by the ECD of the structure. For the height of the structure, we elected to use a value corresponding substantially to h1 shown in FIG. 32. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Valleys (cavities) in the structured surfaces were sized; however, when evaluating the structured surface of the DPB diffuser, the height profile of the structured surface was inverted before sizing to convert peaks to valleys, for ease of calculation. As was done with the ECD measurements described above, a consistent and repeatable methodology was established for sizing the individual structures that were identified on the structured surface. The methodology was then modified to add the measurement of the height to diameter aspect ratio (Hmean/ECD). The ratio was calculated for each structure (valley region). The height Hmean was the mean height on the perimeter of the structure (valley region) minus the minimum height in the structure (valley region). The height map in the valley region was tilt corrected using the data points on the perimeter before the height was measured. The mean aspect ratios for the tested samples were calculated, and are shown in Table 5.

TABLE 5

Aspect Ratio

| Sample | mean aspect ratio |
|---|---|
| 502-1 | 0.078 |
| 594-1 | 0.069 |
| 597-2 | 0.006 |
| DPB diffuser | 0.210 |

In reviewing the results of Table 5, we see that the samples made by the method of FIG. 9 can be readily distinguished from the DPB diffuser on the basis of aspect ratio. For example, the average aspect ratio of the former samples is less than 0.15, or less than 0.1.

Ridge Analysis

As mentioned above, some of the films made by the method of FIG. 9 had structured surfaces in which individual structures were closely packed. The closely packed structures tend to produce ridge-like features, although ridge-like features may also occur in the absence of closely packed structures. We decided to investigate aspects of ridges on structured surfaces. In particular, we investigated the extent to which ridges were present on the structured surface. We quantified this by calculating the total ridge length per unit area of structured surface in plan view. This was done for many of the samples made according to the method of FIG. 9, and, for comparison purposes, we also included several beaded diffusers: the SDB diffuser, the CCS diffuser, and the DPB diffuser.

Figure 33:
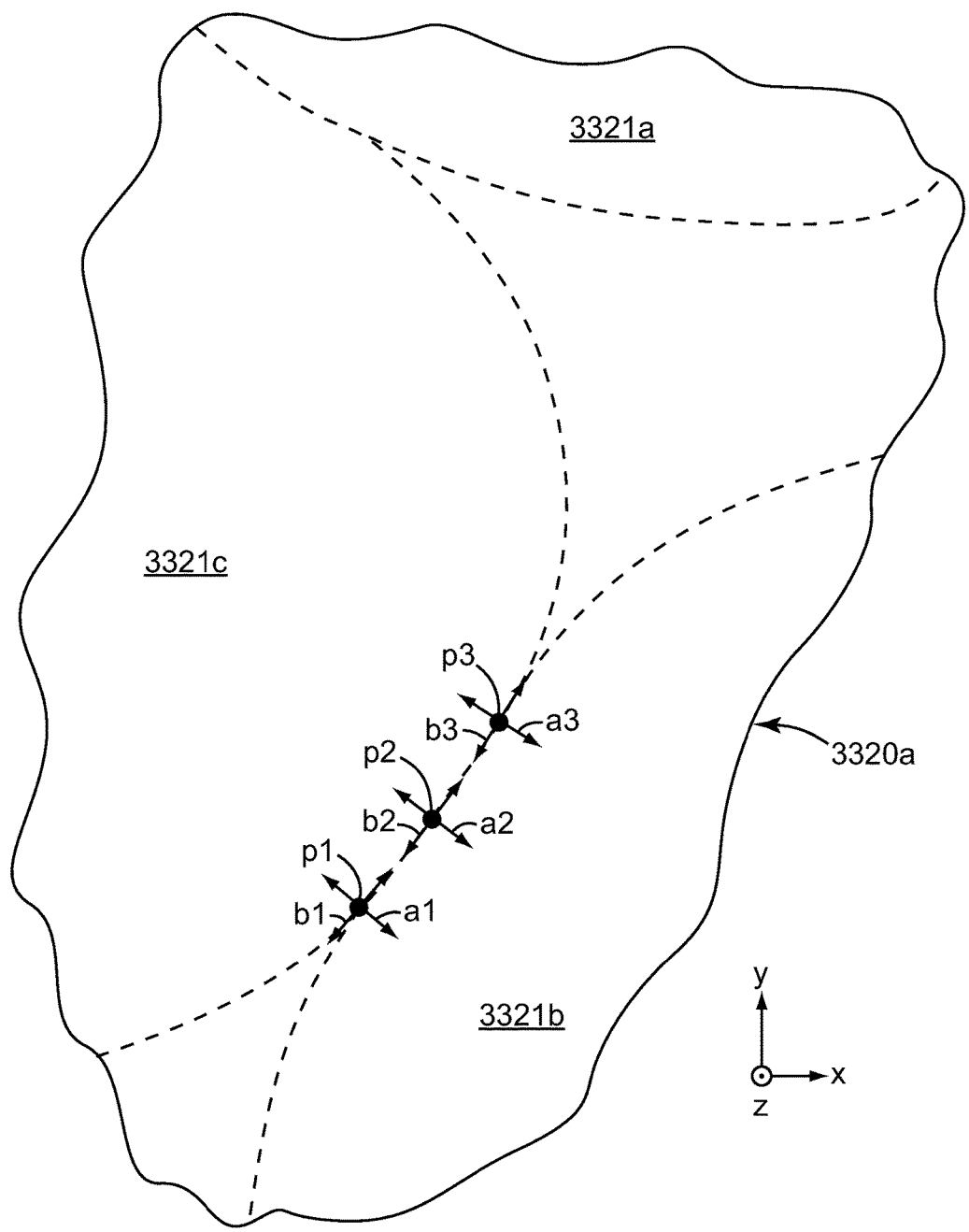
FIG. 33 is a schematic plan view of hypothetical individual structures on a structured surface, demonstrating criterion used to determine the presence of a ridge on the structured surface.

A ridge is illustrated in the drawing of a hypothetical structured surface in FIG. 33. In the figure, an optical diffusing film includes a structured major surface 3320a. The structured surface 3320a includes discernible individual structures 3321a, 3321b, 3321c. The structured surface extends along or defines an x-y plane. A ridge, which may be described as a long, sharp, peaked region, is formed along at least a short segment at which the boundaries of the structures 3321a, 3321b come together. The ridge or segment includes points p1, p2, p3. The local slope and curvature at each of these points, based on the known topography, can be calculated along directions (see axes a1, a2, a3) that are parallel to a gradient and perpendicular to the ridge, as well as along directions (see axes b1, b2, b3) that are perpendicular to the gradient and parallel to the ridge. Such curvatures and slopes can be used to confirm that the points lie on a long, sharp peaked region. For example, points on the ridge may be identified by: a sufficiently different curvature along the two perpendicular directions (e.g. a1, b1); a sharp curvature perpendicular to the ridge (e.g. a1); a slope in the gradient direction (e.g. along the ridge, see b1) that is less than the average slope; and a segment length that is sufficiently long.

We undertook a systematic analysis of determining the ridge length per unit area on a given structured surface using the foregoing principles. For a given optical diffusing film sample, a ~1×1 cm piece of the sample was cut from the central portion of the sample. The sample piece was mounted on a microscope slide, and its structured surface was Au—Pd sputter-coated. Two height profiles of the structured surface were obtained using confocal scanning laser microscopy (CSLM). Whenever possible, fields of view were chosen to give a good sampling of the topography. Ridge analysis was used to analyze the height profiles in accordance with the above principles.

The ridge analysis identified the peaks of ridges on a 2D height map and calculated the total length of ridges per unit sample area. Curvature along the gradient direction and transverse to the gradient direction was calculated about each pixel. Thresholding on the curvature and slope were carried out to identify ridges.

The following is the definition of a ridge that was used in the ridge analysis.
1. Curvature definitions: (a) gcurvature is the curvature along the gradient direction; (b) tcurvature is the curvature along the direction transverse (perpendicular) to the gradient direction; (c) gcurvature is calculated by using three points along the gradient and calculating the circle that circumscribes the three points; the gcurvature=1/R, where R is the radius of this circle; (d) tcurvature is calculated by using three points along the direction transverse to the gradient and calculating the circle that circumscribes the three points; the gcurvature=1/R, where R is the radius of this circle; (e) the curvature is assigned to the center point of these three points; (f) the spacing of the three points is chosen to be large enough to reduce the contribution by fine features that are not of interest but small enough so that the contribution by features of interest is preserved.
2. The curvature of a point on the ridge is sufficiently different between two perpendicular directions. (a) The gcurvature and tcurvature differ by at least a factor of 2 (either can be larger).
3. The ridge is sharper than most of the valleys. (a) Curvature is greater than the absolute value of the 1 percentile point of the gcurvature distribution (1% of the gcurvature is lower than the 1 percentile point).
4. The slope is lower than the mean slope. (a) gslope (slope along the gradient) on ridge is less than the mean gslope of the surface. (b) The slope on the top of a ridge is typically near zero unless it is on a highly sloped surface.
5. The ridge is sufficiently long. (a) A potential ridge is not considered a ridge if its total length (including branches) is shorter than the mean radius of curvature along the potential ridge top; (b) A potential ridge is not considered a ridge if its total length is shorter than 3 times the mean width of the potential ridge; (c) Note that these dimensions are measured approximately.
6. Branches are sufficiently long. (a) A branch from the midsection of a ridge is considered a continuation of the ridge if it is longer than 1.5 times the mean width of the ridge. Otherwise, it is removed; (b) Note that these dimensions are measured approximately.

Figure 34A:
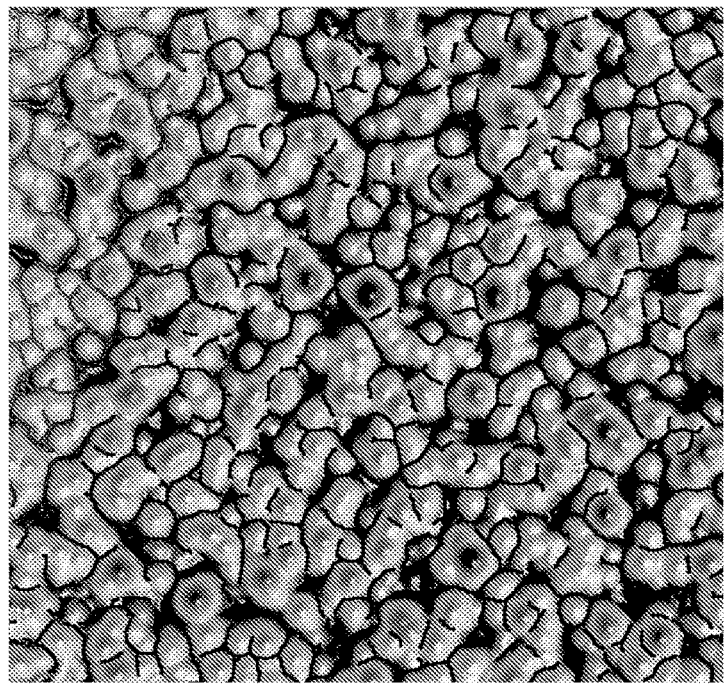
FIG. 34A is a composite image of a picture of the optical diffusing film sample 594-1 through a confocal microscope, on which dark line segments representing ridges that were detected on the structured surface are superimposed.
Figure 34B:
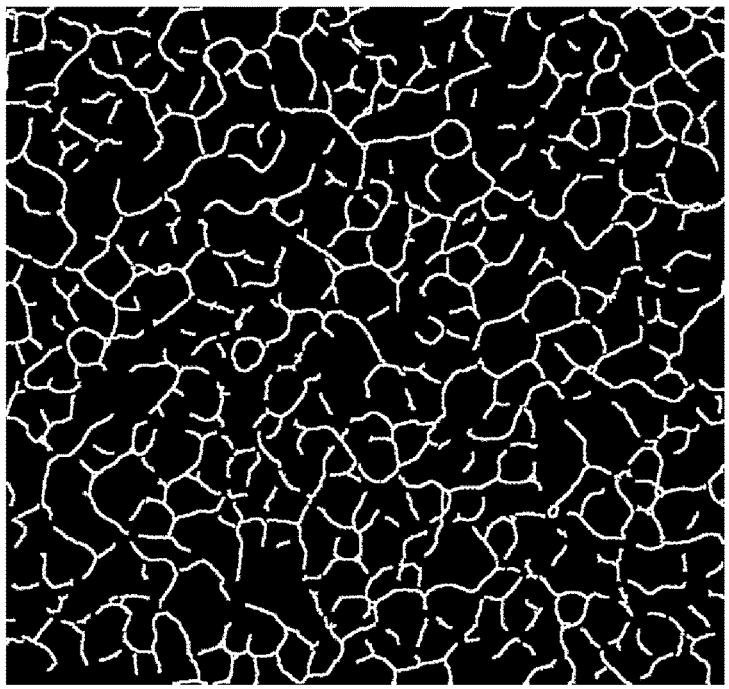
FIG. 34B is an image that shows only the dark line segments of FIG. 34a, i.e., only the detected ridges, in reverse printing (dark/light reversed)
Figure 35A:
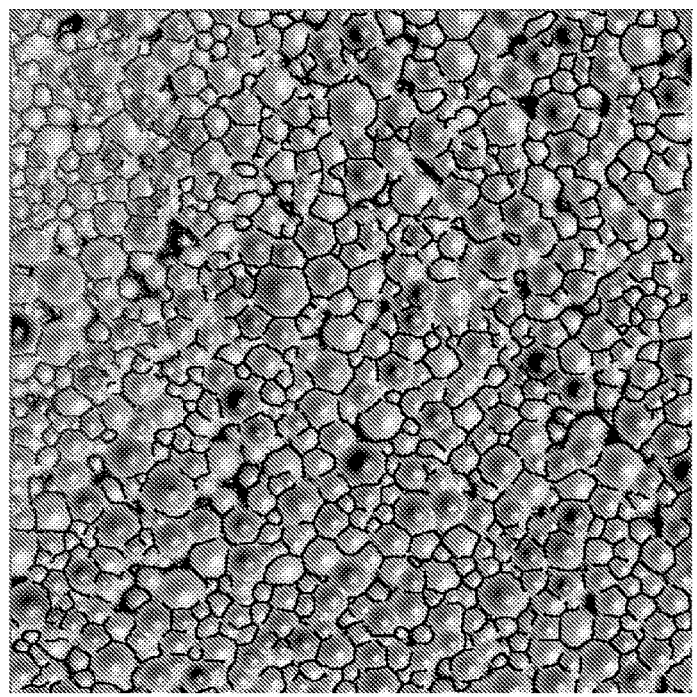
FIGS. 35A and 35B are analogous to FIGS. 34A and 34B respectively, but for the DPB diffuser.
Figure 35B:
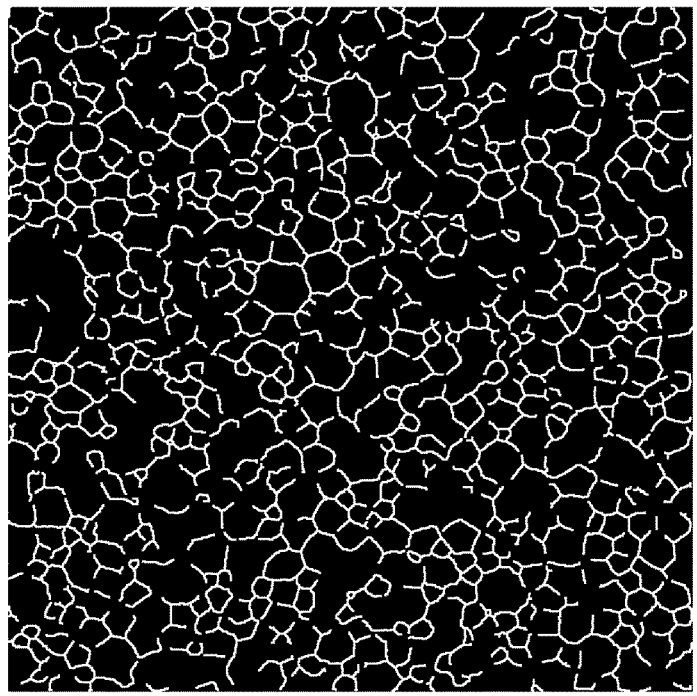

The composite images of FIGS. 34A and 35A provide an indication of how the systematic ridge identification was done. In these composite images, dark line segments are superimposed on a picture of the structured surface through a confocal microscope. The dark line segments are areas of the structured surface identified as ridges. FIG. 34A is such a composite image for the 594-1 sample. FIG. 35A is for the DPB diffuser. FIG. 34B corresponds to FIG. 34A, but shows only the dark line segments (i.e. the detected ridges) but in reverse printing so the ridges can be more easily seen. FIG. 35B likewise corresponds to FIG. 35A, but shows only the dark line segments and in reverse printing.

After identifying the ridges, the total length of all the ridges in the height map was calculated and divided by the area of the height map. This analysis was also repeated for identifying valley ridges by inverting the height maps before running the analysis. Note that the DPB sample was inverted to begin with. Using such images and techniques, the ridge length per area was calculated for the tested structured surfaces. The results of these measurements are summarized as follows:

TABLE 6

Measured Ridge Length per Area

| Sample | Ridge Length per Area (mm/mm$^2$) |
|---|---|
| 502-1 | 47.3 |
| 507-1 | 48.3 |
| 551-1 | 29.7 |
| 554-1 | 111.8 |
| 594-1 | 109.5 |
| 597-1 | 44.2 |
| 599-1 | 89.3 |
| 600-1 | 116.8 |
| 502-2 | 32.3 |
| 551-2 | 18.8 |
| 554-2 | 35.2 |
| 593-2 | 36.4 |
| 597-2 | 1.1 |
| 600-2 | 0.1 |
| N3 | 50.5 |
| L27B | 0.3 |
| RA24a | 0.2 |
| RA13a | 0.0 |
| SDB diffuser | 2.2 |
| CCS diffuser | 4.4 |
| DPB diffuser | 244.8 |

In reviewing the results of Table 6, we see that all or most of the non-beaded samples made by the method of FIG. 9 have structured surfaces characterized by a total ridge length per unit area in plan view of less than 200 mm/mm$^2$, and less than 150 mm/mm$^2$, and in a range from 10 to 150 mm/mm$^2$.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The following are exemplary embodiments according to the present disclosure:

Item 1. A method of making a structured surface, comprising:
  forming a first layer of a metal by electrodepositing the metal using a first electroplating process resulting in a first major surface of the first layer having a first average roughness; and
  forming a second layer of the metal on the first major surface of the first layer by electrodepositing the metal on the first major surface using a second electroplating process resulting in a second major surface of the second layer having a second average roughness smaller than the first average roughness.

Item 2. The method of item 1, wherein the first electroplating process uses a first electroplating solution and the second electroplating process uses a second electroplating solution, the second electroplating solution differing from the first electroplating solution at least by the addition of an organic leveler.

Item 3. The method of item 1, wherein the second electroplating process comprises thieving.

Item 4. The method of item 1, wherein the second electroplating process comprises shielding.

Item 5. The method of item 1, wherein the first electroplating process uses a first electroplating solution and the second electroplating process uses a second electroplating solution, the second electroplating solution differing from the first electroplating solution at least by the addition of an organic grain refiner.

Item 6. The method of item 1, further comprising:
  providing a base surface having a base average roughness;
  wherein the first layer is formed on the base surface, and wherein the first average roughness is greater than the base average roughness.

Item 7. The method of Item 1, wherein the metal is copper.

Item 8. The method of item 1, wherein the first electroplating process uses a first electroplating solution that contains at most trace amounts of an organic leveler.

Item 9. The method of item 8, wherein the first electroplating solution has a total concentration of organic carbon less than 100, or 75, or 50 ppm.

Item 10. The method of item 1, wherein the first electroplating process uses a first electroplating solution and the second electroplating process uses a second electroplating solution, and wherein a ratio of a concentration of an organic leveler in the second electroplating solution to a concentration of any organic leveler in the first electroplating solution is at least 50, or 100, or 200, or 500.

Item 11. The method of item 1, wherein forming the first layer results in the first major surface comprising a plurality of non-uniformly arranged first structures.

Item 12. The method of item 11, wherein the first structures comprise flat facets.

Item 13. The method of item 11, wherein forming the second layer results in the second major surface comprising a plurality of non-uniformly arranged second structures.

Item 14. The method of item 13, further comprising:
  forming a third layer of a second metal on the second major surface by electrodepositing the second metal using an electroplating solution of the second metal.

Item 15. The method of item 14, wherein the second metal comprises chromium.

Item 16. A microreplication tool made using a method according to item 1, such that the microreplication tool has a tool structured surface corresponding to the second major surface.

Item 17. The microreplication tool of item 16, wherein the tool structured surface corresponds to an inverted form of the second major surface or a non-inverted form of the second major surface.

Item 18. The microreplication tool of item 16, wherein the microreplication tool includes the first layer of the metal, the second layer of the metal, and a third layer of a second metal formed on the second layer.

Item 19. An optical film made using the microreplication tool of item 16, such that the film has a structured surface corresponding to the second major surface.

Item 20. The optical film of item 19, wherein the structured surface of the film corresponds to an inverted form of the second major surface or a non-inverted form of the second major surface.

Item 21. An optical film, comprising:
a structured major surface comprising closely-packed structures arranged such that ridges are formed between adjacent structures, the structures being limited in size along two orthogonal in-plane directions;
wherein the structured major surface has a topography characterizable by a first and second Fourier power spectrum associated with respective first and second orthogonal in-plane directions, and wherein
to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
wherein the structured major surface is characterized by a total ridge length per unit area in plan view of less than 200 mm/mm$^2$.

Item 22. The film of item 21, wherein the total ridge length per unit area is less than 150 mm/mm$^2$.

Item 23. The film of item 22, wherein the total ridge length per unit area is in a range from 10 to 150 mm/mm$^2$.

Item 24. The film of item 21, wherein the first peak ratio is less than 0.5 and the second peak ratio is less than 0.5.

Item 25. The film of item 21, wherein the structured major surface provides an optical haze of at least 5% and less than 95%.

Item 26. The film of item 21, wherein the closely-packed structures are characterized by equivalent circular diameters (ECDs) in plan view, and wherein the structures have an average ECD of less than 15 microns.

Item 27. The film of item 26, wherein the structures have an average ECD of less than 10 microns.

Item 28. The film of item 26, wherein the structures have an average ECD in a range from 4 to 10 microns.

Item 29. The film of item 21, wherein the structured major surface comprises substantially no beads.

Item 30. The film of item 21, wherein at least some of the closely-packed structures comprise curved base surfaces.

Item 31. The film of item 30, wherein most of the closely-packed structures comprise curved base surfaces.

Item 32. The film of item 31, wherein substantially all of the closely-packed structures comprise curved base surfaces.

Item 33. An optical film, comprising:
a structured major surface comprising closely-packed structures, the structured major surface defining a reference plane and a thickness direction perpendicular to the reference plane;
wherein the structured major surface has a topography characterizable by a first and second Fourier power spectrum associated with respective first and second orthogonal in-plane directions, and wherein
to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak;
wherein the closely-packed structures are characterized by equivalent circular diameters (ECDs) in the reference plane and mean heights along the thickness direction, and wherein an aspect ratio of each structure equals the mean height of the structure divided by the ECD of the structure; and
wherein an average aspect ratio of the structures is less than 0.15.

Item 34. The film of item 33, wherein the structured major surface is characterized by a total ridge length per unit area in plan view of less than 200 mm/mm$^2$.

Item 35. The film of item 34, wherein the total ridge length per unit area is less than 150 mm/mm$^2$.

Item 36. The film of item 35, wherein the total ridge length per unit area is in a range from 10 to 150 mm/mm$^2$.

Item 37. The film of item 33, wherein the first peak ratio is less than 0.5 and the second peak ratio is less than 0.5.

Item 38. The film of item 33, wherein the structured major surface provides an optical haze of at least 5% and less than 95%.

Item 39. The film of item 33, wherein the closely-packed structures are characterized by equivalent circular diameters (ECDs) in plan view, and wherein the structures have an average ECD of less than 15 microns.

Item 40. The film of item 39, wherein the structures have an average ECD of less than 10 microns.

Item 41. The film of item 39, wherein the structures have an average ECD in a range from 4 to 10 microns.

Item 42. The film of item 33, wherein the structured major surface comprises substantially no beads.

Item 43. The film of item 33, wherein at least some of the closely-packed structures comprise curved base surfaces.

Item 44. The film of item 43, wherein most of the closely-packed structures comprise curved base surfaces.

Item 45. The film of item 44, wherein substantially all of the closely-packed structures comprise curved base surfaces.

Item 46. An optical film, comprising:
a structured major surface comprising closely-packed structures having curved base surfaces;
wherein the structured major surface has a topography characterizable by a first and second Fourier power spectrum associated with respective first and second orthogonal in-plane directions, and wherein
to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and wherein the structured major surface provides an optical haze of less than 95%.

Item 47. The film of item 46, wherein the structured major surface provides an optical haze of less than 90%.

Item 48. The film of item 47, wherein the structured major surface provides an optical haze of less than 80%.

Item 49. The film of item 47, wherein the structured major surface provides an optical haze in a range from 20 to 80%.

Item 50. The film of item 46, wherein the structured major surface is characterized by a total ridge length per unit area in plan view of less than 200 mm/mm$^2$.

Item 51. The film of item 46, wherein the first peak ratio is less than 0.5 and the second peak ratio is less than 0.5.

Item 52. The film of item 46, wherein the closely-packed structures are characterized by equivalent circular diameters (ECDs) in plan view, and wherein the structures have an average ECD of less than 15 microns.

Item 53. The film of item 52, wherein the structures have an average ECD of less than 10 microns.

Item 54. The film of item 52, wherein the structures have an average ECD in a range from 4 to 10 microns.

Item 55. The film of item 46, wherein the structured major surface comprises substantially no beads.

Item 56. An optical film, comprising:
 a structured major surface comprising closely-packed structures;
 wherein the structured major surface has a topography characterizable by a first and second Fourier power spectrum associated with respective first and second orthogonal in-plane directions, and wherein
  to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
  to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak; and
 wherein the structured major surface provides an optical haze in a range from 10 to 60% and an optical clarity in a range from 10 to 40%.

Item 57. The film of item 56, wherein the structured major surface provides an optical haze in a range from 20 to 60% and an optical clarity in a range from 10 to 40%.

Item 58. The film of item 57, wherein the structured major surface provides an optical haze in a range from 20 to 30% and an optical clarity in a range from 15 to 40%.

Item 59. The film of item 56, wherein the structured major surface is characterized by a total ridge length per unit area in plan view of less than 200 mm/mm$^2$.

Item 60. The film of item 56, wherein the first peak ratio is less than 0.5 and the second peak ratio is less than 0.5.

Item 61. The film of item 56, wherein the closely-packed structures are characterized by equivalent circular diameters (ECDs) in plan view, and wherein the structures have an average ECD of less than 15 microns.

Item 62. The film of item 61, wherein the structures have an average ECD of less than 10 microns.

Item 63. The film of item 62, wherein the structures have an average ECD in a range from 4 to 10 microns.

Item 64. The film of item 56, wherein the structured major surface comprises substantially no beads.

Item 65. An optical film, comprising:
 a structured major surface comprising larger first structures and smaller second structures, the first and second structures both being limited in size along two orthogonal in-plane directions;
 wherein the first structures are non-uniformly arranged on the major surface;
 wherein the second structures are closely packed and non-uniformly dispersed between the first structures; and
 wherein an average size of the first structures is greater than 15 microns and an average size of the second structures is less than 15 microns.

Item 66. The film of item 65, wherein the average size of the first structures is an average equivalent circular diameter (ECD) of the first structures, and the average size of the second structures is an average equivalent circular diameter (ECD) of the second structures.

Item 67. The film of item 65, wherein the average size of the first structures is in a range from 20 to 30 microns.

Item 68. The film of item 65, wherein the average size of the second structures is in a range from 4 to 10 microns.

Item 69. The film of item 65, wherein the structured major surface has a topography characterizable by a first and second Fourier power spectrum associated with respective first and second orthogonal in-plane directions, and wherein
 to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
 to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak.

Item 70. The film of item 69, wherein the first ratio is less than 0.5 and the second ratio is less than 0.5.

Item 71. The film of item 65, wherein the first structures are flat-faceted structures, and the second structures are curved structures.

Item 72. The film of item 65, wherein the first structures are first cavities in the major surface, and the second structures are second cavities in the major surface.

Item 73. The film of item 65, wherein the structured major surface is characterized by a bimodal distribution of equivalent circular diameter (ECD) of structures of the structured surface, the bimodal distribution having a first and second peak, the larger first structures corresponding to the first peak and the smaller second structures corresponding to the second peak.

Item 74. The film of item 65, wherein the structured major surface comprises substantially no beads.

Item 75. An optical film comprising a first structured major surface opposite a second structured major surface, wherein the first structured major surface is made by microreplication from a first tool structured surface, the first tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

Item 76. The film of item 75, wherein the second structured major surface is made by microreplication from a second tool structured surface, the second tool structured surface being made by forming a third layer of the metal by electrodepositing the metal using a third electroplating process resulting in a major surface of the third layer having a third average roughness, and forming a fourth layer of the metal on the major surface of the third layer by electrodepositing the metal on the third layer using a fourth electroplating process resulting in a major surface of the fourth layer having a fourth average roughness smaller than the third average roughness, the major surface of the fourth layer corresponding to the second tool structured surface.

Item 77. The film of item 76, wherein the first structured major surface is associated with a first haze and the second structured major surface is associated with a second haze, and the first haze is greater than the second haze.

Item 78. A display system, comprising:
  a light guide;
  a display panel configured to be backlit by light from the light guide;
  one or more prismatic brightness enhancement films disposed between the light guide and the display panel; and
  a light diffusing film disposed between the light guide and the one or more prismatic brightness enhancement films;
  wherein the light diffusing film has a haze of at least 80%; and
  wherein the light diffusing film has a first structured major surface made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

Item 79. The display system of item 78, wherein the first structured major surface of the light diffusing film has a topography characterizable by a first and second Fourier power spectrum associated with respective first and second orthogonal in-plane directions, and wherein
  to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
  to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak.

Item 80. The display system of item 79, and
  wherein the first structured major surface of the light diffusing film comprises closely-packed structures arranged such that ridges are formed between adjacent structures, the structures being limited in size along two orthogonal in-plane directions;
  wherein the first structured major surface is characterized by a total ridge length per unit area in plan view of less than 200 mm/mm$^2$.

Item 81. The display system of item 79, and
  wherein the first structured major surface of the light diffusing film comprises closely-packed structures, the structured major surface defining a reference plane and a thickness direction perpendicular to the reference plane;
  wherein the closely-packed structures are characterized by equivalent circular diameters (ECDs) in the reference plane and mean heights along the thickness direction, and wherein an aspect ratio of each structure equals the mean height of the structure divided by the ECD of the structure; and
  wherein an average aspect ratio of the structures is less than 0.15.

Item 82. The display system of item 79, and
  wherein the first structured major surface of the light diffusing film comprises closely-packed structures having curved base surfaces; and
  wherein the first structured major surface provides an optical haze of less than 95%.

Item 83. The display system of item 78, wherein the first structured major surface of the light diffusing film comprises larger first structures and smaller second structures, the first and second structures both being limited in size along two orthogonal in-plane directions; and
  wherein the first structures are non-uniformly arranged on the first structured major surface;
  wherein the second structures are closely packed and non-uniformly dispersed between the first structures; and
  wherein an average size of the first structures is greater than 15 microns and an average size of the second structures is less than 15 microns.

Item 84. The display system of item 78, wherein the light diffusing film has a second structured major surface opposite the first structured major surface, the second structured major surface made by microreplication from a second tool structured surface, the second tool structured surface being made by forming a third layer of the metal by electrodepositing the metal using a third electroplating process resulting in a major surface of the third layer having a third average roughness, and forming a fourth layer of the metal on the major surface of the third layer by electrodepositing the metal on the third layer using a fourth electroplating process resulting in a major surface of the fourth layer having a fourth average roughness smaller than the third average roughness, the major surface of the fourth layer corresponding to the second tool structured surface.

Item 85. The system of item 84, wherein the first structured major surface of the diffusing film faces the display panel and the second structured major surface of the diffusing film faces the light guide, and wherein the first structured major surface is associated with a first haze and the second structured major surface is associated with a second haze, and the first haze is greater than the second haze.

Item 86. A display system, comprising:
a light guide;
a display panel configured to be backlit by light from the light guide;
a light diffusing film disposed in front of the display system such that the display panel is between the light guide and the light diffusing film;
wherein the light diffusing film has a haze in a range from 10-30%; and
wherein the light diffusing film has a first structured major surface made by microreplication from a tool structured surface, the tool structured surface being made by forming a first layer of a metal by electrodepositing the metal using a first electroplating process resulting in a major surface of the first layer having a first average roughness, and forming a second layer of the metal on the major surface of the first layer by electrodepositing the metal on the first layer using a second electroplating process resulting in a major surface of the second layer having a second average roughness smaller than the first average roughness, the major surface of the second layer corresponding to the tool structured surface.

Item 87. The display system of item 86, wherein the first structured major surface of the light diffusing film has a topography characterizable by a first and second Fourier power spectrum associated with respective first and second orthogonal in-plane directions, and wherein
to the extent the first Fourier power spectrum includes one or more first frequency peak not corresponding to zero frequency and being bounded by two adjacent valleys that define a first baseline, any such first frequency peak has a first peak ratio of less than 0.8, the first peak ratio being equal to an area between the first frequency peak and the first baseline divided by an area beneath the first frequency peak; and
to the extent the second Fourier power spectrum includes one or more second frequency peak not corresponding to zero frequency and being bounded by two adjacent valleys that define a second baseline, any such second frequency peak has a second peak ratio of less than 0.8, the second peak ratio being equal to an area between the second frequency peak and the second baseline divided by an area beneath the second frequency peak.

Item 88. The display system of item 87, and
wherein the first structured major surface of the light diffusing film comprises closely-packed structures arranged such that ridges are formed between adjacent structures, the structures being limited in size along two orthogonal in-plane directions;
wherein the first structured major surface is characterized by a total ridge length per unit area in plan view of less than 200 mm/mm$^2$.

Item 89. The display system of item 87, wherein the first structured major surface comprises closely-packed structures, and wherein the structured major surface provides an optical clarity in a range from 10 to 40%.

Item 90. The display system of item 86, wherein the first structured major surface faces the front of the display system.

Item 91. The display system of item 90, wherein the first structured major surface is a front-most surface of the display system.

Various modifications and alterations of this invention will be apparent to those skilled in the art without departing from the spirit and scope of this invention, and it should be understood that this invention is not limited to the illustrative embodiments set forth herein. For example, the disclosed transparent conductive articles may also include an anti-reflective coating and/or a protective hard coat. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A method of making a structured surface, comprising:
forming a first layer of a metal by electrodepositing the metal using a first electroplating process resulting in a first major surface of the first layer having a first average roughness; and
forming a second layer of the metal on the first major surface of the first layer by electrodepositing the metal on the first major surface using a second electroplating process, the second electroplating process including an organic grain refiner, resulting in a second major surface of the second layer having a second average roughness smaller than the first average roughness.

2. The method of claim 1, further comprising:
providing a base surface having a base average roughness;
wherein the first layer is formed on the base surface, and wherein the first average roughness is greater than the base average roughness.

3. The method of claim 1, wherein the metal is copper.

4. The method of claim 1, wherein the first electroplating process uses a first electroplating solution that contains at most trace amounts of an organic leveler.

5. The method of claim 1, wherein forming the first layer results in the first major surface comprising a plurality of non-uniformly arranged first structures.

6. The method of claim 5, wherein forming the second layer results in the second major surface comprising a plurality of non-uniformly arranged second structures.

7. The method of claim 6, further comprising:
forming a third layer of a second metal on the second major surface by electrodepositing the second metal using an electroplating solution of the second metal.

8. The method of claim 7, wherein the second metal comprises chromium.

9. A microreplication tool made using a method according to claim 1, such that the microreplication tool has a tool structured surface corresponding to the second major surface.

10. The microreplication tool of claim 9, wherein the tool structured surface corresponds to an inverted form of the second major surface or a non-inverted form of the second major surface.

* * * * *